US012063472B2

(12) United States Patent
Zhang et al.

(10) Patent No.: US 12,063,472 B2
(45) Date of Patent: Aug. 13, 2024

(54) EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/585,132

(22) Filed: Feb. 23, 2024

(65) Prior Publication Data

US 2024/0196129 A1 Jun. 13, 2024

Related U.S. Application Data

(63) Continuation of application No. PCT/CN2023/117777, filed on Sep. 8, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 25/00* (2006.01)
*H04R 1/10* (2006.01)
*H04R 1/34* (2006.01)

(52) U.S. Cl.
CPC ........... *H04R 1/345* (2013.01); *H04R 1/1008* (2013.01); *H04R 1/105* (2013.01); *H04R 1/1075* (2013.01); *H04R 2460/11* (2013.01)

(58) Field of Classification Search
CPC ... H04R 1/345; H04R 1/1008; H04R 2460/11
(Continued)

(56) References Cited

U.S. PATENT DOCUMENTS 11,838,705 B2 12/2023 Zheng et al.
2007/0009133 A1 1/2007 Gerkinsmeyer
(Continued)

FOREIGN PATENT DOCUMENTS

CN 107113486 A 8/2017
CN 110958517 A 4/2020
(Continued)

OTHER PUBLICATIONS

International Search Report in PCT/CN2023/117777 mailed on Nov. 27, 2023, 9 pages.
(Continued)

*Primary Examiner* — Phylesha Dabney
(74) *Attorney, Agent, or Firm* — METIS IP LLC

(57) ABSTRACT

Embodiments of the present disclosure provide an earphone, comprising a sound production component, comprising a transducer and a housing accommodating the transducer, a sound outlet hole being provided on an inner side surface of the sound production component, the inner side facing an auricle of a user, and the sound outlet hole being configured to transmit a sound produced by the transducer out of the housing toward an ear canal of the user; and an ear-hook, configured to place the sound production component at a position adjacent to the car canal but not blocking an ear canal opening in a wearing state; wherein, at least a portion of the sound production component inserts into a cavum concha.

20 Claims, 20 Drawing Sheets

(30) Foreign Application Priority Data

| | | |
|---|---|---|
| Dec. 30, 2022 | (WO) | PCT/CN2022/144339 |
| Mar. 2, 2023 | (WO) | PCT/CN2023/079404 |
| Mar. 2, 2023 | (WO) | PCT/CN2023/079410 |
| Mar. 2, 2023 | (WO) | PCT/CN2023/079412 |

(58) Field of Classification Search
USPC .......... 381/381
See application file for complete search history.

(56) References Cited

U.S. PATENT DOCUMENTS

| | | | |
|---|---|---|---|
| 2020/0137476 | A1 | 4/2020 | Shinmen et al. |
| 2020/0196062 | A1 | 6/2020 | Zhang |
| 2021/0067857 | A1 | 3/2021 | Struzik |
| 2023/0130211 | A1 | 4/2023 | Li et al. |
| 2023/0269512 | A1 | 8/2023 | Wang |

FOREIGN PATENT DOCUMENTS

| | | | |
|---|---|---|---|
| CN | 111955017 | A | 11/2020 |
| CN | 212909891 | U | 4/2021 |
| CN | 113573215 | A | 10/2021 |
| CN | 113905304 | A | 1/2022 |
| CN | 114286228 | A | 4/2022 |
| CN | 114286243 | A | 4/2022 |
| CN | 114339511 | A | 4/2022 |
| CN | 216357224 | U | 4/2022 |
| CN | 115175069 | A | 10/2022 |
| EP | 4181531 | A1 | 5/2023 |
| JP | 2001326986 | A | 11/2001 |
| WO | 2005034574 | A1 | 4/2005 |
| WO | 2017081733 | A1 | 5/2017 |

OTHER PUBLICATIONS

Written Opinion in PCT/CN2023/117777 mailed on Nov. 27, 2023, 9 pages.

International Search Report in PCT/CN2023/079404 mailed on Jun. 26, 2023, 6 pages.

Written Opinion in PCT/CN2023/079404 mailed on Jun. 26, 2023, 5 pages.

International Search Report in PCT/CN2023/079412 mailed on Jun. 29, 2023, 6 pages.

Written Opinion in PCT/CN2023/079412 mailed on Jun. 29, 2023, 5 pages.

International Search Report in PCT/CN2023/079410 mailed on Jun. 8, 2023, 6 pages.

Written Opinion in PCT/CN2023/079410 mailed on Jun. 8, 2023, 5 pages.

EARPHONES

CROSS REFERENCE TO RELATED APPLICATIONS

The application is a continuation of International Application No. PCT/CN2023/117777, filed on Sep. 8, 2023, which claims priority to Chinese Application No. 202211336918.4, filed on Oct. 28, 2022, Chinese Application No. 202223239628.6, filed on Dec. 1, 2022, International Application No. PCT/CN2022/144339, filed on Dec. 30, 2022, International Application No. PCT/CN2023/079412, filed on Mar. 2, 2023, International Application No. PCT/CN2023/079410, filed on Mar. 2, 2023, and International Application No. PCT/CN2023/079404, filed on Mar. 2, 2023, the contents of each of which are incorporated herein by reference.

TECHNICAL FIELD

The present disclosure relates to the field of acoustic technology, and in particular, to earphones.

BACKGROUND

With the development of acoustic output technology, an acoustic device (e.g., an earphone) has been widely used in people's daily lives, which may be used in conjunction with an electronic device such as a phone and a computer, to provide a user with an auditory feast. The earphone is a portable audio output device that realizes sound conduction within a specific range. Compared with a traditional in-ear earphone and a circumaural earphone, an earphone that does not block or cover an car canal of users, allows the users to listen to music while accessing sound information in an external environment, thereby improving safety and comfort. An output performance of the earphone has a great impact on the user's comfort.

Therefore, it is necessary to provide an earphone to improve the output performance of the earphone.

SUMMARY

Embodiments of the present disclosure provide an earphone, comprising: a sound production component and an car-hook. The sound production component includes a transducer and a housing accommodating the transducer, a sound outlet hole is provided on an inner side surface of the sound production component, the inner side surface facing an auricle of a user, and the sound outlet hole is configured to transmit a sound produced by the transducer out of the housing toward an car canal of the user; the car-hook is configured to place the sound production component at a position adjacent to the car canal but not blocking an car canal opening in a wearing state; at least a portion of the sound production component inserts into a cavum concha, a distance between a projection of a rear side surface of the sound production component on a sagittal plane and a projection of a cavum concha edge on the sagittal plane ranges from 0 mm to 7.25 mm, and a distance between a center of the sound outlet hole and the rear side surface of the sound production component ranges from 8.15 mm to 12.25 mm.

In some embodiments, one or more pressure relief holes are provided on side surfaces of the sound production component other than the inner side surface, and a distance between a center of the one or more pressure relief holes and the rear side surface of the sound production component is in a range of 10.44 mm to 15.68 mm or 13.51 mm to 20.27 mm.

In some embodiments, a projection of the sound production component on the sagittal plane and a projection of the cavum concha on the sagittal plane have an overlapping region, and a ratio of an area of the overlapping region to an area of the projection of the cavum concha on the sagittal plane is not less than 44.01%.

In some embodiments, an area of the projection of the sound production component on the sagittal plane ranges from 202 $mm^2$ to 560 $mm^2$.

In some embodiments, a distance between the center of the sound outlet hole and a lower side surface of the sound production component ranges from 4.05 mm to 6.05 mm; and a short-axis dimension of the sound production component ranges from 10 mm to 15 mm.

In some embodiments, at least one pressure relief hole of the one or more pressure relief holes comprises a first pressure relief hole, the first pressure relief hole being open on an upper side surface, an outer side surface, or a lower side surface of the sound production component, and a distance between a center of the first pressure relief hole and the rear side surface is in a range of 10.44 mm to 15.68 mm.

In some embodiments, a distance between a projection point of the center of the sound outlet hole on the sagittal plane and a projection point of a center of the car canal opening on the sagittal plane ranges from 2.2 mm to 3.8 mm; and a distance between the projection point of the center of the first pressure relief hole on the sagittal plane and the projection point of the center of the car canal opening on the sagittal plane ranges from 12 mm to 18 mm.

In some embodiments, a distance between a projection point of the center of the sound outlet hole on the sagittal plane and a projection point of a ⅓ point of a lower boundary of the inner side surface on the sagittal plane ranges from 3.5 mm to 5.6 mm; and a distance between a projection point of the center of the first pressure relief hole on the sagittal plane and the projection point of the ⅓ point of the lower boundary of the inner side surface on the sagittal plane ranges from 13.76 mm to 20.64 mm.

In some embodiments, a thickness of the sound production component ranges from 6 mm to 12 mm; and a distance between the center of the first pressure relief hole and the inner side surface of the sound production component facing the auricle ranges from 4.24 mm to 6.38 mm.

In some embodiments, at least one pressure relief hole of the one or more pressure relief holes comprises a second pressure relief hole, the second pressure relief hole being open on the upper side surface, the outer side surface, or the lower side surface of the sound production component, a distance between a center of the second pressure relief hole and the rear side surface is in a range of 13.51 mm to 20.27 mm.

In some embodiments, a distance between a projection point of the center of the sound outlet hole on the sagittal plane and a projection point of a center of the car canal opening on the sagittal plane ranges from 2.2 mm to 3.8 mm; and a distance between a projection point of the center of the second pressure relief hole on the sagittal plane and the projection point of the center of the car canal opening on the sagittal plane ranges from 6.88 mm to 10.32 mm.

In some embodiments, a distance between a projection point of the center of the sound outlet hole on the sagittal plane and a projection point of a midpoint of an upper boundary of the inner side surface on the sagittal plane ranges from 10.0 mm to 15.2 mm; and a distance between a projection point of the center of the second pressure relief hole on the sagittal plane and the projection point of the midpoint of the upper boundary of the inner side surface on the sagittal plane ranges from 14.4 mm to 21.6 mm.

In some embodiments, a thickness of the sound production component ranges from 6 mm to 12 mm; and a distance between the center of the second pressure relief hole and the inner side surface of the sound production component facing the auricle ranges from 4.24 mm to 6.38 mm.

In some embodiments, a distance between a projection point of the center of the sound outlet hole on the sagittal plane from a projection point of a ⅓ point of a lower boundary of the inner side surface on the sagittal plane ranges from 3.5 mm to 5.6 mm; and a distance between a projection point of the center of the second pressure relief hole on the sagittal plane and the projection point of the ⅓ point of the lower boundary of the inner side surface on the sagittal plane is in a range of 8.16 mm to 12.24 mm.

In some embodiments, at least one pressure relief hole of the one or more pressure relief holes comprises a first pressure relief hole and a second pressure relief hole, the first pressure relief hole and the second pressure relief hole are open on two sides that opposite to each other of the sound production component.

In some embodiments, a short-axis dimension of the sound production component ranges from 10 mm to 15 mm; and a distance between a projection point of a center of the first pressure relief hole on the sagittal plane and a projection point of a center of the second pressure relief hole on the sagittal plane ranges from 8.51 mm to 15.81 mm.

In some embodiments, a distance between the center of the sound outlet hole and a midperpendicular plane of a line connecting the center of the first pressure relief hole and the center of the second pressure relief hole is in a range of 0 mm to 2 mm.

In some embodiments, a distance between a projection point of a center of the first pressure relief hole on the sagittal plane and a projection point of a midpoint of an upper boundary of the inner side surface on the sagittal plane is no less than 2 mm; and a distance between a projection point of a center of the second pressure relief hole on the sagittal plane and a projection point of a ⅓ point of a lower boundary of the inner side surface on the sagittal plane ranges from 8.16 mm to 12.24 mm.

Embodiments of the present disclosure also provide an earphone, comprising: a sound production component, comprising a transducer and a housing accommodating the transducer, a sound outlet hole being provided on an inner side surface of the sound production component, the inner side surface facing an auricle of a user, the sound outlet hole being configured to transmit a sound produced by the transducer out of the housing toward an car canal of the user, one or more pressure relief holes being provided on other side surfaces of the sound production component other than the inner side surface; and an car-hook, configured to place the sound production component at a position near the car canal but not blocking an car canal opening in a wearing state; at least a portion of the sound production component is located at an antihelix, a distance between a projection of a rear side surface of the sound production component on a sagittal plane and a projection of an inner contour of the auricle on the sagittal plane is not greater than 8 mm, a distance between a center of the sound outlet hole and the rear side surface of the sound production component ranges from 9.5 mm to 15.0 mm, and a distance between a center of at least one pressure relief hole of the one or more pressure relief holes and the rear side surface ranges from 8.60 mm to 12.92 mm.

In some embodiments, a distance between the center of the sound outlet hole and an upper apex of the car-hook ranges from 17.5 mm to 27.0 mm; and a projection of the sound production component on the sagittal plane and a projection of a cavum concha on the sagittal plane have an overlapping region, and a ratio of an area of the overlapping region to an area of a projection of the cavum concha on the sagittal plane is not less than 11.82%.

In some embodiments, a short-axis dimension of the sound production component ranges from 11 mm to 18 mm; and a distance between the center of the sound outlet hole and a lower side surface of the sound production component is in a range of 2.3 mm to 3.6 mm.

In some embodiments, at least one pressure relief hole of the one or more pressure relief holes comprises a first pressure relief hole, the first pressure relief hole being open on an upper side surface, an outer side surface, or a lower side surface of the sound production component.

In some embodiments, a thickness of the sound production component ranges from 6 mm to 12 mm; and a distance between a center of the first pressure relief hole and the inner side surface ranges from 4.43 mm to 7.96 mm.

In some embodiments, at least one pressure relief hole of the one or more pressure relief holes further comprises a second pressure relief hole, and the first pressure relief hole and the second pressure relief hole are open on two sides that are opposite to each other of the sound production component.

In some embodiments, a distance between a center of the second pressure relief hole and the inner side surface is in a range of 4.43 mm to 7.96 mm; a distance between the center of the sound outlet hole and a midperpendicular plane of a line connecting the center of the first pressure relief hole and the center of the second pressure relief hole is in a range of 0 mm to 2 mm.

BRIEF DESCRIPTION OF THE DRAWINGS

The present disclosure is further illustrated in terms of exemplary embodiments. These exemplary embodiments are described in detail with reference to the drawings. These embodiments are not limiting, and in these embodiments, the same numbering denotes the same structure, wherein.

DETAILED DESCRIPTION

Figure 1:
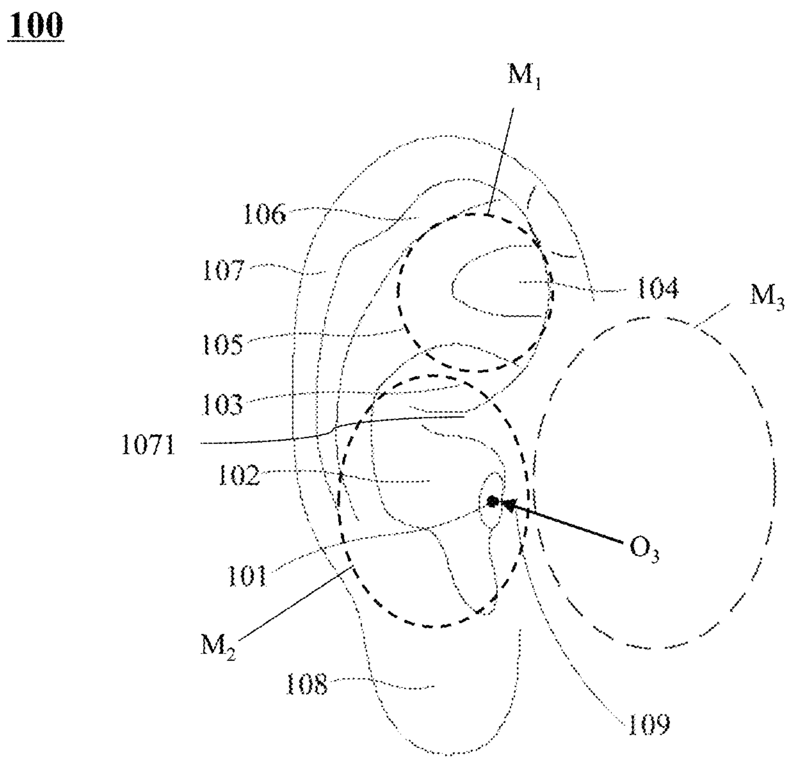
FIG. 1 is a schematic diagram illustrating an exemplary car according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios based on the accompanying drawings without creative labor. Unless obviously obtained from the context or the context illustrates otherwise, the same numeral in the drawings refers to the same structure or operation.

It should be understood that as used herein, the terms “system,” “device,” “unit,” and/or “module” as used herein is a way to distinguish between different components, elements, parts, sections, or assemblies at different levels. However, the words may be replaced by other expressions if other words accomplish the same purpose.

As used in the disclosure and the appended claims, the singular forms “a,” “an,” and “the” include plural referents unless the content clearly dictates otherwise. In general, the terms “including,” and “comprising” suggest only the inclusion of clearly identified steps and elements that are explicitly identified, but these steps and elements do not constitute an exclusive list, and the method or device may also include other steps or elements.

In the description of the present disclosure, it is to be understood that the terms “first”, “second”, “first”, “second”, “third”, “fourth”, etc. are used for descriptive purposes only, and are not to be understood as indicating or implying relative importance or implicitly specifying the number of technical features indicated. Thereby, the limitations “first”, “second”, “first”, “second”, “third”, and “fourth” may expressly or implicitly include at least one such feature. In the description of the present disclosure, “plurality” means at least two, e.g., two, three, or the like, unless explicitly and specifically limited otherwise.

In the present disclosure, unless otherwise expressly specified or limited, the terms “connection,” “fixing”, etc. are to be understood broadly unless otherwise expressly provided and qualified. For example, the term “connection” may refer to a fixed connection, a removable connection, or a one-piece connection; a mechanical connection, or an electrical connection; a direct connection, or an indirect connection through an intermediate medium, a connection within two elements, or an interaction between two elements, unless expressly limited otherwise. To one of ordinary skill in the art, the specific meaning of the above terms in the present disclosure may be understood on a case-by-case basis.

FIG. 1 is a schematic diagram illustrating an exemplary car 100 according to some embodiments of the present disclosure.

As shown in FIG. 1, the car 100 (which may also be referred to as an auricle 100) may comprise an car canal 101, a cavum concha 102, a cymba conchae 103, a triangular fossa 104, an antihelix 105, a scaphoid fossa 106, a helix 107, an earlobe 108, tragus 109, and a crus of helix 1071. In some embodiments, stabilization of wearing of an acoustic device may be achieved using one or more parts of the car 100 to support the acoustic device. In some embodiments, the car canal 101, the cavum concha 102, the cymba conchae 103, the triangular fossa 104, and other parts of the ear 100 have a certain depth and volume in a three-dimensional space, which may be used to wear the acoustic device. For example, the acoustic device (e.g., an in-car earphone) may be worn in the car canal 101. In some embodiments, the acoustic device (e.g., the earphone) may be worn with the aid of other parts of the car 100 other than the car canal 101. For example, the wearing of the acoustic device may be realized with the aid of the cymba conchae 103, the triangular fossa 104, the antihelix 105, the scaphoid fossa 106, the helix 107, and other parts, or a combination thereof. In some embodiments, the acoustic device may also be further worn with the aid of the user's earlobe 108, or the like, to improve the comfort and reliability of the acoustic device. The wearing of the acoustic device and the transmission of a sound can be achieved by using other parts of the car 100 other than the car canal 101, which can "free" the user's car canal 101. When a user wears the acoustic device (e.g., the earphone), the acoustic device does not block the user's car canal 101, and the user receives both a sound from the acoustic device and a sound from an environment (e.g., honking, car bells, a sound of people around, a traffic command sound, etc.), thereby reducing a probability of a traffic accident. In some embodiments, the acoustic device may be designed to be adapted to the car 100 according to the construction of the car 100, so as to realize that the sound production component of the acoustic device may be worn at various different positions of the car 100. For example, when the acoustic device is an earphone, the earphone may include a suspension structure (e.g., an car-hook) and a sound production component, and the sound production component is physically coupled to the suspension structure, and the suspension structure may be adapted to a shape of the car 100 to adapted to place a whole or a portion of a structure of the sound production component on an anterior side of the tragus 109 (e.g., a region M3 enclosed by a dashed line in FIG. 1). For example, the whole or portion of the structure of the sound production component may be adapted to fit an upper portion of the car canal 101 (e.g., the cymba conchae 103, the triangular fossa 104, the antihelix 105, the scaphoid fossa 106, the helix 107, the crus of helix 1071, and other locations where one or more parts are located) while the user is wearing the earphone. Furthermore, for example, when the user wears the earphone, the whole or a portion of the structure of the sound production component may be located in a cavity (e.g., a region M1 containing at least the cymba conchae 103, the triangular fossa 104, and a region M2 containing at least the cavum concha 102 enclosed by the dotted line in FIG. 1) formed by one or more parts of the car 100 (e.g., the cavum concha 102, the cymba conchae 103, the triangular fossa 104, etc.).

Individual differences may exist between different users, resulting in different shapes, sizes, and other dimensional differences in the car 100. For case of description and understanding, the present disclosure will further describe how the acoustic device in various embodiments is worn on a model of the car 100, if not otherwise specified, using primarily a model of the car 100 having a "standard" shape and size as a reference. For example, a simulator comprising a head and its (left and right) car 100 can be produced based on the ANSI:S3.36,S3.25 and IEC:60318-7 standards, such as the following GRAS45BCKEMAR, as a reference for wearing an acoustic device, thus presenting a scenario in which most users would normally wear an acoustic device. As an example only, the car 100 as a reference may have following relevant features: a dimension of a projection of the car 100 on a sagittal plane along a vertical axis may be in a range of 49.5 mm-74.3 mm, a dimension of a projection of the car 100 on the sagittal plane along a sagittal axis direction may be in a range of 36.6 mm-55 mm. Thus, in the present disclosure, the words such as "worn by a user", "in a wearing state" and "in a worn state" may therefore refer to the acoustic device described in the present disclosure being worn in the car 100 of the aforementioned simulator. Of course, taking into account that there are individual differences among different users, a structure, a shape, a size, a thickness, etc., of one or more parts of the car 100 may have certain differences, and in order to satisfy the needs of different users, the acoustic device may be differentiated, and such differentiation may be manifested that one or more parts of the acoustic device (e.g., the sound production component, the car-hook, etc.) may have different ranges of values, so as to adapt to different contours of the car 100.

It should be noted that: in the fields of medicine and anatomy, three basic sections of a human body including a Sagittal Plane, a Coronal Plane, and a Horizontal Plane, as well as three basic axes including a Sagittal Axis, a Coronal Axis, and a Vertical Axis may be defined. The sagittal plane is a perpendicular plane to the ground made along the anterior and posterior directions of the body, which divides the body into left and right parts; the coronal plane is the perpendicular plane to the ground made along the left and right directions of the body, which divides the body into an anterior part and a posterior part; and the horizontal plane is a plane parallel to the ground made along the up and down direction perpendicular to the body, which divides the body into upper and lower parts. Correspondingly, the sagittal axis is the axis made along the anterior-posterior direction of the body and perpendicular to the coronal plane; the coronal axis is the axis made along the left-right direction of the body and perpendicular to the sagittal plane; and the perpendicular axis is the axis made along the upper and lower direction of the body and perpendicular to the horizontal plane. Furthermore, the "an anterior side of the auricle 100" as described herein is a concept relative to "a posterior side of the auricle 100", where the former refers to a side of the auricle 100 that is back away from the head, and the latter refers to a side of the auricle 100 that is toward the head. In which the auricle 100 of the above-described simulator is viewed along a coronal axis direction of the human body, a schematic diagram of an anterior contour of the auricle 100 as shown in FIG. 1 may be obtained.

Figure 2:
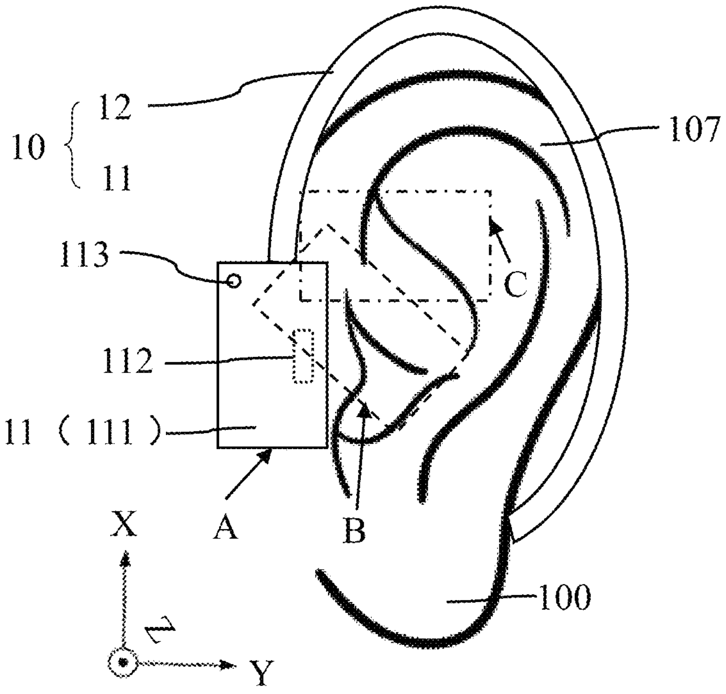
FIG. 2 is a schematic diagram illustrating an exemplary structure of an earphone according to some embodiments of the present disclosure.

FIG. 2 is a schematic diagram illustrating exemplary wearing of an earphone according to some embodiments of the present disclosure.

In some embodiments, an earphone 10 may include but is not limited to, an air-conduction earphone and a bone air-conduction earphone, etc. In some embodiments, the earphone 10 may be combined with a product such as eyeglasses, a headset, a head-mounted display device, an AR/VR helmet, or the like.

As shown in FIG. 2, the earphone 10 may include a sound production component 11 and an car-hook 12. In some embodiments, the earphone 10 may be worn on a user's body (e.g., a head, neck, or upper torso of a human body) via the car-hook 12 of the sound production component 11. In some embodiments, the earphone 10 may fix the sound production component 11 near an car canal via the car-hook 12 but not blocking the car canal.

In some embodiments, one end of the car-hook 12 may be coupled to the sound production component 11, with the other end of the car-hook 12 extending along a junction between the user's auricle 100 and the head. In some embodiments, the car-hook 12 may be a curved structure adapted to fit the user's auricle 100 so that the car-hook 12 may be suspended from the user's auricle 100. For example, the car-hook 12 may be a curved structure adapted to the junction between the user's head and the auricle 100 so that the car-hook 12 may be disposed between the user's auricle 100 and the head. In some embodiments, the car-hook 12 may also be a clamping structure adapted to the user's auricle 100 so that the car-hook 12 may be clamped at the user's auricle 100. In some embodiments, the car-hook 12 may include but is not limited to, an car-hook, an elastic band, or the like, so that the earphone 10 may be well secured to the user to prevent the user from dropping the earphone 10 during use. In some embodiments, the earphone 10 may not include the car-hook 12, and the sound production component 11 may be fixed to a vicinity of the user's auricle 100 using a hanging or clamping manner.

Figure 7:
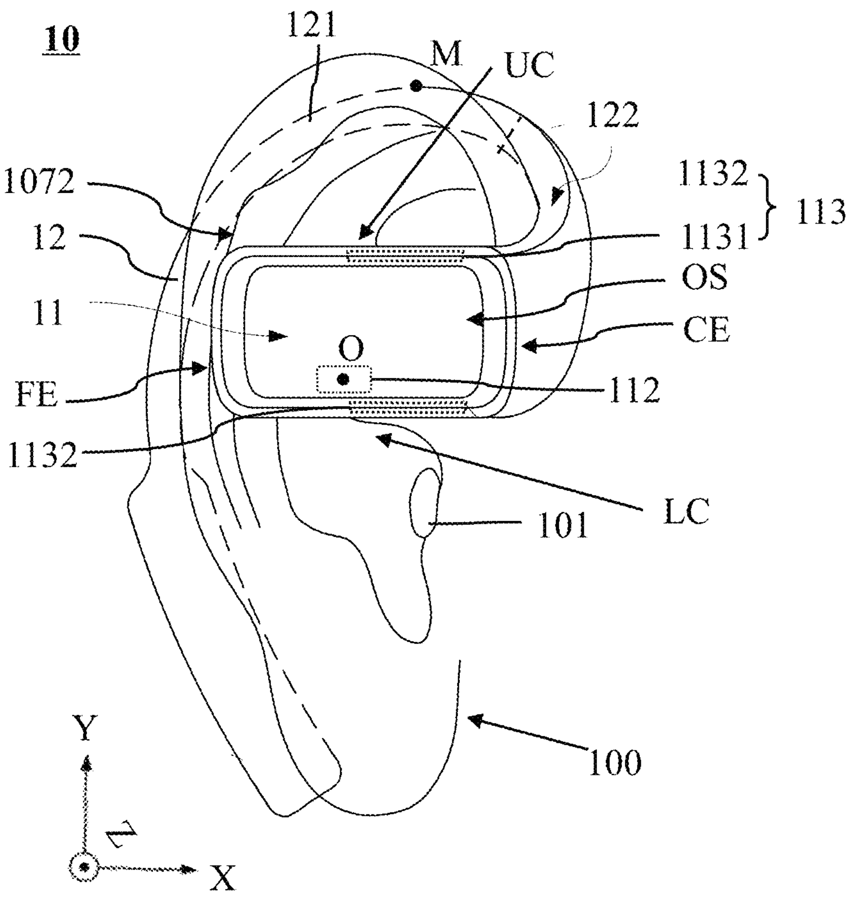
FIG. 7 is a schematic diagram illustrating exemplary wearing of the earphone according to some embodiments of the present disclosure.

Exemplarily, the car-hook 12 comprises a hooked portion (a first portion 121 as illustrated in FIG. 7) and a connection portion (a second portion 122 as illustrated in FIG. 7) that are connected in sequence. The connection portion connects the hooked portion with the sound production component 11 to make the earphone 10 curved in a three-dimensional space when it is in a non-wearing state (i.e., a natural state). In other words, the hooked portion, the connection portion, and the sound production component 11 are not coplanar in the three-dimensional space. This is set up so that, when the earphone 10 is in a wearing state, the hooked portion may be located between a posterior side of the auricle 100 of the user and the head, and the sound production component 11 contacts with an anterior side of the user's auricle 100 (e.g., a region M3 in FIG. 1) or the auricle 100 (e.g., the region M1, the region M2 in FIG. 1), and the sound production component 11 and the hooked portion may cooperate to clamp the auricle 100. Specifically, the connection portion may extend from the head to an outer side of the head, which in turn cooperates with the hooked portion to provide the sound production component 11 with a compression force against the anterior side of the auricle 100 or the auricle 100. The sound production component 11 may be specifically pressed against a region where the anterior side of the auricle 100, the cavum concha 102, the cymba conchae 103, the triangular fossa 104, the antihelix 105, or the like are located under the compression force so that the earphone 10 does not block the car canal 101 of the car 100 when the earphone 10 is in the wearing state.

In some embodiments, in order to improve the stability of the earphone 10 in the wearing state, the earphone 10 may be provided in any one of the following ways or a combination thereof. For one, at least a portion of the car-hook 12 is provided with a mimetic structure that fits against at least one of a posterior side of the auricle 100 and the head in order to increase a contacting region of the car-hook 12 with the auricle 100 and/or the head, so as to increase a resistance amount of the earphone 10 to prevent it from falling off from the auricle 100. Second, at least a portion of the car-hook 12 is provided as an elastic structure to have a certain deformity amount in the wearing state to increase a positive pressure of the car-hook 12 on the auricle 100 and/or the head to increase the resistance amount of the earphone 10 to prevent it from falling off from the auricle 100. Thirdly, at least a portion of the car-hook 12 is provided to rest against the head in the wearing state so as to create a reaction force that presses against the auricle 100 to cause the sound production component 11 to be pressed against the anterior side of the auricle 100, so as to increase the resistance amount of the earphone 10 to prevent it from falling off from the auricle 100. Fourth, the sound production component 11 and the car-hook 12 are provided to hold a region where the antihelix 105 is located, a region where the cavum concha is located, etc., from the anterior side and posterior side of the auricle 100 in the wearing state, thereby increasing the resistance amount of the earphone 10 to prevent it from falling from the auricle 100. Fifth, the sound production component 11 or an auxiliary structure connected thereto is set to extend at least partially into cavities like the cavum concha 102, the cymba conchae 103, the triangular fossa 104, and the scaphoid fossa 106, etc., so as to increase the resistance amount of the earphone 10 to prevent the earphone 10 from falling form the auricle 100.

The sound production component 11 may generate a sound input into the user's car canal. In some embodiments, the sound production component 11 may be, for example, circular, oval, runway, polygonal, U-shape, V-shape, semicircular, and other regular or irregular shapes, such that the sound production component 11 may be directly hooked up to the user's auricle 100. In some embodiments, the sound production component 11 may have a long axis direction X, a short axis direction Y, and a thickness direction Z that are orthogonal to each other. The long axis direction X may be defined as a direction having a large extension dimension in a shape of a two-dimensional projection plane (e.g., a projection of the sound production component 11 on a plane in which an inner side surface of the sound production component 11 is located, or a projection of the sound production component 11 on a sagittal plane) of the sound production component 11 (e.g., when a projection shape is a rectangle or a near-rectangle, the long axis direction is a length direction of a rectangle or a near-rectangle). For case of illustration, the present disclosure will be illustrated with a projection of the sound production component on a sagittal plane. The short axis direction Y may be defined as a direction perpendicular to the long axis direction X in the shape of the projection of the sound production component 11 on the sagittal plane (e.g., when the shape of the projection is a rectangle or a near-rectangle, the short-axis direction is a width direction of the rectangle or near-rectangle). The thickness direction Z may be defined as a direction perpendicular to the sagittal plane, e.g., the same as the coronal axis direction, both pointing to the left and right of the body.

In some embodiments, the sound production component 11 may include a transducer (e.g., a transducer 116 shown in FIG. 23)) and a housing 111 for accommodating the transducer. The housing 111 (or the sound production component 11) may be coupled to the car-hook 12. The transducer is used to convert an excitation signal (e.g., an electrical signal) into a corresponding mechanical vibration thereby generating a sound. In some embodiments, a sound outlet hole 112 is provided on an inner side surface of the housing 111, the inner side surface facing the auricle 100, and the sound outlet hole 112 is used to transmit a sound generated by the transducer out of the housing 111 and transmit towards the car canal so that the user can hear the sound. In some embodiments, the transducer (e.g., a diaphragm) may separate the housing 111 to form a front cavity (e.g., a front cavity 114 illustrated in FIG. 23) and a rear cavity of the earphone, and the sound outlet hole 112 acoustically couples with the front cavity, and a sound generated in the front cavity is transmitted to the car canal after being transmitted out of the housing 111. A portion of the sound transmitted out of the sound outlet hole 112 may propagate to the car canal, thereby allowing the user to hear the sound, and another portion of the sound may be transmitted, along with a sound reflected through the car canal, via the sound production component 11 to the auricle 100 via a leakage structure (e.g., a portion of the cavum concha that is not covered by the sound production component 11) to propagate outside the earphone 10 and the auricle 100, thereby creating a first sound leakage in a far field. In some embodiments, one or more pressure relief holes 113 (e.g., a first pressure relief hole 1131) are provided on other side surfaces (e.g., a side surface that is away from, or back away from, the user's car canal) of the housing 111. The pressure relief hole 113 is acoustically coupled to the rear cavity and transmits a sound generated in the rear cavity to the outside world after the sound is transmitted out of the housing 111. The pressure relief hole 113 is further away from the car canal as compared to the sound outlet hole 112, and the sound transmitted out of the pressure relief hole 113 creates a second sound leakage in the far field, an intensity of the first sound leakage and an intensity of the second sound leakage being comparable, and a phase of the first sound leakage and a phase (proximity) of the second sound leakage are opposite with each other, so that the two may cancel each other out with opposite phases in the far field, which is conducive to reducing a sound leakage of the earphone 10 in the far field. More descriptions of the sound production component 11 can be found elsewhere in the present disclosure, e.g., FIG. 7, FIG. 17, or the like and the related descriptions thereof.

In some embodiments, the sound production component 11 may be fixed in a position near the user's car canal 101 but not blocking the car canal 101 when the user is wearing the earphone 10. In some embodiments, a projection of the earphone 10 on the sagittal plane may not cover the user's car canal while in the wearing state. For example, the projection of the sound production component 11 on the sagittal plane may fall on left and right sides of the head and at a front position of a tragus on a sagittal axis of the human body (e.g., a position shown by a solid line box A in FIG. 2). At this time, the sound production component 11 is located on a front side of the tragus of the user, a long axis of the sound production component 11 may be in a vertical or nearly vertical state, a projection of the short axis direction Y on the sagittal plane is in the same direction as the sagittal axis direction, and a projection of the long axis direction X on the sagittal plane is in the same direction as the long axis direction, and the thickness direction Z is perpendicular to the sagittal plane. As another example, the projection of the sound production component 11 on the sagittal plane may fall on the antihelix 105 (e.g., a position shown by a dashed box C in FIG. 2). Then the sound production component 11 is at least partially disposed at the antihelix 105, the long axis of the sound production component 11 is in a horizontal or near-horizontal state, the projection of the long axis direction X of the sound production component 11 on the sagittal plane in the same direction as the sagittal axis direction, the projection of the short axis direction Y on the sagittal plane is in the same direction as the vertical axis direction, and the thickness direction Z is perpendicular to the sagittal plane. In this way, it can not only prevent the sound production component 11 from blocking the car canal, thereby freeing the user's cars; it can also increase a contacting region between the sound production component 11 and the auricle 100, thereby improving the wearing comfort of the earphone 10.

In some embodiments, the projection of the earphone 10 on the sagittal plane in the wearing state may also cover, or at least partially cover, the user's car canal, e.g., the projection of the sound production component 11 on the sagittal plane may fall within the cavum concha 102 (e.g., a location shown in dashed box B in FIG. 2) and contact the crus of helix 1071 and/or the helix 107. At this time, the sound production component 11 is at least partially disposed within the cavum concha 102, the sound production component 11 is in a tilted state, and the projection of the short axis direction Y of the sound production component 11 on the sagittal plane may be set at an angle to the sagittal axis direction, i.e., the short axis direction Y is also correspondingly inclined, the projection of the long axis direction X on the sagittal plane may have a certain angle with the sagittal axis direction, i.e., the long axis direction X is also inclined, and the thickness direction Z is perpendicular to the sagittal plane. At this time, as the cavum concha 102 has a certain volume and depth, so that there is a certain space between the inner side surface of the earphone 10 and the cavum concha, and the car canal may be connected to the outside world through a leakage structure between the inner side surface and the cavum concha, thereby freeing the user's cars. At the same time, the sound production component 11 and the cavum concha may cooperate to form an auxiliary cavity (i.e., the cavity structure mentioned later) that is connected to the car canal. In some embodiments, the sound outlet hole 112 may be at least partially disposed in the auxiliary cavity, and a sound transmitted out of the sound outlet hole 112 may be limited by the auxiliary cavity, i.e., the auxiliary cavity is capable of clustering the sound, allowing the sound to propagate more into the car canal, thereby increasing the volume and quality of the sound heard by the user in a near field, and improving the acoustic effect of the earphone 10.

The description of the above earphone 10 is for the purpose of exposition only and is not intended to limit the scope of the present disclosure. For a person of ordinary skill in the art, a wide variety of variations and modifications may be made based on the description of the present disclosure. For example, the earphone 10 may also include a battery component, a Bluetooth component, etc., or a combination thereof. The battery component may be used to power the earphone 10. The Bluetooth component may be used to wirelessly connect the earphone 10 to other devices (e.g., cell phones, computers, etc.). These changes and modifications remain within the scope of protection of the present disclosure.

Figure 3:
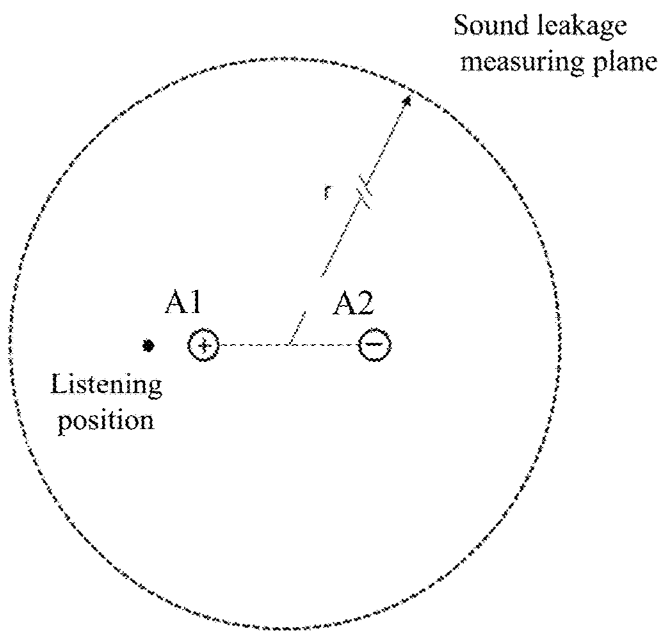
FIG. 3 is a schematic diagram illustrating two point sound sources and a listening position according to some embodiments of the present disclosure.

FIG. 3 is a schematic diagram illustrating two point sound sources and a listening position according to some embodiments of the present disclosure. In some embodiments, in conjunction with FIG. 3, a sound may be transmitted to the outside of the earphone 10 through the sound outlet hole 112, which may be regarded as a monopole sound source (or a point source) A1 to produce a first sound, and a sound may be transmitted to the outside of the earphone 10 through the pressure relief hole 113, which may be regarded as a monopole sound source (or a point source) A2 to produce a second sound, and the second sound and the first sound may be in opposite or nearly opposite phases, so as to enable the two sounds to cancel each other out in a far field, i.e., to form an "acoustic dipole" to reduce the sound leakage. In some embodiments, a line connecting the two monopole sound sources may point toward an car canal in a wearing state (referred to as a "listening position") so that a user can hear a loud enough sound. A magnitude of a sound pressure at the listening position (denoted as Pear) may be used to characterize a strength of a sound that the user hears (i.e., a near-field listening sound pressure). Further, a magnitude of a sound pressure (denoted as Pfar) at a sphere centered at the user's listening position (or a sphere centered at the center of a dipole sound source (e.g., A1 and A2 as shown in FIG. 3) with a radius r) may be used to characterize a strength of the sound leakage radiated by the earphone 10 into the far-field (i.e., a far-field sound leakage pressure). The Pfar may be obtained in a variety of statistical ways, such as by taking an average of a sound pressure at various points on the sphere, or, for example, by taking a distribution of a sound pressure at various points on the sphere and performing an area division, and so on.

It should be known that the method of measuring the sound leakage in the present disclosure is only an exemplary illustration of the principle and the effect, and is not restrictive, and the way of measuring and calculating the sound leakage may be reasonably adjusted according to the actual situation. For example, a sound pressure amplitude is averaged by taking a center of the dipole sound source as a center of a circle, and taking two or more points uniformly at the far-field according to a certain spatial angle. In some embodiments, the measurement of the listening sound may be performed by selecting a position point near the point source as a listening position, and using the sound pressure amplitude measured at that listening position as a value of the listening sound. In some embodiments, the listening position may or may not be on a line connecting two point sound sources. The way of measuring and calculating the listening sound may also be reasonably adapted to the actual situation, e.g., by averaging sound pressure amplitudes from other points or more than one point in the near-field position. As another example, the sound pressure amplitude is averaged by taking the sound pressure amplitude of two or more points at the near-field position uniformly according to a certain spatial angle with a certain point sound source as the center of the circle. In some embodiments, a distance between the near-field listening position and the point source is much less than a distance between the point source and the far-field leakage measurement sphere.

Obviously, the sound pressure Pear delivered by the earphone 10 to the user's car 100 should be large enough to increase the listening effect; and the sound pressure Pfar in the far-field should be small enough to strengthen the sound leakage reduction effect. Therefore, a sound leakage index a may be taken as an index for evaluating the sound leakage reduction capability of the earphone 10:

$$\alpha = \frac{|P_{far}|^2}{|P_{ear}|^2} \tag{1}$$

Through the formula (1), it can be seen that the smaller the leakage index, the stronger the earphone's ability to reduce sound leakage, and the smaller the sound leakage in the far-field in the case of the same near-field listening volume at the listening position.

Figure 4:
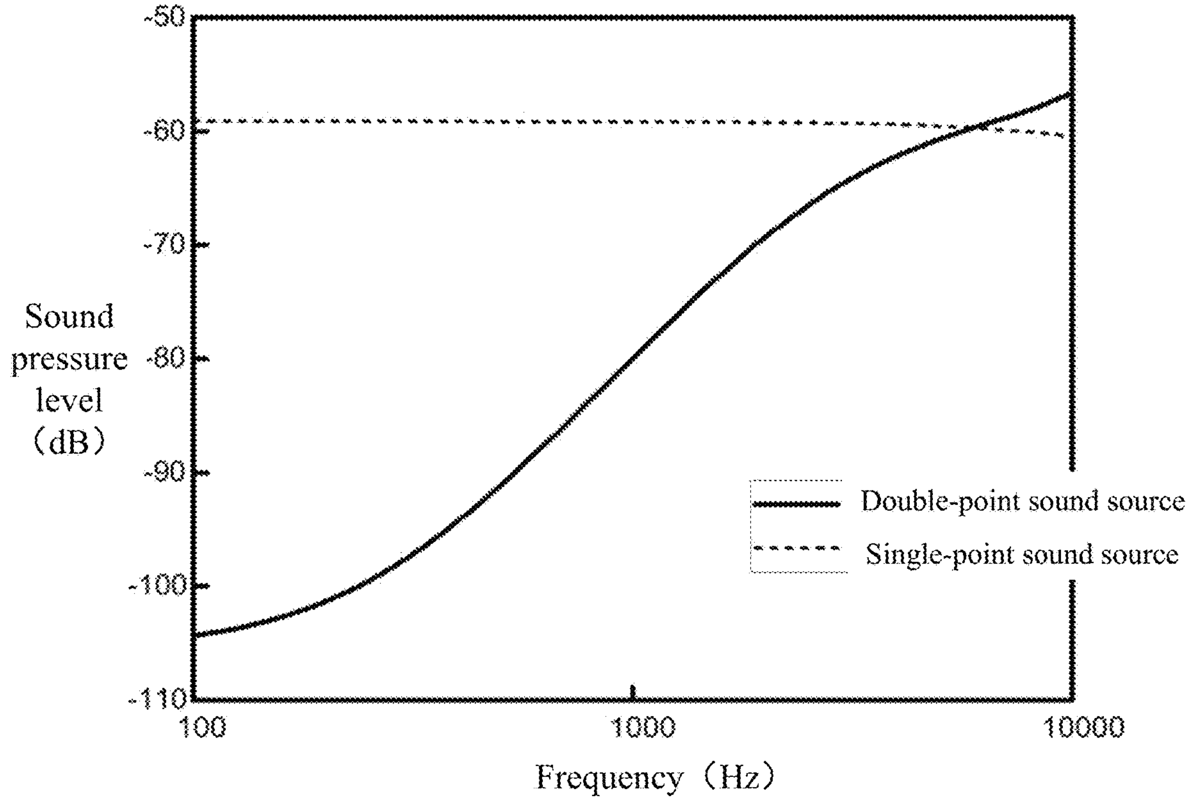
FIG. 4 is a diagram illustrating a comparison between sound leakage indices of a single-point sound source and a double-point sound source at different frequencies according to some embodiments of the present disclosure.

FIG. 4 is a diagram illustrating a comparison between sound leakage indices of a single-point sound source and a double-point sound source at different frequencies according to some embodiments of the present disclosure. The double-point sound source (which may also be referred to as a dipole source) in FIG. 4 may be a typical double-point sound source, i.e., a space is fixed, two point sources have the same amplitude, and the two point sources are in opposite phases. It should be understood that selecting the typical double-point source is only an illustration of the principle and effect, and can be adjusted according to the actual need for the parameters of the point sources, so that it has a certain difference with the typical double-point source. As shown in FIG. 4, in the case of a fixed space, the sound leakage produced by the double-point sound source increases with frequency, and the ability to reduce the sound leakage is weakened with frequency. When the frequency is greater than a certain frequency value (e.g., 8000 Hz as shown in FIG. 4), the sound leakage may be greater than that of the single-point source, which is an upper limit frequency of the double-point source (e.g., 8000 Hz) to reduce sound leakage.

In some embodiments, in order to improve the acoustic output of the earphone 10, i.e., to increase a sound intensity at a near-field listening position while decreasing a volume of the sound leakage in the far-field, a baffle may be provided between the sound outlet hole 112 and the pressure relief hole 113.

Figure 5:
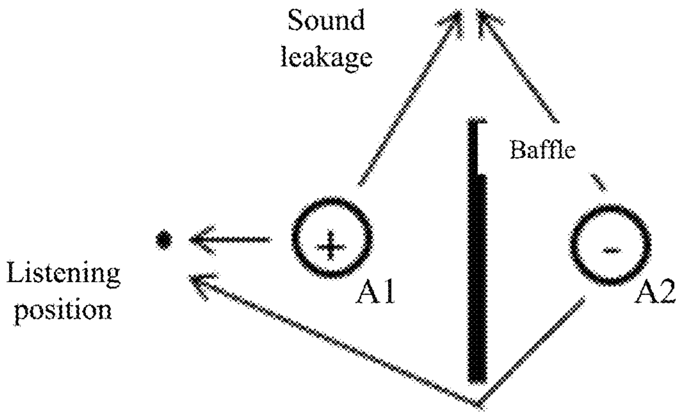
FIG. 5 is a schematic diagram illustrating an exemplary distribution of a baffle provided between two sound sources of a dipole sound source according to some embodiments of the present disclosure.

FIG. 5 is a schematic diagram illustrating an exemplary distribution of a baffle provided between two sound sources of a dipole sound source according to some embodiments of the present disclosure. As shown in FIG. 5, when a baffle is provided between the point sound source A1 and the point sound source A2, in the near field, a sound wave of the point sound source A2 needs to go around the baffle to intervene with a sound wave of the point sound source A1 at a listening position. This is equivalent to increasing an acoustic range from the point sound source A2 to the listening position. As a result, assuming that the point sound source A1 and the point sound source A2 have the same amplitude, a difference in amplitude between the sound waves of the point sound source A1 and the point sound source A2 at the listening position is increased compared to the case where the baffle is not provided, and thus a degree of phase cancellation between two sounds at the listening position is reduced, resulting in an increase in a volume at the listening position. In the far-field, since the sound waves generated by a point sound source A1 and a point sound source A2 do not need to bypass the baffle to interfere over a large spatial area (similar to the case without a baffle), the sound leakage in the far-field is not significantly increased compared to the case without a baffle. As a result, providing a baffle structure around one sound source of the point sound source A1 and the point sound source A2 significantly increases the volume at the near-field listening position without a significant increase in the volume of sound leakage in the far-field.

Figure 6:
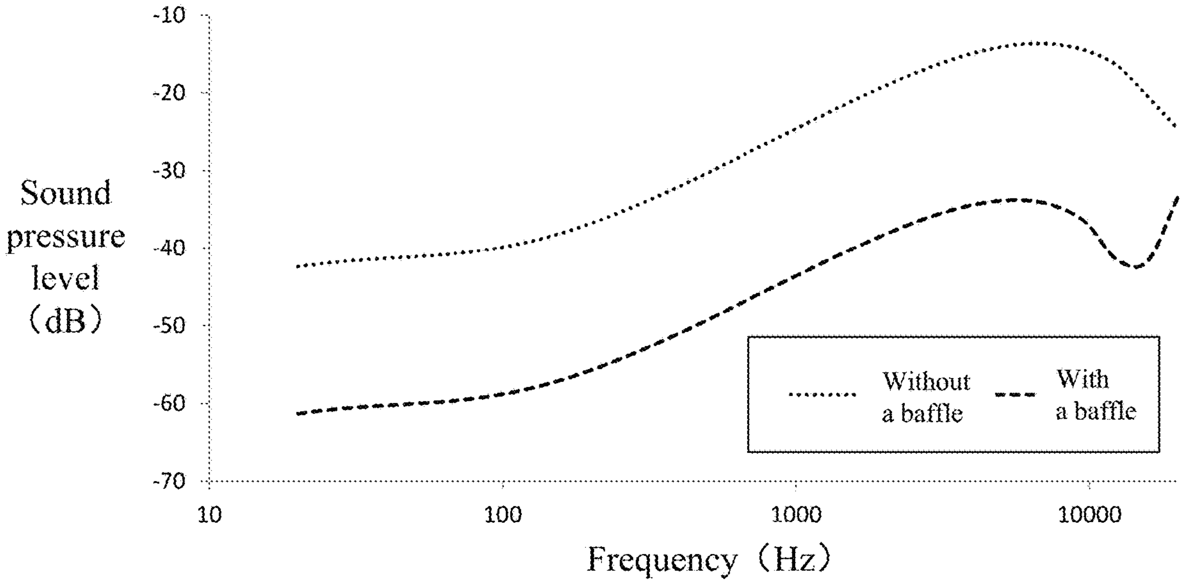
FIG. 6 is a diagram illustrating a comparison between sound leakage indices with and without a baffle provided between two sound sources of a dipole sound source according to some embodiments of the present disclosure.

FIG. 6 is a graph illustrating a comparison between sound leakage indices with and without a baffle between two sound sources of a dipole sound source according to some embodiments of the present disclosure. With the addition of a baffle between the two point sources, a distance between the two point sources in the near field is equivalent to increasing, and the volume at the near-field listening position is equivalent to being generated by a two-point source at a great distance, and the listening volume in the near field is significantly increased relative to that without the baffle. The sound volume in the near field is significantly increased compared to the case without the baffle; in the far field, the sound field of the two point sources is very little affected by the baffle, and the resulting sound leakage is equivalent to being produced by a two-point source with a small distance. Therefore, as shown in FIG. 6, after adding the baffle, the leakage exponent is much smaller than that without the baffle, i.e., the leakage in the far field is smaller than that without the baffle for the same listening volume, and the ability of leakage reduction is obviously enhanced.

The following will be specific in relation to FIG. 7-FIG. 12 for the situation where at least part of the sound production component of the earphone covers the antihelix in the wearing state.

Figure 8:
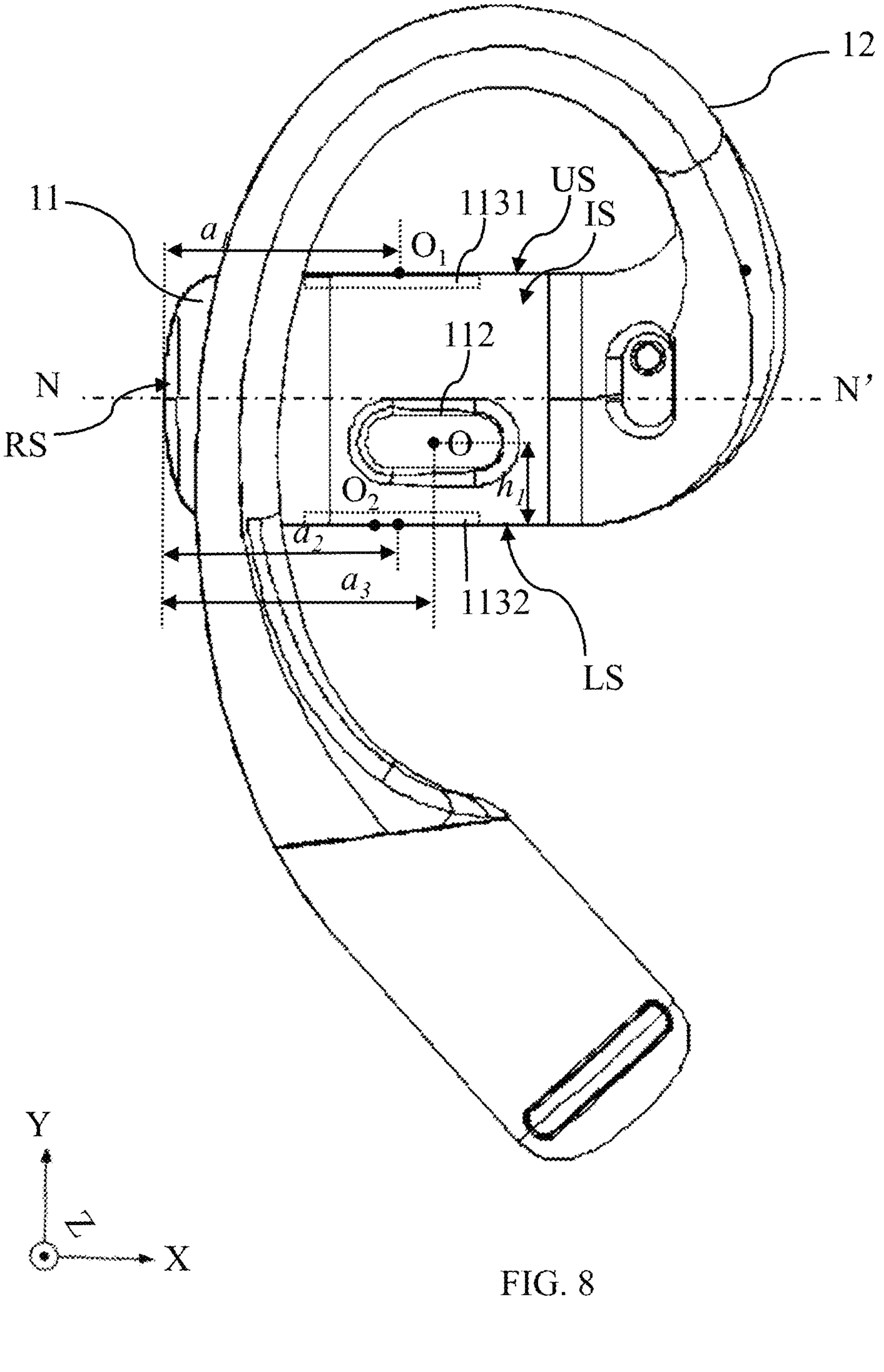
FIG. 8 is a schematic diagram illustrating an exemplary structure that facing an car of a user of the earphone shown in FIG. 7.

FIG. 7 is a schematic diagram illustrating exemplary wearing of the earphone according to some embodiments of the present disclosure. FIG. 8 is a schematic diagram illustrating an exemplary structure that facing an car of a user of the earphone shown in FIG. 7.

As shown in FIG. 7, the car-hook 12 is a curved structure that fits into a junction between the user's head and the car 100. The sound production component 11 (or the housing 111 of the sound production component 11) may have a connection end CE that is connected to the car-hook 12 and a free end FE that is not connected to the car-hook 12. When the earphone 10 is in a wearing state, a first portion 121 (e.g., a hooked portion of the car-hook 12) of the car-hook 12 is hooked between the auricle 100 (e.g., the helix 107) of the user and the head, and a second portion 122 (e.g., a connection portion of the car-hook 12) is attached to the car-hook 12 toward a side of the auricle 100 that is back away from the head and connects to the connection end CE of the sound production component 11 to at least partially fix the sound production component 11 at the user's antihelix 105. At this time, the sound production component 11 is located in the M1 region (illustrated in FIG. 1) above the cavum concha 102 and the car canal 101 so that the car canal of the user is in an open state. In some embodiments, when the earphone 10 is in the wearing state, the long axis direction X of the sound production component 11 may be set horizontally or nearly horizontally (similar to a position C illustrated in FIG. 2), and the free end FE of the sound production component 11 is toward the back of the user's head. At this time, a projection of the long axis direction X of the sound production component 11 on a sagittal plane may be in line with a sagittal axis direction, a projection of the short axis direction Y on the sagittal plane may be in line with a vertical axis direction, and the thickness direction Z is vertical to the sagittal plane.

Combined with FIG. 7 and FIG. 8, the sound production component 11 may have an inner side surface IS (also referred to as an inner side surface of the housing 111) facing the car 100 along the thickness direction Z in the wearing state and an outer side surface OS (also referred to as an outer side surface of the housing 111), and a connection surface connecting the inner side surface IS and the outer side surface OS. It is to be noted that the sound production component 11 may be set into a shape such as a circle, an ellipse, a rounded square, a rounded rectangle, or the like, when viewed along a direction in which a coronal axis is located (i.e., along the thickness direction Z) in the wearing state. When the sound production component 11 is provided in the shape of a circle, an ellipse, or the like, the connection surface refers to a curved side surface of the sound production component 11; and when the sound production component 11 is provided in the shape of a rounded corner square, a rounded corner rectangle, or the like, the connection surface may include a lower side surface LS (also referred to as a lower side surface of the housing 111), an upper side surface US (also referred to as an upper side surface of the housing 111), and a rear side surface RS (also referred to as a rear side surface of the housing 111). The upper side surface US and the lower side surface LS refer to a side surface of the sound production component 11 that is back away from an external car canal 101 along the short axis direction Y in the wearing state and a side surface of the sound production component 11 that is proximate to the external car canal 101, respectively; and the rear side surface RS refers to a side surface of the sound production component 11 that faces the back of the head along the long axis direction X in the wearing state. For case of description, the present disclosure provides an exemplary illustration with the sound production component 11 set in a rounded corner rectangle. A length of the sound production component 11 along the long axis direction X may be greater than a width of the sound production component 11 along the short axis direction Y. In some embodiments, in order to enhance the aesthetics of an earphone and the wearing comfort, the rear side surface RS of the earphone may be curved.

A transducer may be provided within the sound production component 11, which may convert an electrical signal into a corresponding mechanical vibration to produce a sound. The transducer (e.g., a diaphragm) may separate the housing 111 to form a front cavity and a rear cavity of the earphone. Phases of sounds produced in the front and rear cavities are opposite. In some embodiments, the sound outlet hole 112 acoustically coupled to the front cavity is provided on the inner side surface IS to transmit the sound generated in the front cavity out of the housing 111 and then into the car canal so that the user may hear the sound. In some embodiments, one or more pressure relief holes 113 acoustically coupled to the rear cavity may be provided on other side surfaces of the housing 111 (e.g., an outer side surface OS, an upper side surface US, or lower side surface LS, etc.) for interfering with a sound generated by the rear cavity after it is transmitted out of the housing 111 to cancel with a sound leaking through the sound outlet hole 112 in a far field. The pressure relief hole 113 is so provided that the pressure relief hole 113 is located farther away from the car canal than the sound outlet hole 112 to attenuate an inverse phase cancellation between a sound outputted through the pressure relief hole 113 and a sound outputted through the sound outlet hole 112 at a listening position, e.g., the car canal, so as to increase a volume of a sound at the listening position. In some embodiments, in order to improve the fit of the earphone 10 to the car 100 and to improve the stability of the earphone 10 when being worn, the inner side surface IS of the housing 111 may be crimped to a surface of the car 100 (e.g., the antihelix 105) to increase a resistance of the earphone 10 from dropping from the car 100. In some embodiments, in conjunction with FIG. 7 and FIG. 8, when the earphone 10 is crimped to the antihelix 105, in order to keep the sound outlet hole 112 on the inner side surface IS not being blocked by the car 100, a projection of the sound outlet hole 112 on the sagittal plane may partially or fully coincide with a projection of an inner concave structure of the car 100 (e.g., the cymba conchae 103) on the sagittal plane. In some embodiments, since the cymba conchae 103 is connected to the cavum concha 102 and the car canal is located within the cavum concha 102, when at least a portion of a projection of the sound outlet hole 112 on the sagittal plane is located within the cymba conchae 103, a sound output from the sound outlet hole 112 may reach the car canal without obstruction, resulting in a high volume received by the car canal.

The sound outlet hole 112 connected to the front cavity may be regarded as a point sound source A1 as shown in FIG. 5, the pressure relief hole 113 connected to the rear cavity may be regarded as a point sound source A2 as shown in FIG. 5, and the car canal may be regarded as a listening position as shown in FIG. 5. Phases of the sound output from the sound outlet hole 112 and the sound output from the pressure relief hole 113 are opposite, thereby forming a dipole. When the earphone is worn by the user, the sound outlet hole is located on an inner side surface IS of the sound production component 11 toward or near the user's car canal, and the pressure relief hole is located on other side surfaces of the sound production component 11 away from or back from the user's car canal. At least a portion of the housing 111 and/or at least a portion of the auricle 100 of the sound production component 11 (e.g., the cymba conchae 103, the antihelix 105, and the crus of helix 1071, etc., in a sound propagation path) may be considered as a baffle as shown in FIG. 5. As far as the listening effect is concerned, the baffle increases an acoustic range from the pressure relief hole 113 to the car canal, i.e., it increases an acoustic range difference between a sound at the sound outlet hole 112 and a sound at the pressure relief hole 113, and reduces an intensity of the sound output from the pressure relief hole 113 at the car canal, so that the extent to which the sound output from the sound outlet hole 112 and the sound output from the pressure relief hole 113 interfere to cancel each other at the car canal is reduced, thereby increasing the intensity of the sound at the car canal. In terms of the sound leakage effect, the sound output from the sound outlet hole 112 does not need to bypass the sound production component 11 to interfere with the sound output from the pressure relief hole 113 over a large spatial range in the outside world (similar to the case without a baffle), the sound leakage is not significantly increased. Thus, by setting the sound production component 11, the sound outlet hole 112, and the pressure relief hole 113 thereon at a suitable position relative to the auricle 100, it is possible to maintain the far-field sound leakage reduction effect while significantly increasing the volume of the sound.

In some embodiments, an area of a first projection of the sound production component 11 on the sagittal plane in the wearing state may be within a range of 236 $mm^2$-565 $mm^2$. In some embodiments, in order to avoid that the area of the first projection of the sound production component 11 on the sagittal plane is too small, which results in a poor baffling effect thereof, and to avoid that the area of the first projection of the sound production component 11 on the sagittal plane is too large to cover the car canal, which affects the user's access to a sound in the external environment, in the wearing state, the area of the first projection of the sound production component 11 on the sagittal plane may be in a range of 250 $mm^2$ to 550 $mm^2$. In some embodiments, the area of the first projection of the sound production component 11 on the sagittal plane in the wearing state may be in a range of 270 $mm^2$-500 $mm^2$. In some embodiments, the area of the first projection of the sound production component 11 on the sagittal plane in the wearing state may be in a range of 290 $mm^2$-450 $mm^2$. In some embodiments, the area of the first projection of the sound production component 11 on the sagittal plane in the wearing state may be in a range of 320 $mm^2$-410 $mm^2$.

With reference to FIG. 7, it is considered that when a long-axis dimension of the sound production component 11 along the long axis direction X or the short axis direction Y is too small, a volume of the sound production component 11 is relatively small, so the area of the transducer (e.g., the diaphragm) provided inside is small, resulting in the low vibration efficiency of the transducer to generate the sound, affecting the acoustic output effect of the earphone 10. The short-axis dimension of the sound production component being small 11 also results in a distance between the sound outlet hole 112 on the sound production component 11 and the car canal being too large, resulting in the car canal receiving the sound at a low volume. And, when the long-axis dimension of the sound production component 11 is too small or the short-axis dimension is too small, the distance between the sound-producing aperture 112 and the pressure relief aperture 113 of the sound production component 11 is small, resulting in a small acoustic range difference of the sound at the sound-producing aperture 112 and the pressure relief aperture. The difference between the sound range of the sound emitting portion 11 and the sound at the pressure relief hole is small, affecting the volume of the sound heard at the user's car canal. And when the long-axis dimension of the sound production component 11 is too large, it may cause the free end FE of the sound production component 11 to extend out of the user's auricle 100, which affects the fitting effect of the sound production component 11 with the car 100, and thus causes the problem of discomfort in wearing. And when the short-axis dimension of the sound production component 11 is too large, a mass of the sound production component 11 may be large, which affects the stability of the user when wearing the earphone 10. Therefore, in some embodiments, in order to enable the user to have a better quality of acoustic output and wearing comfort and stability when wearing the earphone 10, the long-axis dimension and the short-axis dimension of the sound production component 11 need to be set in a suitable size range. In some embodiments, the long-axis dimension of the sound production component 11 may be in a range of 21 mm-33 mm. In some embodiments, the long-axis dimension of the sound production component 11 may be in a range of 21.5 mm-31 mm. In some embodiments, the long-axis dimension of the sound production component 11 may be in a range of 21.5 mm-26.5 mm. Correspondingly, in some embodiments, the short-axis dimension of the sound production component 11 may be in a range of 11 mm-18 mm. In some embodiments, the short-axis dimension of the sound production component 11 may be in a range of 11.5 mm-16.5 mm. In some embodiments, the short-axis dimension of the sound production component 11 may be in a range of 11.5 mm-16 mm. It should be noted that as described herein the long-axis dimension and the short-axis dimension of the sound production component 11 may be dimensions of the first projection of the sound production component 11 on the sagittal plane along the long axis direction X and along the short axis direction Y, respectively.

In addition, when the long-axis dimension of the sound production component 11 is too small, there is a gap of a rear side surface of the sound production component 11 relative to an inner contour 1072 of the auricle, and the sound emitted from the sound outlet hole 112 and the sound emitted from the pressure relief hole 113 may cause an acoustic short-circuit to occur in a region between the rear side surface of the sound production component 11 and the inner contour 1072 of the car, resulting in a decrease in a listening volume at the user's car canal, and the larger the region between the rear side surface of the sound production component 11 and the inner contour 1072 of the car is, the more pronounced the phenomenon of acoustic short-circuit is. It can be understood that when worn by the user, if a distance between the rear side surface of the sound production component 11 and the inner contour 1072 of the car along the X-direction is too large, it will result in that the rear side surface of the sound production component 11 is not able to rest against the inner contour 1072 of the ear. This also results in the auricle not being able to act as a restriction on the sound production component 11, so the sound production component 11 is prone to falling off. It should be noted that the inner contour 1072 of the auricle refers to an inner wall of the helix, and the distance between the rear side surface of the sound production component 11 and the inner contour 1072 of the auricle refers to a shortest distance between a projection of the rear side surface on the sagittal plane and a projection of the inner contour 1072 on the sagittal plane along the X-direction, e.g., a shortest distance between a midpoint of the projection of the rear side surface on the sagittal plane and the projection of the inner contour 1072 on the sagittal plane along the X-direction. In some embodiments, the distance between the rear side surface of the sound production component 11 and the inner contour 1072 of the auricle may be no greater than 8 mm to provide the earphone with a good wearing stability. In some embodiments, the distance between the rear side surface of the sound production component 11 and the inner contour 1072 of the auricle may be in a range of 0 mm-6 mm. In some embodiments, the distance between the rear side surface of the sound production component 11 and the inner contour 1072 of the auricle may be in a range of 0 mm-5.5 mm. In some embodiments, the distance between the rear side surface of the sound production component 11 and the inner contour 1072 of the auricle may be 0. When the distance is equal to 0, it means that the rear side surface of the sound production component 11 abuts against the inner contour 1072 of the auricle, and at this time, the sound production component 11 abuts against the inner contour 1072 of the auricle in the wearing state, so as to improve the stability of the earphone when it is worn. Additionally, it is possible to make the region between the rear side surface of the sound production component 11 and the inner contour 1072 of the auricle as small as possible in order to reduce a region of acoustic short-circuit around the sound production component 11 so as to increase the volume of the sound heard in the car canal of the user.

Figure 10:
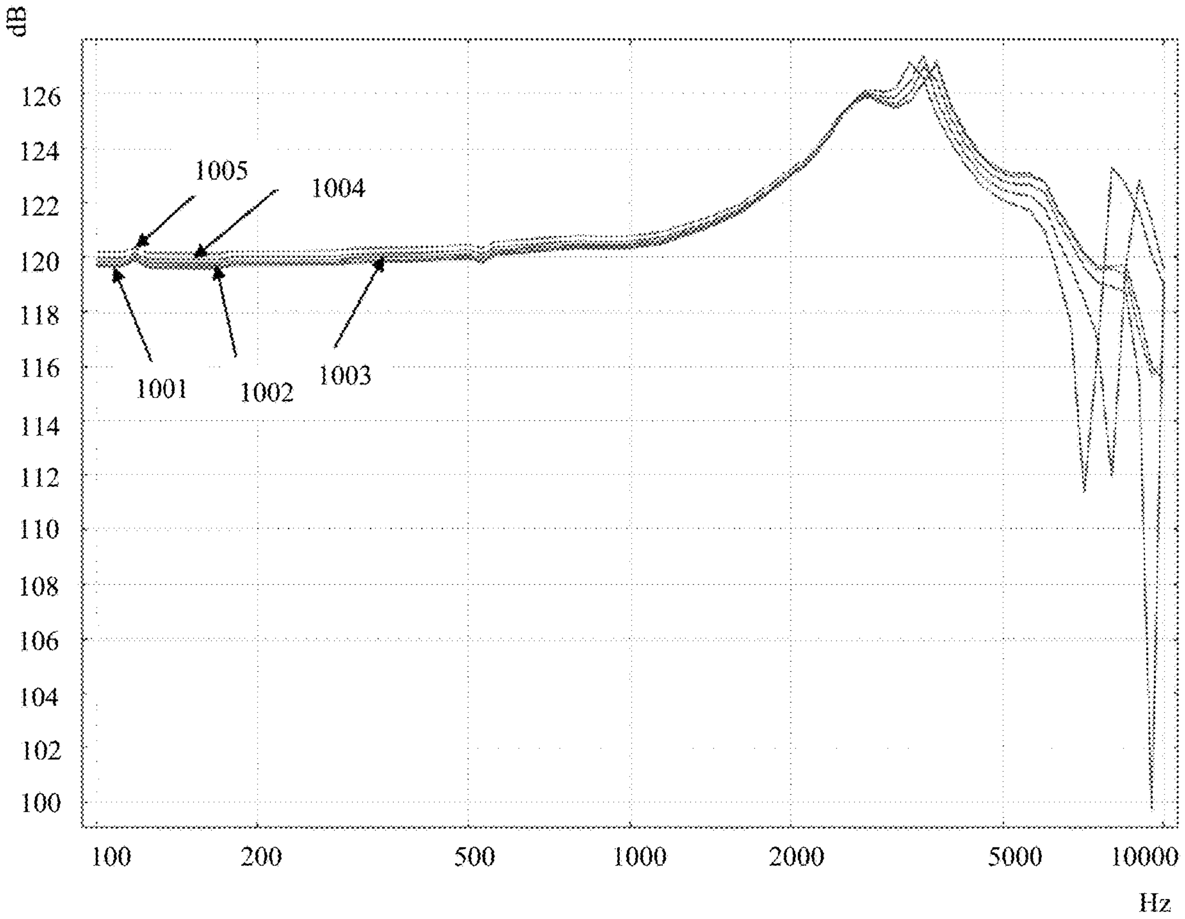
FIG. 10 is a schematic diagram illustrating exemplary frequency response curves corresponding to different ratios of a dimension of a first projection along a long axis to a dimension of the first projection along a short axis according to some embodiments of the present disclosure.

FIG. 10 is a schematic diagram illustrating exemplary frequency response curves corresponding to different ratios of a long-axis dimension to a short-axis dimension of a first projection of the sound production component 11 on a sagittal plane when an area of the first projection of the sound production component on the sagittal plane is certain (e.g., 119 $mm^2$). In FIG. 10, a horizontal coordinate indicates a frequency in Hz, and a vertical coordinate indicates a total sound pressure level in dB corresponding to different ratios of the long-axis dimension to the short-axis dimension of the first projection of the sound production component 11 on the sagittal plane. In order to facilitate the differentiation of different frequency response curves, frequency response curves shown from top to bottom in FIG. 10 in a range of 100 Hz-1000 Hz here correspond to 1005, 1004, 1003, 1002, and 1001, respectively. The curve 1001 is a frequency response curve corresponding to the ratio of the long-axis dimension of the first projection to the short-axis dimension of the first projection being 4.99 (i.e., the long-axis dimension of the first projection is 24.93 mm and the short-axis dimension of the first projection is 4.99 mm), the curve 1002 is a frequency response curve corresponding to the ratio of the long-axis dimension of the first projection to the short-axis dimension of the first projection being 3.99 (i.e., the long-axis dimension of the first projection is 22.43 mm, and the short-axis dimension of the first projection is 5.61 mm), and the curve 1003 is a frequency response curve corresponding to the ratio of the long-axis dimension of the first projection to the short-axis dimension of the first projection being 3.04 (i.e., the long-axis dimension of the first projection is 19.61 mm and the short-axis dimension of the first projection is 6.54 mm), the curve 1004 is a frequency response curve corresponding to the ratio of the long-axis dimension of the first projection to the short-axis dimension of the first projection being approximately 2.0 (i.e., the long-axis dimension of the first projection is 16.33 mm and the short-axis dimension of the first projection is 8.16 mm), and the curve 1005 is a frequency response curve corresponding to the ratio of the long-axis dimension of the first projection to the short-axis dimension of the first projection being 1.0 (i.e., the long-axis dimension of the first projection is 12.31 mm and the short-axis dimension of the first projection is 12.31 mm). According to FIG. 10, it can be seen that resonance frequencies corresponding to the frequency response curves 1001-1005 are more or less the same (all are about 3500 Hz), but when the ratio of the long-axis dimension of the first projection to the short-axis dimension of the first projection is in a range of 1.0-3.0, the frequency response curve of the sound production component 11 is smooth overall and has a good frequency response at 100 Hz-3500 Hz, and when the frequency is 5000 Hz, the larger the ratio of the long-axis dimension of the first projection to the short-axis dimension of the first projection is, the faster the sound frequency response of the sound production component 11 decreases at an car canal. Based on this, in some embodiments, in order to enable a user to experience a good acoustic output effect when wearing the earphone, a ratio of the long-axis dimension of the first projection of the sound production component 11 on the sagittal plane to a short-axis dimension of a projection of the sound production component 11 on the sagittal plane may be in a range of 1.0 to 3.0. In some embodiments, considering that the smaller the ratio of the long-axis dimension of the first projection of the sound production component 11 on the sagittal plane to the short-axis dimension of the projection of the sound production component 11 on the sagittal plane, the larger the short-axis dimension of the projection of the sound production component 11 on the sagittal plane, and since the short-axis dimension of the projection of the sound production component 11 on the sagittal plane being too large may result in the sound production component 11 being unable to extend into the user's cavum concha well, which in turn causes instability and discomfort in wearing the device, so in order to ensure the stability and comfort in wearing the device, the ratio of the long-axis dimension of first projection of the sound production component 11 on the sagittal plane to the short-axis dimension of the projection of the sound production component 11 on the sagittal plane may be in a range of 1.4 to 2.5. In some embodiments, the ratio of the long-axis dimension of the first projection of the sound production component 11 on the sagittal plane to the short-axis dimension of the projection of the sound production component 11 on the sagittal plane may be in a range of 1.4 to 2.3. In some embodiments, the ratio of the long-axis dimension of the first projection of the sound production component 11 on the sagittal plane to the short-axis dimension of the projection of the sound production component 11 on the sagittal plane may be in a range of 1.45 to 2.0. It will be appreciated that the sound production component 11, when having different aspect ratios, the first projection of the sound production component 11 on the sagittal plane may have different overlapping ratios with a projection of the cavum concha on the sagittal plane, and in some embodiments, by controlling the ratio of the long-axis dimension of the first projection to the short-axis dimension of the first projection of the sound production component 11 on the sagittal plane to be in a range of 1.4 to 3, a projection area of the sound production component 11 on the sagittal plane in a normal wearing state may be made to be relatively moderate, which can not only prevent the projection area of the sound production component 11 on the sagittal plane from being too small to cause a dimension of a leakage structure between the sound production component 11 and the cavum concha to be large, which results in a low listening volume at the car canal, it can also prevent the projection area of the sound production component 11 on the sagittal plane from being too large to make the car canal unable to maintain an open state, which affects the user's access to a sound in an external environment, so as to enable the user to have a better acoustic experience.

It should be noted that the frequency response curves measured in FIG. 10 are obtained by simulation experiments, where the human auditory system is simulated by the model of the full-band human car simulator of the P.574.3 type, and the human car is simulated by the car contour defined by the ITU-TP.57 standard definition of the auricle to simulate the human car, which incorporates the geometry of the car canal. In addition, the frequency response curves corresponding to the ratios of different long-axis dimensions to short-axis dimensions measured in the embodiments of the present disclosure are measured by changing different long-axis dimensions and short-axis dimensions at a certain wearing angle (an angle between the upper side surface or the lower side surface and the sagittal axis) of the sound production component and a certain wearing position.

In some embodiments, a dimension of the sound production component 11 along the thickness direction Z may also have an impact on the listening effect of the earphone worn by the user, as will be further illustrated in connection with FIG. 11 below.

Figure 11:
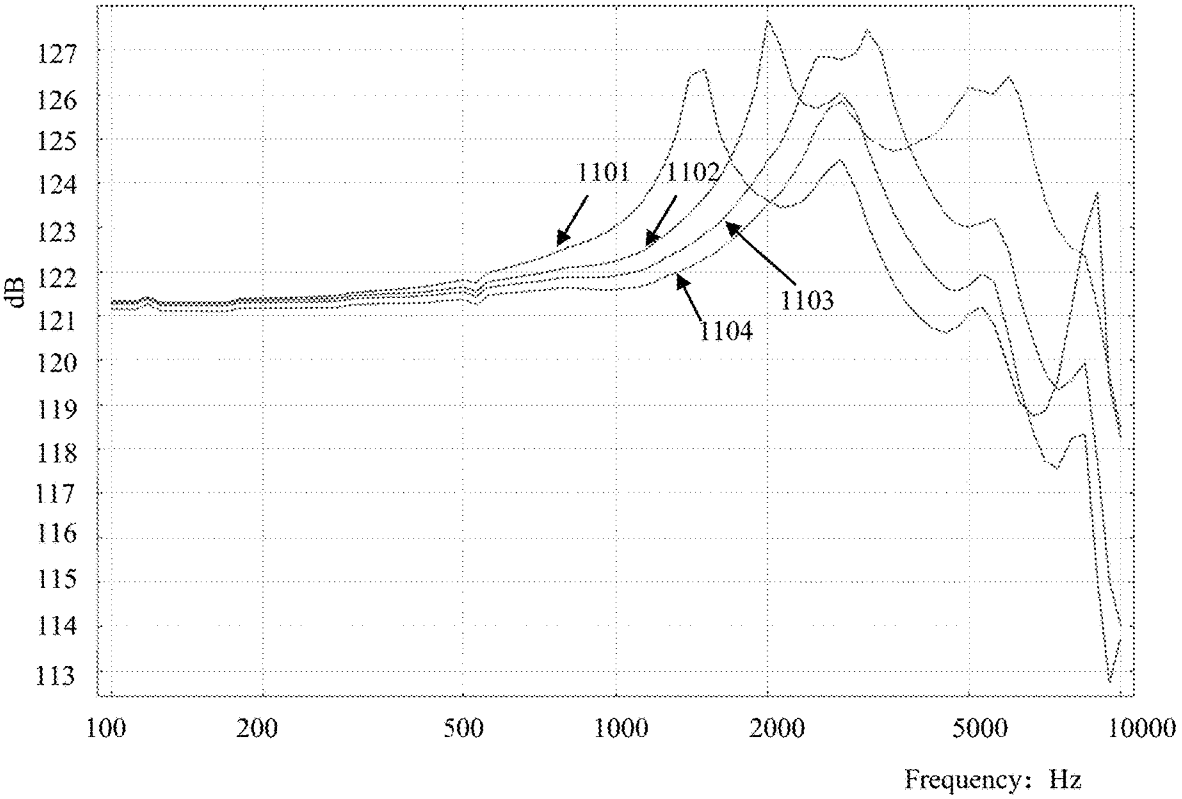
FIG. 11 is a frequency response curve of a sound production component when the sound production component has different dimensions along a thickness direction according to some embodiments of the present disclosure.

FIG. 11 is a frequency response curve of the sound production component 11 when the sound production component 11 has different dimensions along the thickness direction Z and an area of a first projection of the sound production component 11 on a sagittal plane is certain and a ratio of a long-axis dimension to a short-axis dimension of the first projection is certain. In FIG. 11, a horizontal coordinate indicates a frequency (in Hz), and a vertical coordinate indicates a sound pressure level (in dB) at an car canal at different frequencies. A frequency response curve 1101 is a frequency response curve corresponding to when a dimension of the sound production component 11 along the thickness direction Z (also referred to as a thickness) is 20 mm, a frequency response curve 1102 is a frequency response curve corresponding to when a thickness of the sound production component 11 is 11 mm, and a frequency response curve 1102 is a frequency response curve corresponding to when the thickness of the sound production component 11 is 5 mm, and a frequency response curve 1104 is a frequency response curve corresponding to when the thickness of the sound production component 11 is 1 mm. The thickness of the sound production component 11 is directly proportional to a thickness of a front cavity of the sound production component 11, and the smaller the thickness of the front cavity is, the greater the resonance frequency of a resonance peak of the front cavity, and the flatter the frequency response curve is at a low frequency range (110 Hz-1100 Hz). In some embodiments, a sound outlet hole is acoustically coupled to the front cavity, and a sound in the front cavity is transmitted through the sound outlet hole to be received by the user's auditory system the car canal. If the thickness of the sound production component 11 is too large, a resonance frequency corresponding to a resonance peak of the front cavity corresponding to the sound production component 11 is too small, which affects the acoustic performance of the sound production component 11 in a low frequency band. In addition, when in a wearing state, an overall dimension or weight of the sound production component 11 is large, which affects the stability and comfort of wearing. When the thickness of the sound production component 11 is too small, a space between front and rear cavities of the sound production component 11 is limited, which affects a vibration amplitude of a diaphragm, and may limit the output of the sound production component 11 at a large amplitude and low frequency. Based on this, in order to ensure that the sound production component 11 can have a good acoustic output effect as well as to ensure stability when being worn, in some embodiments, the thickness of the sound production component 11 may be in a range of 2 mm-20 mm. In some embodiments, the thickness of the sound production component 11 may be in a range of 5 mm-15 mm. In some embodiments, the thickness of the sound production component 11 may be in a range of 6 mm-12 mm. It is to be noted that, in the wearing state, when at least one side surface of two side surfaces of the sound production component 11 set opposite along the thickness direction Z (i.e., an inner side surface facing the user's car and an outer side surface back away from the user's car) is non-planar, the thickness of the sound production component 11 refers to a maximum distance between the inner side surface and the outer side surface of the sound production component 11 along the thickness direction Z.

It should be noted that the frequency response curves corresponding to different thicknesses measured in the embodiments of the present disclosure are measured by changing the dimension of the sound production component along the thickness direction when a wearing angle of the sound production component(an angle between the upper side surface US or the lower side surface LS and the long-axis direction X, e.g. the angle between the upper side surface US and the long-axis direction X is 0°), a wearing position, and the long-axis dimension and the short-axis dimension are certain.

When the long-axis dimension of the sound production component 11 is determined, or, in other words, a dimension of a gap of the rear side surface of the sound production component 11 relative to the inner contour 1072 of an auricle is determined, i.e., a distance between the rear side surface of the sound production component 11 and the inner contour 1072 of the auricle is not greater than 8 mm, in this configuration, to prevent the sound outlet hole 112 from being blocked by a structure (e.g., the cymba conchae 103) of the car 100 in the wearing state, it may make a projection of the sound outlet hole 112 on the sagittal plane when the earphone 10 is worn to be able to be located partially or wholly within a projection area of an inner concave structure of the car 100 on the sagittal plane, and, on this basis, since at least a portion of the sound production component 11 is located at an antihelix, the sound outlet hole 112 transmits a sound downwardly (along the Y-direction toward the user's earlobe) to the user's car canal, the pressure relief hole 113 should be disposed away from the sound outlet hole 112 to prevent a sound emitted from the pressure relief hole 113 from being canceled out at a listening position (i.e., the car canal) by a sound emitted from the sound outlet hole 112, which results in a diminishing of a volume at the listening position. Therefore, in some embodiments, when the distance between the rear side surface of the sound production component 11 and the inner contour 1072 of the auricle is not greater than 8 mm, in order to ensure that the user can stably wear the earphone 10 while obtaining the sound from the sound outlet hole 112 in an unobstructed way and avoid that the sound of the pressure relief hole 113 attenuates the sound of the sound outlet hole 112 at the car canal to enhance the listening volume, a distance a3 between a center O of the sound outlet hole 112 and the rear side surface RS of the sound production component 11 along the X-direction is in a range of 9.5 mm to 15.0 mm, and a distance between a center of the pressure relief hole 113 and the rear side surface RS may be in a range of 8.60 mm to 12.92 mm, so that the sound outlet hole 112 and the pressure relief hole 113 may be staggered along the X-direction and the pressure relief hole 113 is set away from the sound outlet hole 112. In some embodiments, in order to reduce a region between the rear side surface of the sound production component 11 and the inner contour 1072 of the auricle, and to attenuate the phenomenon of acoustic short-circuit, a distance between the rear side surface of the sound production component 11 and the inner contour 1072 of the auricle may be in a range of 0 mm-6 mm, and in this configuration, since the rear side surface is closer to the inner contour 1072, a distance between the sound outlet hole 112 and the rear side surface should be larger to ensure that the sound outlet hole 112 correspondingly located at the inner concave structure of the car 100, and on this basis, a distance between the pressure relief hole 113 and the rear side surface may be small or unchanged, so as to avoid the pressure relief hole 113 from being blocked by a structure of the car 100 (e.g., the crus of helix 1071). Thus, when the distance between the rear side surface of the sound production component 11 and the inner contour 1072 of the auricle is in a range of 0 mm-6 mm, the distance a3 between the center O of the sound outlet hole 112 and the rear side surface RS of the sound production component 11 along the X-direction may be in a range of 11.0 mm to 15.0 mm, and the distance between the center of the pressure relief hole 113 and the rear side surface RS may be in a range of 8.60 mm to 11.92 mm. In some embodiments, in order to make the rear side surface of the sound production component 11 against the inner contour 1072 of the auricle to improve the stability of the earphone when worn and to try to eliminate the region of acoustic short-circuit between the rear side surface of the sound production component 11 and the inner contour 1072 of the auricle, the distance between the rear side surface of the sound production component 11 and the inner contour 1072 of the auricle may be 0, in such configuration, the distance between the sound outlet hole 112 and the rear side surface is further increased and the distance between the pressure relief hole 113 and the rear side surface may be moderately reduced or unchanged to further increase the distance between the sound outlet hole 112 and the pressure relief hole 113 while avoiding the pressure relief hole 113 being blocked by the car 100 (e.g., the crus of helix 1071, the helix 107). Thereby, when the distance between the rear side surface of the sound production component 11 and the inner contour 1072 of the auricle is 0 mm, the distance a3 between the center O of the sound outlet hole 112 and the rear side surface RS of the sound production component 11 along the X-direction may range from 12.0 mm to 15.0 mm, and the distance between the center of the pressure relief hole 113 and the rear side surface RS may be 10.60 mm to 11.82 mm.

It is to be known that, since the sound outlet hole 112 and the pressure relief hole 113 are disposed on the housing 111, and each side surface of the housing 111 has a certain thickness, the sound outlet hole 112 and the pressure relief hole 113 are holes having a certain depth. At this time, the sound outlet hole 112 and the pressure relief hole 113 may both have inner openings and outer openings. For case of description, in the present disclosure, the center O of the sound outlet hole 112 refers to a centroid of an outer opening of the sound outlet hole 112, and the center of the pressure relief hole 113 refers to a centroid of an outer opening of the pressure relief hole 113 (e.g., a center $O_1$ of the first pressure relief hole 1131 refers to a centroid of an outer opening of the first pressure relief hole 1131, and a center $O_2$ of the second pressure relief hole 1132 refers to a centroid of an outer opening of the second pressure relief hole 1132). When the rear side surface RS is a curved surface, a distance between a position (e.g., the center O of the sound outlet hole 112, the center $O_1$ of the first pressure relief hole 1131, the center $O_2$ of the second pressure relief hole 1132, etc.) and the rear side surface RS refers to a distance between that position to a tangent surface of the rear side surface RS that is furthest from a center of the sound production component and parallel to a short axis of the sound production component.

When the short-axis dimension of the sound production component 11 is determined, i.e., the short-axis dimension of the sound production component 11 is in a range of 11 mm-18 mm, in this configuration, in order to enhance an intensity (volume) of a sound of the sound outlet hole 112 at the car canal (i.e., the listening position), the sound outlet hole 112 is provided at a position closer to the car canal, i.e., the sound outlet hole 112 may be closer to the lower side surface LS of the sound production component 11 along the Y-direction, at which point the pressure relief hole 113 may be provided at a position away from the sound outlet hole 112, e.g., the pressure relief hole 113 may be provided at a position far away from the sound outlet hole 112 on the outer side surface OS or the upper side surface US. Therefore, in some embodiments, the short-axis dimension of the sound production component 11 is in a range of 11 mm to 18 mm, and a distance h1 between the center O of the sound outlet hole 112 and the lower side surface LS of the sound production component 11 along the Y-direction ranges from 2.3 mm to 3.6 mm. In some embodiments, the short-axis dimension of the sound production component 11 may be reduced to reduce a mass of the sound production component 11, on this basis, the distance between the center O of the sound outlet hole 112 and the lower side surface LS of the sound production component 11 along the Y-direction may be further reduced to enable the sound outlet hole 112 to be close to the car canal, so that the short-axis dimension of the sound production component 11 is in a range of 11.5 mm-16.5 mm, and the distance h1 between the center O of the sound outlet hole 112 and the lower side surface LS of the sound production component 11 along the Y-direction is in a range of 2.5 mm-3.2 mm. In some embodiments, similarly, the short-axis dimension of the sound production component 11 is in a range of 11.5 mm to 16 mm, and the distance h1 between the center O of the sound outlet hole 112 and the lower side surface LS of the sound production component 11 along the Y-direction is in a range of 2.8 mm to 3.1 mm. It is to be noted that the long-axis dimension and the short-axis dimension of the sound production component 11 described in the present disclosure refer to a dimension of the first projection of the sound production component 11 on the sagittal plane along the long-axis direction X and the short-axis direction Y, respectively.

By limiting the short-axis dimension of the sound production component 11 and limiting the distance between the sound outlet hole 112 and the lower side surface LS of the sound production component 11, it may make the sound outlet hole 112 provided on the sound production component 11 to be located near to the car canal, thereby increasing a listening volume at the car canal.

In some embodiments, when the sound outlet hole 112 on the sound production component 11 is provided close to the car canal, in order to avoid the sound output hole 112 from being obstructed by tissue of the car 100 in the wearing state, it is possible to make the projection of the sound outlet hole 112 on the sagittal plane partially or wholly located within the projection area of the inner concave structure (e.g., the cymba conchae 103) of the car 100 when wearing the earphone 10. In some embodiments, when the projection of the sound outlet hole 112 on the sagittal plane in the wearing state is partially or wholly located within a projection area of the cymba conchae 103 on the sagittal plane, i.e., the sound outlet hole 112 at least partially faces directly the cymba conchae 103 in the wearing state, a distance between the center of the sound outlet hole 112 and an upper vertex M of the car-hook 12 along the Y-direction ranges from 17.5 mm to 27.0 mm, where the upper vertex of the car-hook 12 refers to a point on the car-hook 12 that is closest to the head along the vertical axis. In this configuration, the sound production component 11 should be set close to the car canal to enhance the listening volume. The effect of a distance between the sound production component 11 and the car canal on the listening volume will be illustrated herein in connection with FIG. 12, the distance between the sound production component 11 and the car canal is characterized in terms of a ratio of an overlapping portion of the sound production component 11 to a projection area of the cavum concha on the sagittal plane, the overlapping portion is an overlapping portion of a projection of the sound production component 11 on the sagittal plane and a projection of the cavum concha on the sagittal plane. It will be appreciated that the higher the ratio of the overlapping area of the sound production component 11 to the projection area of the cavum concha on the sagittal plane, the lower the distance between the sound production component 11 and the car canal.

Figure 12:
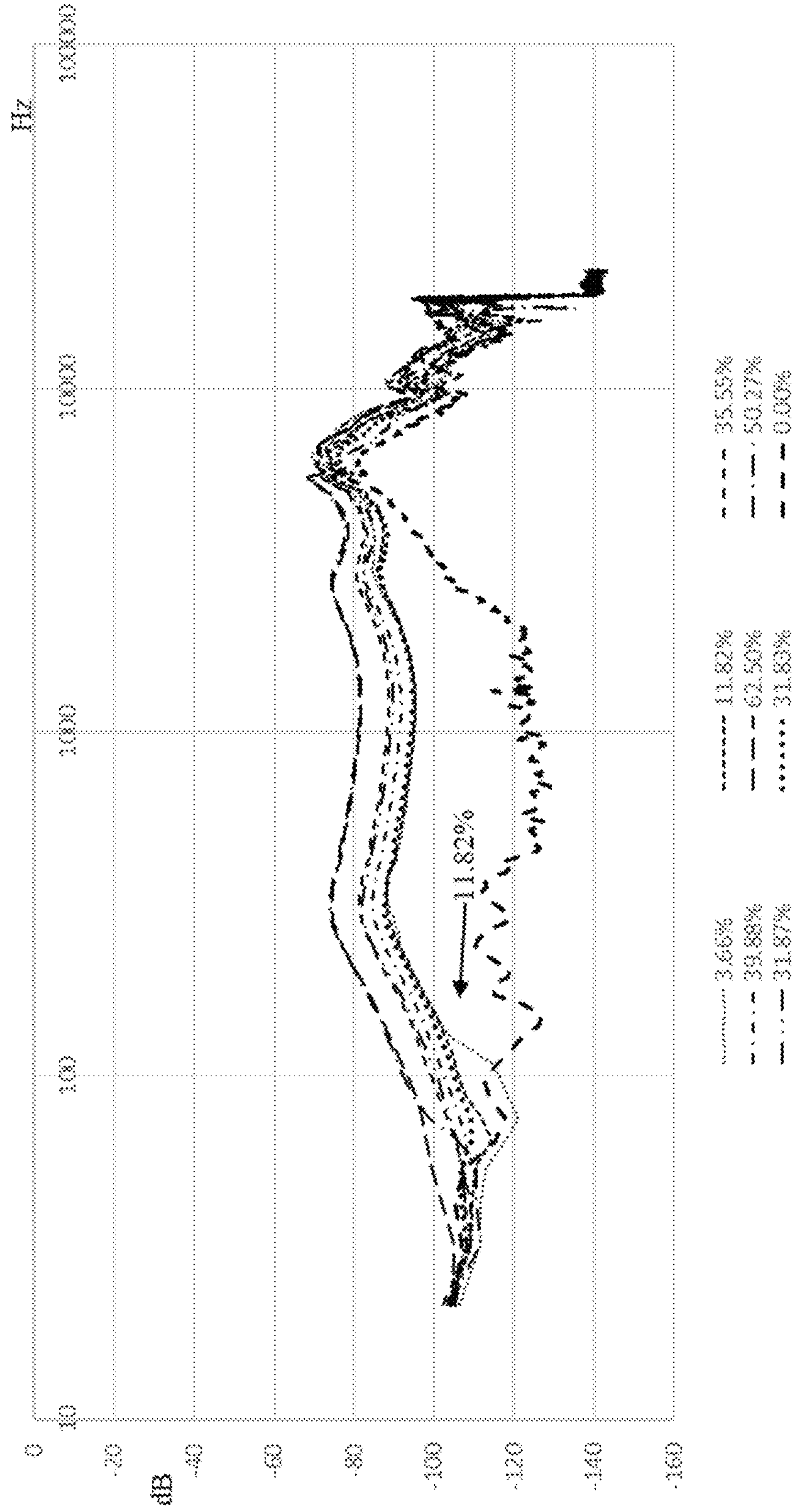
FIG. 12 is a schematic diagram illustrating exemplary frequency response curves corresponding to different overlapping ratios of a first projection and a projection of a cavum concha on a sagittal plane according to some embodiments of the present disclosure.

FIG. 12 is a schematic diagram illustrating exemplary frequency response curves corresponding to different ratios of an area of an overlapping portion to a projection area of a cavum concha on a sagittal plane in a wearing manner in which at least a portion of the sound production component covers an antihelix according to some embodiments of the present disclosure. In FIG. 12, a horizontal coordinate indicates a frequency in Hz, and a vertical coordinate indicates a measured sound pressure level in dB at different frequencies in an car canal. As can be seen from FIG. 12, in a specific experiment, due to a certain three-dimensional structure and overall dimension of the sound production component 11, in order to ensure that an area of a first projection of the sound production component 11 on the sagittal plane is a constant value, here experimental values for different coverage ratios are obtained by translating along the sagittal and/or vertical axes. The translation may cause a change in a position of the sound production component 11 with respect to the antihelix, and if the ratio of the area of the overlapping portion of the sound production component 11 to the projection area of the cavum concha on the sagittal plane is large, it means that the sound production component 11 may be close to the car canal. Continuing to refer to FIG. 12, when the ratio of the area of the overlapping portion of the sound production component 11 to the projection area of the cavum concha on the sagittal plane is not less than 11.82%, as compared to the ratio of being less than 11.82%, a listening volume at the car canal has a significant improvement, i.e., the sound production component 11 may produce a better frequency response even when a part of the cavum concha and the antihelix are covered by the sound production component 11 at the same time. Based on this, in some embodiments, in order to avoid the sound outlet hole 112 from being blocked by a structure of the car 100 in the wearing state and to provide the user with a good listening effect when wearing the earphone, a distance between the center O of the sound outlet hole 112 and the upper vertex M of the car-hook 12 along the Y-direction ranges from 17.5 mm to 27.0 mm, and the ratio of the area of the overlapping portion to the projection area of the cavum concha on the sagittal plane needs to be not less than 11.82% while the sound production component 11 covers the antihelix. In some embodiments, on the premise that at least a portion of the sound outlet hole 112 correspondingly is located at an inner concave structure of the car 100, it may set the sound outlet hole 112 disposed as close as possible to the car canal, i.e., to increase the distance between the center O of the sound outlet hole 112 and the upper vertex M of the car-hook 12 along the Y-direction, and at the same time increasing the ratio of the area of the overlapping portion of the sound production component 11 to the projection area of the cavum concha on the sagittal plane, so as to further enhance the listening volume, so that the distance between the center O of the sound outlet hole 112 and the upper vertex M of the car-hook 12 along the Y-direction ranges from 20.0 mm to 27 mm, and the ratio of the area of the overlapping portion of the sound production component 11 to the projection area of the cavum concha on the sagittal plane may be not less than 31.83%. Considering that the ratio of the area of the overlapping portion of the sound production component 11 to the projection area of the cavum concha on the sagittal plane is too large, the sound production component 11 may cover the car canal, which may not be able to keep the car canal in a fully open state, and may affect the user's access to a sound in an external environment. In some embodiments, it is possible to limit the ratio of the area of the overlapping portion of the sound production component 11 to the projection area of the cavum concha on the sagittal plane to be too large while at the same time making the sound outlet hole 112 all correspondingly located in the inner concave structure of the ear 100, and the sound outlet hole 112 disposed close to the car canal, so that when the distance between the center O of the sound outlet hole 112 and the upper apex M of the car-hook 12 along the Y-direction is in a range of 22.0 mm to 24.5 mm, the ratio of the area of the overlapping portion of the sound production component 11 to the projection area of the cavum concha on the sagittal plane is in a range of 31.83% to 62.50%. In some embodiments, when the distance between the center O of the sound outlet hole 112 and the upper apex M of the car-hook 12 along the Y-direction is in a range of 22.5 mm to 23.5 mm, the ratio of the area of the overlapping portion of the sound production component 11 to the projection area of the cavum concha on the sagittal plane is in a range of 35.55% to 45%. It should be noted that the frequency response curve corresponding to the ratio of the area of the overlapping portion of the sound production component 11 to the projection area of the cavum concha on the sagittal plane in the embodiments of the present disclosure is measured by changing a wearing position of the sound production component 11 (e.g., by translating it along the sagittal axis direction or the vertical axis direction) when a wearing angle of the sound production component (an angle between the upper side surface US or the lower side surface LS and the long-axis direction, e.g., the angle between the upper side surface US and the long-axis direction X is 0°) and the dimension of the sound production component 11 are certain.

In some embodiments of the present disclosure, by limiting the distance between the center O of the sound outlet hole 112 and the upper apex M of the car-hook 12 and by limiting the ratio of the area of the overlapping portion of the sound production component 11 to the projection area of the cavum concha on the sagittal plane, it may make the sound outlet hole 112 provided on the sound production component 11 closer to the car canal, and ensure that the sound outlet hole 112 is not blocked by the structure of the car 100 in the wearing state, so as to enhance the listening volume at the car canal.

In some embodiments, at least one of one or more pressure relief holes 113 open on a side surface of the housing 111 other than the inner side surface for acoustic coupling to a rear cavity includes the first pressure relief hole 1131, and the first pressure relief hole 1131 may be disposed on the upper side surface US, the outer side surface OS, or the lower side surface LS of the sound production component 11. In some embodiments, since the sound outlet hole 112 is disposed close to the lower side surface LS, in order to attenuate a sound output from the first pressure relief hole 1131 and a sound output from the sound outlet hole 112 to cancel with cach other at the car canal, the first pressure relief hole 1131 may be provided away from the sound outlet hole 112, or the lower side surface LS, whereby the first pressure relief hole 1131 may be provided on the upper side surface US or the outer side surface OS. In some embodiments, in order to attenuate the sound output from the first pressure relief hole 1131 and the sound output from the sound output hole 112 to cancel each other out at the car canal, and to enhance the volume at the car canal, when the first pressure relief hole 1131 is provided on the outer side surface OS, the first pressure relief hole 1131 is located in a region on the outer side surface OS that is near the upper side surface US. In some embodiments, in order to enhance the sound output from the first pressure relief hole 1131 and the sound output from the sound outlet hole 112 to cancel each other at the car canal, and to enhance the volume at the car canal, the first pressure relief hole 1131 is disposed at a region on the upper side surface US.

When the first pressure relief hole 1131 is provided on the upper side surface US, a distance between the sound outlet hole 112 and the pressure relief hole 113 and the rear side surface RS is limited, so that the pressure relief hole 113 is provided away from the sound outlet hole 112 along the X-direction, so as to increase the volume at the listening position, and similarly, the first pressure relief hole 1131 may be provided away from the sound outlet hole 112 along the Z-direction by limiting a distance between the first pressure relief hole 1131 and the inner side surface IS. Therefore, in some embodiments, a thickness of the sound production component 11 is 6 mm-12 mm, and a distance $d_1$ between the center $O_1$ of the first pressure relief hole 1131 and the inner side surface IS ranges from 4.43 mm to 7.96 mm. In some embodiments, the thickness of the sound production component 11 is in a range of 6 mm-12 mm, and the distance between the center $O_1$ of the first pressure relief hole 1131 and the inner side surface IS is further increased to make the first pressure relief hole 1131 farther away from the sound outlet hole 112 along the Z-direction, whereby the distance $d_1$ between the center $O_1$ of the first pressure relief hole 1131 and the inner side surface IS ranges from 5.43 mm to 7.96 mm. In some embodiments, to reduce an overall dimension or mass of the sound production component 11 and reduce the thickness of the sound production component 11, a maximum distance between the center $O_1$ of the first pressure relief hole 1131 and the inner side surface IS has to be reduced, and on this basis, a minimum distance between the center $O_1$ of the first pressure relief hole 1131 and the inner side surface IS is increased to ensure that the first pressure relief hole 1131 is set farther away from the sound outlet hole 112 along the Z-direction, and thus the thickness of the sound production component 11 is in a range of 5 mm-12 mm, and the distance $d_1$ between the center $O_1$ of the first pressure relief hole 1131 and the inner side surface IS ranges from 5.43 mm to 6.96 mm.

In some embodiments of the present disclosure, by limiting the thickness of the sound production component 11 and the distance between the first pressure relief hole 1131 and the inner side surface IS, the first pressure relief hole 1131 may be disposed far away from the sound outlet hole 112, so a sound from the first pressure relief aperture 1131 has a reduced effect of canceling out with a sound from the sound outlet hole 112 at the listening position (i.e. the car canal), which in turn increases the volume at the listening position.

In some embodiments, in addition to the inner side surface IS, at least two pressure relief holes 113 may be provided on other side surfaces of the housing 111 (e.g., the outer side surface OS, the upper side surface US, or the lower side surface LS, etc.), and disposing at least two pressure relief holes 113 may disrupt standing waves in the rear cavity so that a resonance frequency of a sound transmitted out of the pressure relief holes 113 to the outside of the housing 111 is as high as possible, thereby allowing the frequency response of the rear cavity to have a wide flat region (e.g., a region before a resonance peak) and obtaining a good sound leakage reduction effect in a mid-to-high frequency range (e.g., 2 kHz-6 kHz). As an example only, the pressure relief hole 113 may include a first pressure relief hole 1131 and a second pressure relief hole 1132. In some embodiments, the first pressure relief hole 1131 and the second pressure relief hole 1132 may be disposed on a same side surface of the housing 111, e.g., the first pressure relief hole 1131 and the second pressure relief hole 113 may be disposed on both the outer side surface OS, the upper side surface US, or the lower side surface LS. In some embodiments, the first pressure relief hole 1131 and the second pressure relief hole 1132 may be provided on two different side surfaces of the housing 111, for example, the first pressure relief hole 1131 may be provided on the outer side surface OS, and the second pressure relief hole 1132 may be provided on the upper side surface US, or, the first pressure relief hole 1131 may be provided on the outer side surface OS, and the second pressure relief hole 1132 may be provided on the lower side surface LS. In some embodiments, in order to maximize disruption of standing waves in the rear cavity, the two pressure relief apertures 113 may be disposed on opposing sides of the housing 111, e.g., the first pressure relief aperture 1131 may be disposed on the upper side US. The second pressure relief hole 1132 may be provided on the lower side LS. For case of description, the present disclosure will exemplarily illustrate, for example, that the first pressure relief hole 1131 is provided on the upper side surface US, and the second pressure relief hole 1132 is provided on the lower side surface LS.

Similarly to limiting the distance between the first pressure relief hole 1131 and the inner side surface IS, it is also possible to provide the second pressure relief hole 1132 away from the sound outlet hole 112 along the Z-direction by limiting a distance between the second pressure relief hole 1132 and the inner side surface IS. Since the sound production component 11 is a rectangular-like body with dimensions of the upper side surface US and the lower side surface LS being close, a distance $d_2$ between the center $O_2$ of the second pressure relief hole 1132 and the inner side surface IS is similar to the distance $d_1$ between the center $O_1$ of the first pressure relief hole 1131 and the inner side surface IS, and at the same time, in order to avoid that sounds output from both the first pressure relief hole 1131 and the second pressure relief hole 1132 affect the volume of the sound output from the sound outlet hole 112 at the listening position, the first pressure relief hole 1131 and the second pressure relief hole 1132 should be located as far away from the sound outlet hole 112 as possible, and at the same time, e.g., the center of the sound outlet hole 112 is located on or near a midperpendicular plane of a line connecting the center of the first pressure relief 1131 hole and the center of the second pressure relief hole 1132. Thus, in some embodiments, the distance $d_2$ between the center $O_2$ of the second pressure relief hole 1132 and the inner side surface IS ranges from 4.43 mm to 7.96 mm, and a distance between the center of the sound outlet hole 112 and the midperpendicular plane of the line connecting the center of the first pressure relief hole 1131 and the center of the second pressure relief hole 1132 is in a range of 0 mm to 2 mm. In some embodiments, the distance $d_2$ between the center $O_2$ of the second pressure relief hole 1132 and the inner side surface IS ranges from 5.43 mm to 7.96 mm, and the distance between the center of the sound outlet hole 112 and the midperpendicular plane of the line connecting the center of the first pressure relief hole 1131 and the center of the second pressure relief hole 1132 is in a range of 0 mm to 2 mm. In some embodiments, the distance $d_2$ between the center $O_2$ of the second pressure relief hole 1132 and the inner side surface IS ranges from 5.43 mm to 6.96 mm, and the distance between the center of the sound outlet hole 112 and the midperpendicular plane of the line connecting the center of the first pressure relief hole 1131 and the center of the second pressure relief hole 1132 is in a range of 0 mm to 2 mm.

In some embodiments of the present disclosure, by limiting the distance between the center of the sound outlet hole 112 and the midperpendicular plane of the line connecting the center of the first pressure relief hole and the center of the second pressure relief hole and the distance between the second pressure relief hole 1132 and the inner side surface IS, the first pressure relief hole 1131 and the second pressure relief hole 1132 are provided away from the sound outlet hole 112, so that the effect of the sounds emitted from the first pressure relief hole 1131 and the second pressure relief hole 1132 canceling the sound emitted from the sound outlet hole 112 at the listening position (i.e., the car canal) is weakened, which in turn increases volume at the listening position.

Figure 9:
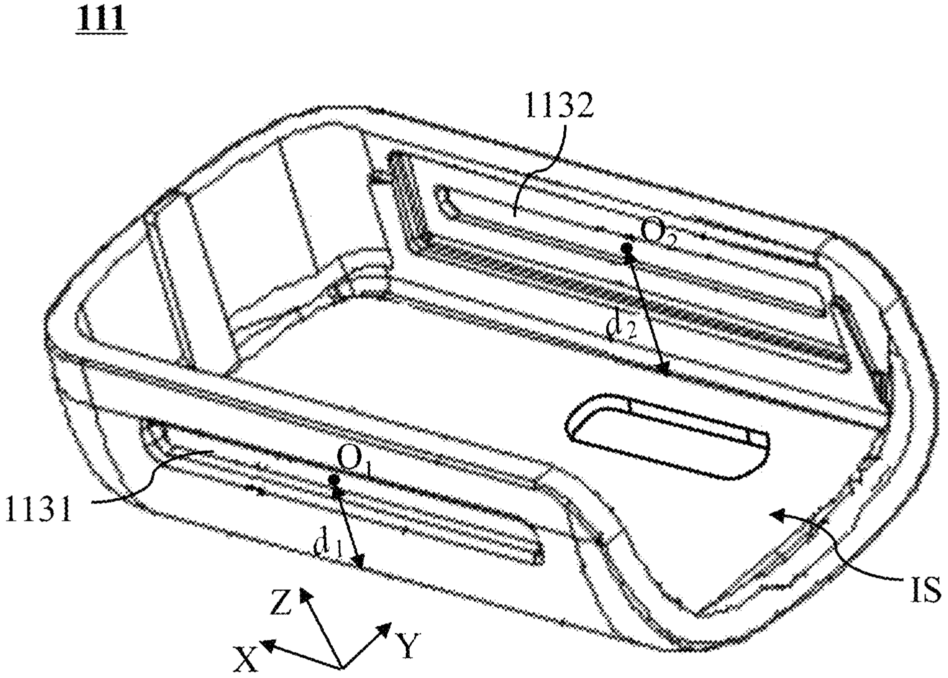
FIG. 9 is a schematic diagram illustrating an exemplary structure of a housing shown in FIG. 8.

In some embodiments, in order to further avoid that the sound emitted from the second pressure relief hole 1132 in the car canal (i.e., the listening position) cancels with the sound emitted from the sound outlet hole 112 and reduces the listening volume, an area of the second pressure relief hole 1132 may be reduced to reduce an intensity of the sound transmitted out of the second pressure relief hole 1132 and transmitted to the car canal, at which time, the area of the second pressure relief hole 1132 may be smaller than an area of the first pressure relief hole 1131 (as shown in FIG. 9). It is to be appreciated that in some other embodiments, the area of the sound outlet hole 112 and the pressure relief hole 113 also refer to an area of other cross-sections of the sound outlet hole 112 and the pressure relief hole 113 such as an area of an inner opening of the sound outlet hole 112 and/or the pressure relief hole 113, or an average of the area of the inner opening and an area of an outer opening of the sound outlet hole 112 and/or the pressure relief hole 113, etc.

The description of the above-described earphone 10 is for the purpose of exposition only and is not intended to limit the scope of the present disclosure. For a person of ordinary skill in the art, a wide variety of variations and modifications can be made based on the description of the present disclosure. For example, when only one pressure relief hole is provided on the sound production component 11, the pressure relief hole may be any one of the first pressure relief hole 1131 and the second pressure relief hole 1132 described above. For example, the pressure relief hole may be the first pressure relief hole 1131, i.e., the pressure relief hole may be provided on the upper side surface US. A distance of a center of this pressure relief hole and the inner side surface IS may be in a range of 4.24 mm to 7.96 mm, and a distance between the center of this pressure relief hole and the rear side surface RS may be in a range of 8.60 mm to 15.68 mm. These changes and modifications remain within the scope of protection of the present disclosure.

Figure 13:
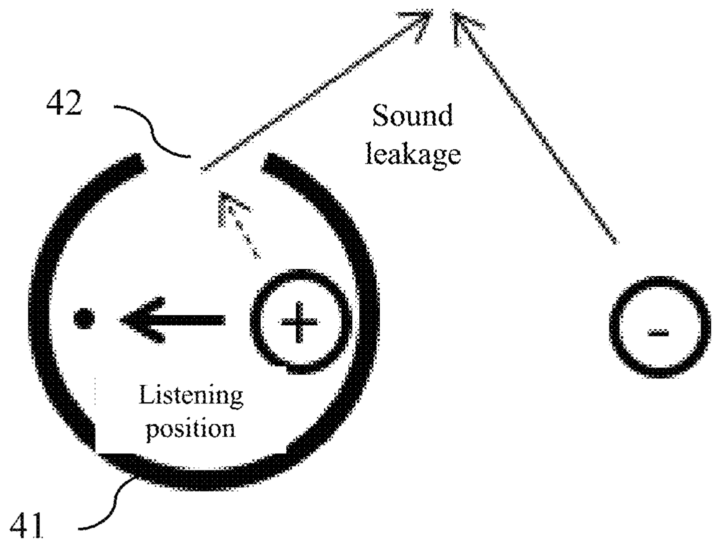
FIG. 13 is a schematic diagram illustrating an exemplary distribution of a cavity structure provided around one sound source of a dipole sound source according to some embodiments of the present disclosure.

In some embodiments, in order to increase the listening volume, particularly at a low-and-mid frequency, while still retaining the far-field leakage phase cancellation and reduction effect, a cavity structure may be constructed around one sound source of a dual-point sound source. FIG. 13 is a schematic diagram illustrating an exemplary distribution of a cavity structure provided around one sound source of a dipole sound source according to some embodiments of the present disclosure.

As shown in FIG. 13, when the dipole sound source is provided with a cavity structure 41 in such a way that one of the dipole sound sources and a listening position is inside the cavity structure 41 and the other dipole sound source is outside the cavity structure 41. A sound derived from the dipole sound source inside the cavity structure 41 is limited by the cavity structure 41, i.e., the cavity structure 41 is capable of clustering the sound such that the sound is able to propagate into the listening position, thereby increasing the volume and quality of the sound at the listening position. In the present disclosure, the "cavity structure" may be understood as a semi-enclosed structure surrounded by side surfaces of the sound production component 11 and a cavum concha cavity structure, the semi-enclosed structure makes an interior environment is not completely sealed off from an external environment, but has a leakage structure 42 (e.g., an opening, a leakage structure, a pipeline, etc.) that is acoustically connected to the external environment. Exemplary leakage structures may include, but are not limited to, openings, leakage structures, pipelines, etc., or any combination thereof.

In some embodiments, the cavity structure 41 may contain a listening position and at least one sound source. "Contain" herein may mean that at least one of the listening position and the sound source is inside the cavity, or at least one of the listening position and the sound source is at an interior edge of the cavity. In some embodiments, the listening position may be an entrance to an car canal or an acoustic reference point in an car.

Figure 14A:
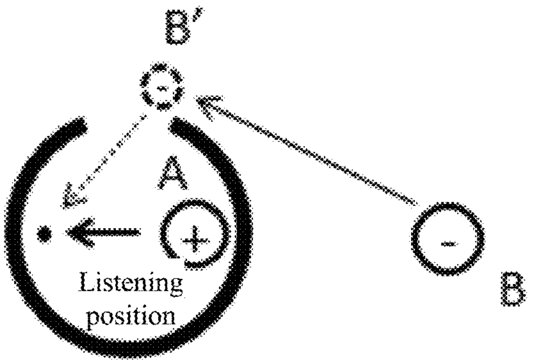
FIG. 14A is a schematic diagram illustrating an exemplary sound source structure of a dipole sound source and a listening principle of constructing a cavity structure around one sound source of the dipole sound source according to some embodiments of the present disclosure.
Figure 14B:
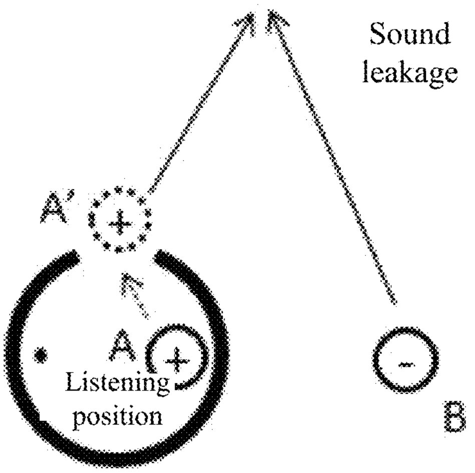
FIG. 14 B is a schematic diagram illustrating an exemplary sound source structure of a dipole sound source and a sound leakage principle of constructing a cavity structure around one sound source of the dipole sound source according to some embodiments of the present disclosure.

FIG. 14A is a schematic diagram illustrating an exemplary sound source structure of a dipole sound source and a listening principle of constructing a cavity structure around one sound source of the dipole sound source according to some embodiments of the present disclosure. FIG. 14 B is a schematic diagram illustrating an exemplary sound source structure of a dipole sound source and a sound leakage principle of constructing a cavity structure around one sound source of the dipole sound source according to some embodiments of the present disclosure.

For near-field listening, a dipole with a cavity structure is constructed around one of the sound sources as shown in FIG. 14A, and since one of the sound sources A is surrounded by the cavity structure, most of a sound radiated from the sound source A may be by either direct or reflected reaching a listening position. In contrast, in the case where there is no cavity structure, most of the sound radiated from the sound source does not reach the listening position. Thus, the cavity structure is provided such that a volume of the sound reaching the listening position is significantly increased. At the same time, only a small portion of a phase-inverted sound radiated by a phase-inverted sound source B outside the cavity structure enters the cavity structure through a leakage structure of the cavity structure. This corresponds to generating a secondary sound source B' at the leakage structure, which is significantly less intense than the sound source B, and significantly less intense than the sound source A. A sound generated by the secondary sound source B' has a weak effect of inverted phase cancelation on the sound source A inside the cavity, which significantly increases the listening volume at the listening position.

For the sound leakage, as shown in FIG. 14 B, the sound source A radiates the sound to the outside world through the leakage structure of the cavity is equivalent to generating a secondary sound source A' at the leakage structure, and since almost all sounds radiating from the sound source A are output from the leakage structure, and a structural scale of the cavity is much smaller than a spatial scale for evaluating the sound leakage, it may be considered that an intensity of secondary sound source A' is the same as an intensity of the sound source A. For the outside space, the effect of phase cancellation of the sound produced by secondary sound source A' with the sound source B is comparable to the effect of phase cancellation of the sound produced by the sound source A with the sound source B. That is, with this cavity structure, a comparable sound leakage reduction effect is still maintained.

It should be understood that the leakage structure with one opening is only an example, and a leakage structure of a cavity structure may comprise one or more openings, which also achieves a superior listening index, where the listening index refers to the inverse $1/\alpha$ of a leakage index a. Taking setting a structure with two openings as an example, the following analyzes the cases of equal opening holes and equal opening hole ratios, respectively. Taking a structure with only one hole as a comparison, here "equal opening holes" means setting up two openings with the same dimension as the structure with only one hole, and "equal opening hole ratios" refers that a sum of opening areas of the two holes is the same as the structure with only one hole. Equal opening holes are equivalent to doubling a relative opening dimension of the structure with only one hole (i.e., a ratio of an opening area of a leakage structure S to an area S0 of the cavity structure that is subjected to a direct action of a contained sound source), and, as described previously, its overall listening index decreases. In the case of equal opening hole ratios, even if S/S0 is the same as in a structure with only one hole, a distance between two openings and an external sound source is different, and thus results in a different listening index.

Figure 15A:
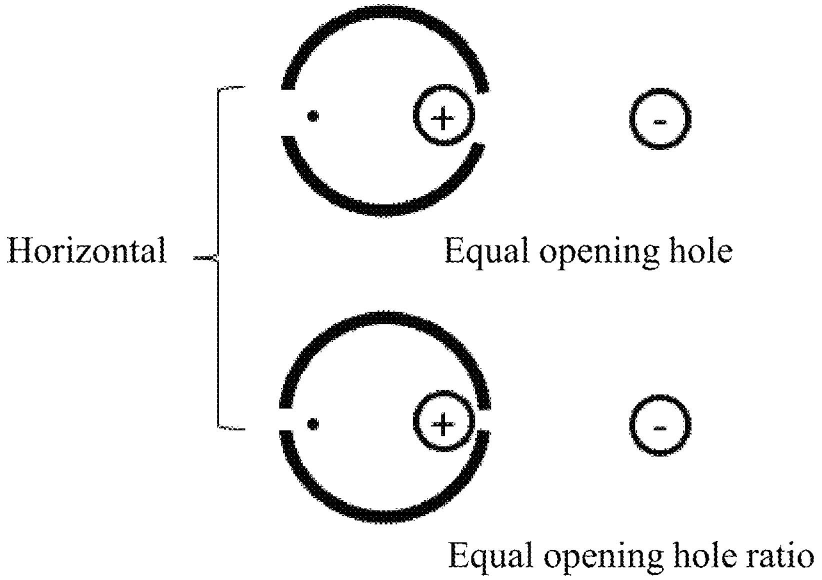
FIG. 15A is a schematic diagram illustrating an exemplary cavity structure with two horizontal openings according to some embodiments of the present disclosure.
Figure 15B:
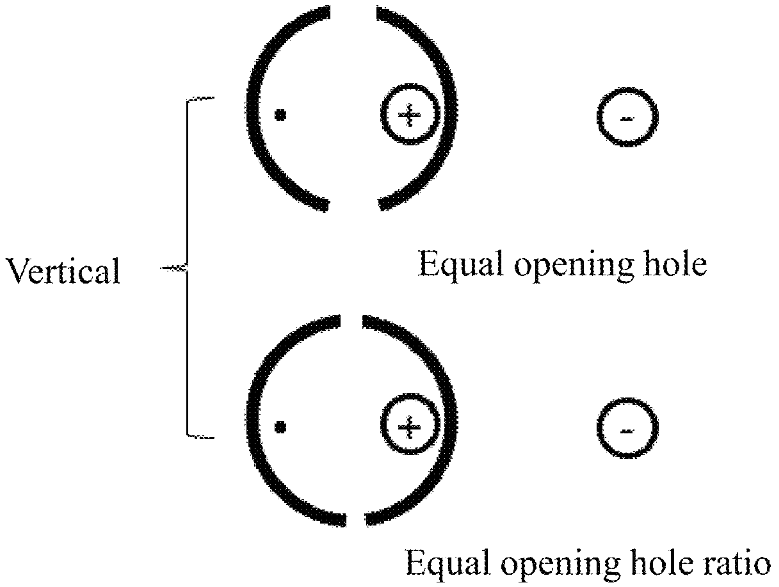
FIG. 15 B is a schematic diagram illustrating an exemplary cavity structure with two vertical openings according to some embodiments of the present disclosure.

FIG. 15A is a schematic diagram illustrating an exemplary cavity structure with two horizontal openings according to some embodiments of the present disclosure. FIG. 15 B is a schematic diagram illustrating an exemplary cavity structure with two vertical openings according to some embodiments of the present disclosure. As shown in FIG. 15A, when a line connecting two openings is parallel to a line connecting two sound sources (i.e., there are two horizontal openings), distances between the two openings to an external sound source are maximum and minimum, respectively; as shown in FIG. 15 B, when the lines are perpendicular (i.e. there are two vertical openings), the distances between the two openings to the external sound source are equal and a middle value is taken.

Figure 16:
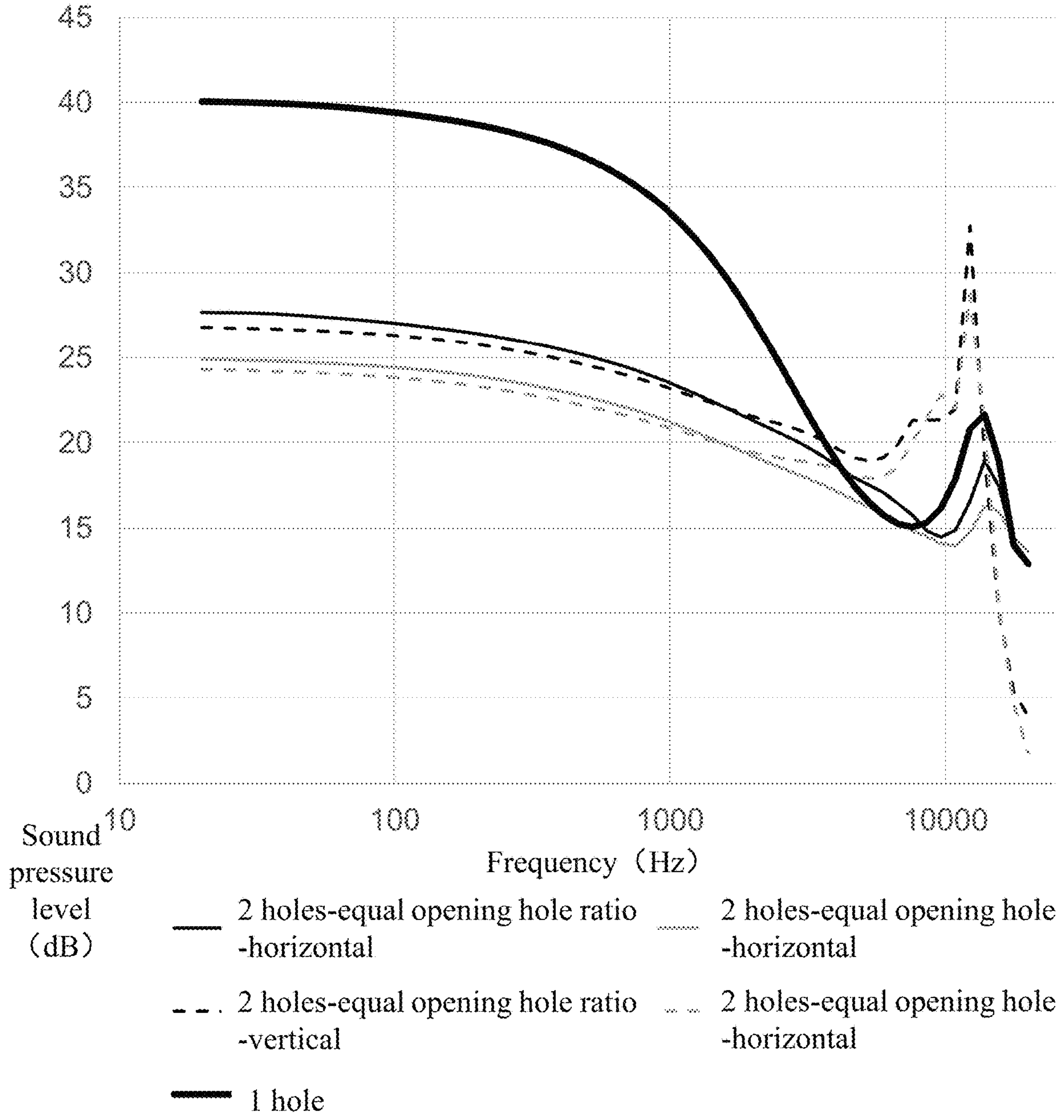
FIG. 16 is a graph illustrating a comparison between a listening index curve of a cavity structure with two openings and a listening index curve of a cavity structure with a single opening according to some embodiments of the present disclosure.

FIG. 16 is a diagram illustrating a comparison between a listening index curve of a cavity structure with two openings and a listening index curve of one opening according to some embodiments of the present disclosure. As shown in FIG. 16, compared to a cavity structure with one opening, an overall listening index of a cavity structure with equal opening holes decreases. For a cavity structure with equal opening hole ratios, distances between two openings to an external sound source are different, thus also resulting in a different listening index. Combined with FIG. 15 A, FIG. 15 B, and FIG. 16, it can be seen that a listening index of a leakage structure with equal opening hole ratios is higher than a listening index of a leakage structure with equal opening holes, no matter whether the openings are horizontal or vertical. This is because a relative opening size, S/S0, of the leakage structure with equal opening hole ratios is twice as large compared to that of the leakage structure with equal opening holes, and thus the listening index is large. Combining FIG. 15 A, FIG. 15 B, and FIG. 16, it can be seen that a listening index of a horizontal opening is larger for both the leakage structure with equal opening holes and the leakage structure with equal opening hole ratios. This is since a distance between one of the openings of the leakage structure of the horizontal opening is less than a distance between two sound sources, which creates a secondary sound source that is closer to the external sound source than original two sound sources, resulting in a higher listening index, which in turn improves the sound leakage reduction effect. Thus, in order to improve the sound leakage reduction effect, a distance between at least one opening to the external sound source may be smaller than the distance between the two sound sources.

In addition, as shown in FIG. 16, adopting the cavity structure with two openings improves a resonance frequency of an airborne sound in the cavity structure better than the cavity structure with one opening, so that a whole device has a better listening index in a high-frequency band (e.g., a sound at a frequency close to 10,000 Hz) relative to the cavity structure with only one opening. The high-frequency band is the more sensitive band to the human car, and therefore there is a great need for sound leakage reduction. Therefore, in order to improve the sound leakage reduction effect in the high-frequency band, a cavity structure with a count of openings greater than 1 may be chosen.

Figure 17:
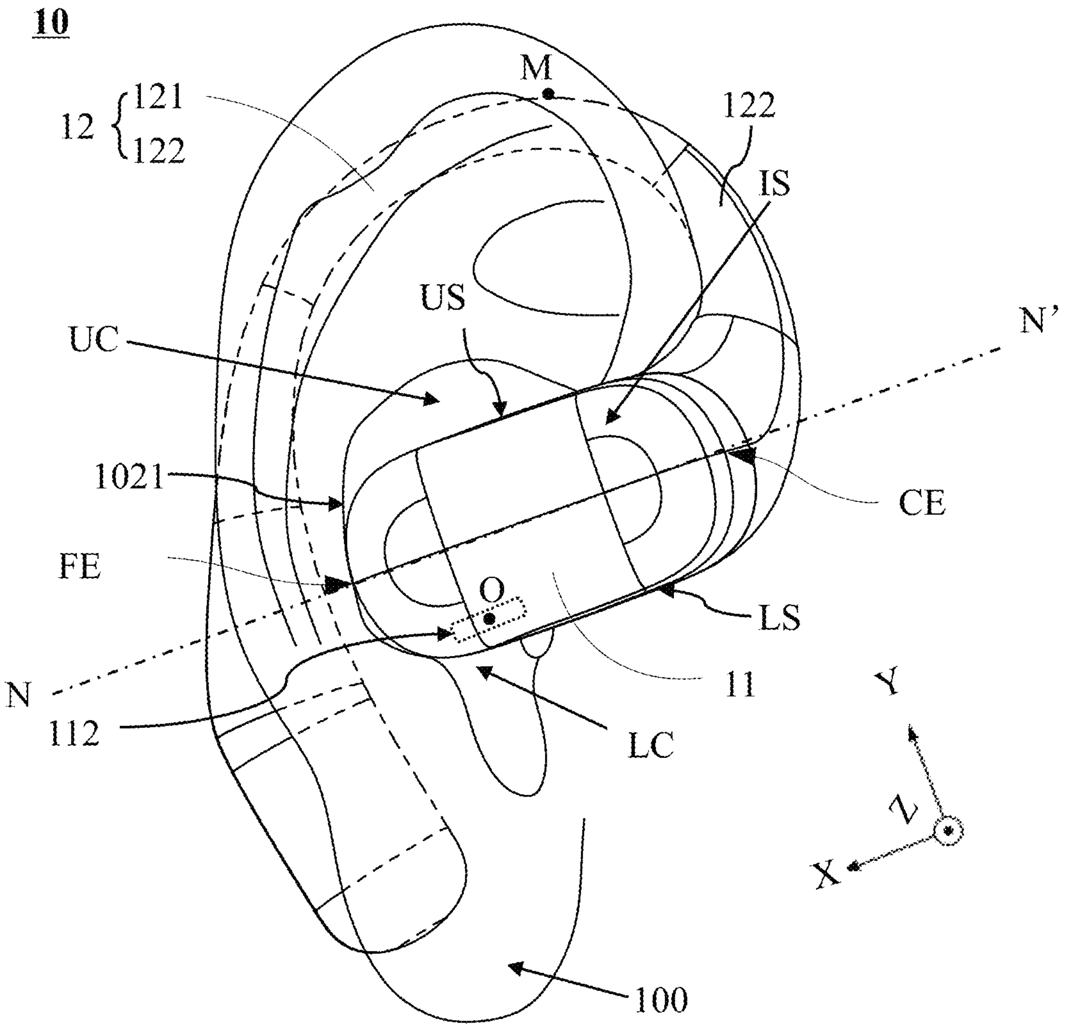
FIG. 17 is a schematic diagram illustrating exemplary a wearing manner of an earphone according to another embodiment of the present disclosure.
Figure 18:
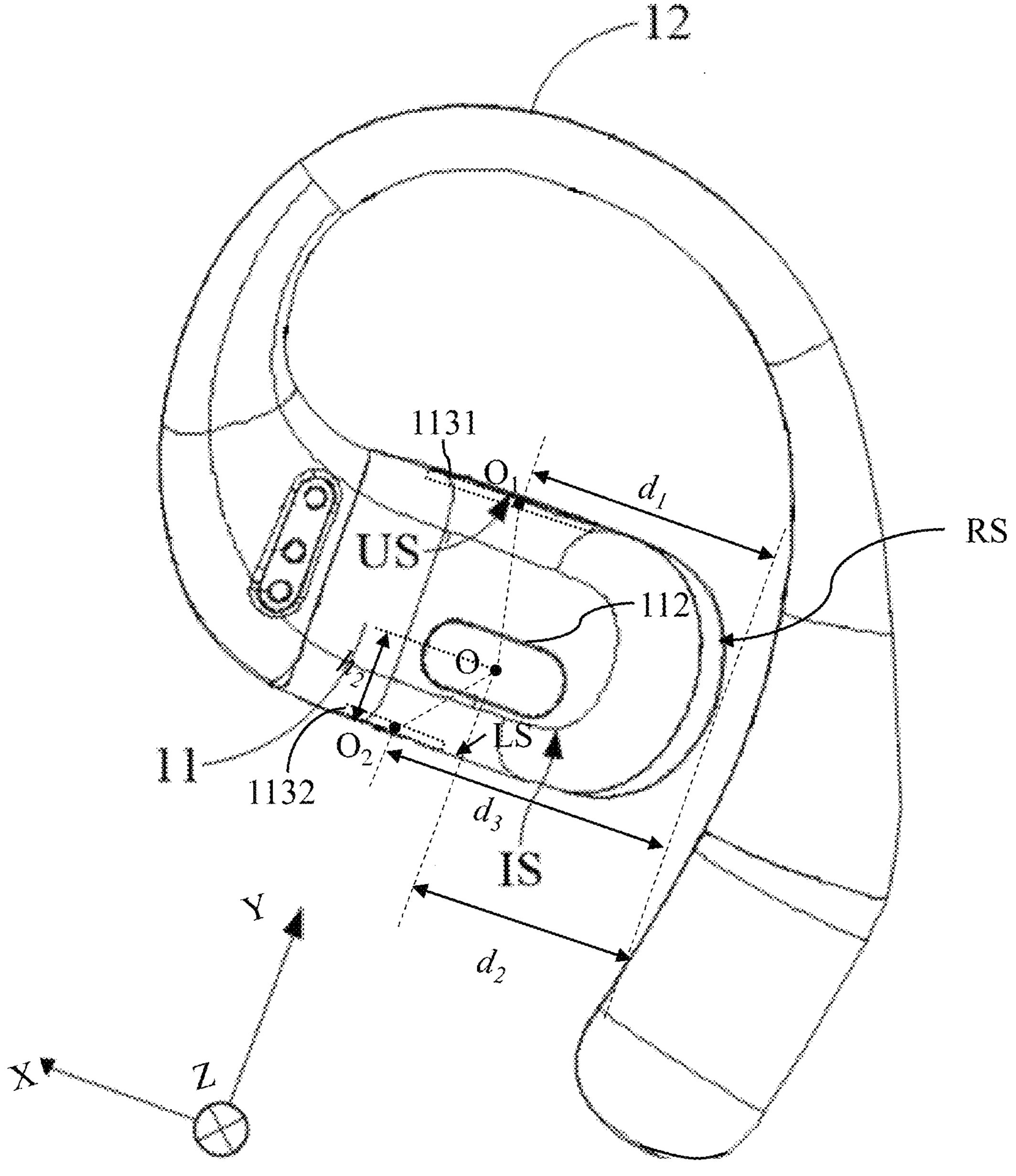
FIG. 18 is a schematic diagram illustrating an exemplary structure that facing an car of a user of the earphone shown in FIG. 17.
Figure 19:
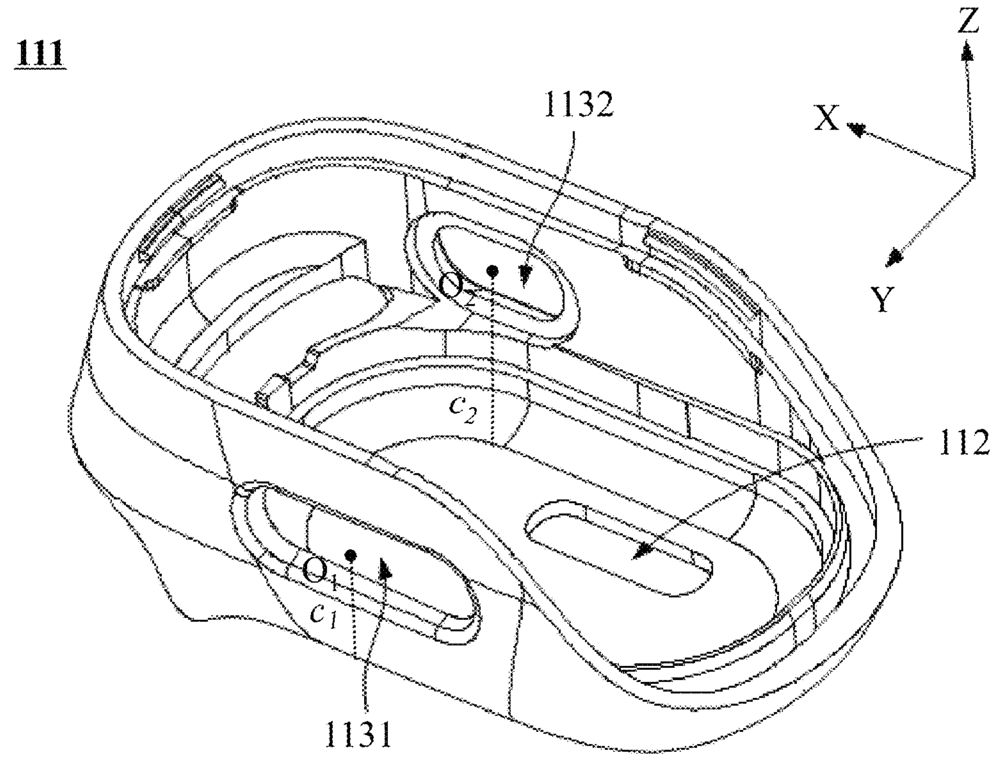
FIG. 19 is a schematic diagram illustrating an exemplary structure of a housing of an earphone according to some embodiments of the present disclosure.

FIG. 17 is a schematic diagram illustrating exemplary a wearing manner of an earphone according to another embodiment of the present disclosure. FIG. 18 is a schematic diagram illustrating an exemplary structure that facing an car of an earphone shown in FIG. 17. FIG. 19 is a schematic diagram illustrating an exemplary structure of a housing of an earphone according to some embodiments of the present disclosure.

The earphone 10 shown in FIG. 17 has a similar structure to the earphone 10 shown in FIG. 7, e.g., the car-hook 12 is a curved structure that fits into a junction between a user's head and the car 100. The sound production component 11 (or the housing 111 of the sound production component 11)

may have a connection end CE that is connected to the car-hook 12 and a free end FE that is not connected to the car-hook 12. When the earphone 10 is in a wearing state, a first portion 121 (e.g., a hooked portion of the car-hook 12) of the car-hook 12 is hooked between the user's auricle 100 (e.g., the helix 107) and the head, and a second portion 122 (e.g., a connection portion of the car-hook) of the car-hook 12 is toward a side of the auricle 100 back from the head and connects to the connection end CE of the sound production component 11 to fix the sound production component 11 at a position near an car canal but not blocking the car canal. The earphone 10 illustrated in FIG. 17 has a similar structure to the earphone 10 illustrated in FIG. 7, and a main difference is that the sound production component 11 is inclinedly disposed, and the housing 111 of the sound production component 11 is at least partially inserted into the cavum concha 102, for example, the free end FE of the sound production component 11 may extend into the cavum concha 102. The car-hook 12 and the sound production component 11 of such a structure are well adapted to the user's car 100, and can increase a resistance of the earphone 10 to prevent it from falling off from the car 100, and thus increase the wearing stability of the earphone 10.

In some embodiments, in the wearing state, when viewed along the thickness direction Z, the connection end CE of the sound production component 11 is closer to a top of the head as compared to the free end FE, so as to facilitate the free end FE to reach into the cavum concha. Based on this, an angle between the short axis direction Y and the sagittal axis direction is between 30° and 40°. If the angle is too small, it is likely to result in the free end FE not being able to extend into the cavum concha, and the sound outlet hole 112 on the sound production component 11 being too far from the car canal; if the angle is too large, it is likewise likely to result in the sound production component 11 not being able to extend into the cavum concha, and the car canal is blocked by the sound production component 11. In other words, it is set up in such a way as to allow the sound production component 11 to extend into the cavum concha, and at the same time allow the sound outlet hole 112 on the sound production component 11 to be at a suitable distance from the car canal so that, in the event the car canal is not blocked, a user can hear much of a sound produced by the sound production component 11.

In some embodiments, the sound production component 11 and the car-hook 12 may jointly clamp the car 100 from front and back sides of the car 100 corresponding to the cavum concha, thereby increasing the resistance of the earphone 10 to prevent it from falling off from the car 100, and improving the stability of the earphone 10 in the wearing state. For example, the free end FE of the sound production component 11 is pressed along the thickness direction Z within the cavum concha. Furthermore, for example, the free end FE is pressed against within the cavum concha along the long axis direction X and along the short axis direction Y (e.g., the free end FE is pressed against an inner wall of the cavum concha). Here, the free end FE refers to a specific region away from the connection end CE obtained by cutting the sound production component 11 along a Y-Z plane (a plane formed by the short axis direction Y and the thickness direction Z), and a long-axis dimension of the specific region to a long-axis dimension of the sound production component may be in a range of 0.05 to 0.2.

In some embodiments, by extending at least a portion of the sound production component 11 into the cavum concha, a volume of a sound at a listening position (e.g., at the car canal) can be increased, particularly at a low-and-middle frequency, while still maintaining a good far-field sound leakage phase cancellation effect. Only as an exemplary illustration, when a whole or a part of a structure of the sound production component 11 extends into the cavum concha 102, a cavity jointly enclosed by the inner side surface IS of the sound production component 11 and the cavum concha 102 may be regarded as a cavity structure 41 as shown in FIG. 13, and a leakage structure formed between the inner side surface IS and the cavum concha(e.g., a first leakage structure UC formed between the inner side surface IS and the cavum concha close to the top of the head, and a second leakage structure LC formed between the inner side surface IS and the car 100 close to the car canal) may be regarded as a leakage structure 42 as shown in FIG. 13. The sound outlet hole 112 provided on the inner side surface IS may be regarded as a point source of sound inside the cavity structure 41 as shown in FIG. 13, one or more pressure relief holes 113 (e.g. the first pressure relief hole 1131 and/or the second pressure relief hole 1132) may be regarded as a point sound source outside the cavity structure 41 as shown in FIG. 13, and the sound outlet hole 112 and the pressure relief holes 113 which output sounds with opposite phases form a dipole. Thereby, according to the relevant descriptions of FIG. 13-FIG. 16, when the earphone 10 is worn in a wearing mode that is at least partially inserted into the cavum concha, i.e., in a wearing mode as shown in FIG. 17, in terms of the listening effect, most of the sound radiated from the sound outlet hole 112 may reach the car canal by way of direct emission or reflection, which can cause the volume of the sound reaching the car canal to be significantly improved, in particular the listening volume in the low-to-middle frequency. Meanwhile, only a relatively small portion of a phase-inverted sound radiated by the pressure relief hole 113 may enter the cavum concha through the leakage structure (the first leakage structure UC and the second leakage structure LC), and the effect of the sound interfering with the sound outlet hole 112 to cancel each other out is weak, resulting in a significant increase in the listening volume in the car canal. In terms of the sound leakage effect, the sound outlet hole 112 may leak the sound to the outside world through the leakage structure of the cavity structure, and since almost all of the sound radiated by the sound outlet hole 112 is leaked from the leakage structure, and a structural scale of the cavity is much smaller than a spatial scale for evaluating the sound leakage (with a difference of at least one order of magnitude), so it may be considered that an intensity of the sound emitted from the sound outlet hole 112 is comparable to an intensity of the sound from the pressure relief hole 113, and the sound emitted from the sound outlet hole 112 may cancel out with the sound generated by the pressure relief hole 113 in a far field, thus ensuring a sound leakage reduction effect.

In some embodiments, the free end FE that extends into the cavum concha may be immediately adjacent to the a cavum concha edge 1921 (see FIG. 17) or may be at a distance from the cavum concha edge 1021. However, a distance between the free end FE of the sound production component 11 and the cavum concha edge 1021 affects the dimension of the cavity structure enclosed by the sound production component 11 and the cavum concha 102, and thus affects the dimension of the leakage structure formed between the sound production component 11 and the cavum concha, which in turn affects the listening volume in the user's car canal. This can be demonstrated by the fact that the larger the opening of the leakage structure is, the more sound components are directly radiated outwardly from the sound production component 11, and the less sound reaches the listening position. It should be noted that the distance between the free end FE of the sound production component 11 and the cavum concha edge 1021 may be determined by a shortest distance between a projection of the free end FE of the sound production component 11 on a sagittal plane and a projection of the cavum concha edge 1021 on the sagittal plane along the X-direction, for example, the distance between the free end FE of the sound production component 11 and the cavum concha edge 1021 may be a distance between a midpoint of the projection of the free end FE of the sound production component 11 on the sagittal plane and the projection of the cavum concha edge 1021 on the sagittal plane along the X-direction. In some embodiments, the distance between the free end FE of the sound production component 11 and the cavum concha edge 1021 may be used to reflect a position of the free end FE of the sound production component 11 with respect to the cavum concha 102 and the extent to which the sound production component 11 covers the user's cavum concha 102.

Figure 20:
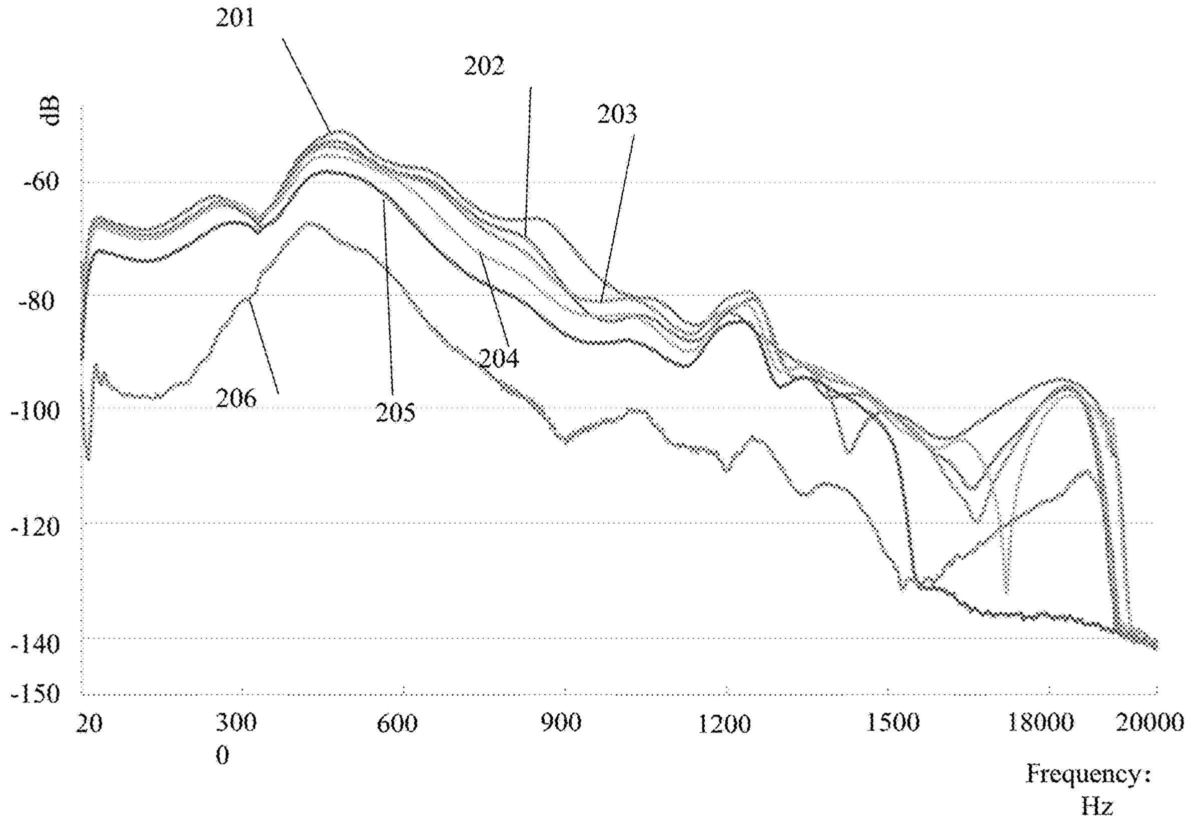
FIG. 20 is a schematic diagram illustrating frequency response curves corresponding to different distances between a free end of a sound production component and a cavum concha edge according to some embodiments of the present disclosure.

FIG. 20 is a schematic diagram illustrating exemplary frequency response curves corresponding to different distances between a free end FE of a sound production component and the cavum concha edge 1021 according to some embodiments of the present disclosure. Referring to FIG. 20, a horizontal coordinate indicates a frequency in Hz, a vertical coordinate indicates a sound pressure level in dB in an car canal at different frequencies, and a frequency response curve 201 is a frequency response curve of when the distance between the free end FE of the sound production component and the cavum concha edge 1021 is 0 mm (e.g., in a wearing state, the free end of the sound production component 11 is pressed against the cavum concha edge), a frequency response curve 202 is a frequency response curve when the distance between the free end FE of the sound production component and the cavum concha edge 1021 is 4.77 mm, a frequency response curve 203 is a frequency response curve when the distance between the free end FE of the sound production component FE and the cavum concha edge 1021 is 7.25 mm, a frequency response curve 204 is a frequency response curve when the distance between the free end FE of the sound production component and the cavum concha edge 1021 is 10.48 mm, a frequency response curve 205 is a frequency response curve when the distance between the free end FE of the sound production component and the cavum concha edge 1021 is 15.3 mm, and a frequency response curve 206 is a frequency response curve when the distance between the free end FE of the sound production component and the cavum concha edge 1021 is 19.24 mm. According to FIG. 20, it can be seen that when the distance between the free end FE of the sound production component and the cavum concha edge 1021 is 0 mm, 4.77 mm, and 7.25 mm, a sound pressure level of a sound measured in the car canal is larger. When the distance between the free end FE of the sound production component and the cavum concha edge 1021 is 19.24 mm (e.g. when the free end of the sound production component 11 is pressed against the cavum concha edge in the wearing state), the sound pressure level of the sound measured in the car canal is relatively small. That is to say, in the wearing state, when the distance between the free end FE of the sound production component and the cavum concha edge 1021 is larger, i.e., when the sound production component 11 extends into fewer structures of the cavum concha edge, a cavity structure enclosed by the sound production component 11 and the cavum concha edge 102 is smaller, and the sound pressure level of the sound measured in the car canal is relatively small. Based on this, in order to ensure that the earphone 10 has a better listening effect while also ensuring the comfort and stability of the user wearing the earphone 10, in some embodiments, the distance between the free end FE of the sound production component and the cavum concha edge 1021 may be 0 mm to 7.5 mm. In some embodiments, the distance between the free end FE of the sound production component and the cavum concha edge 1021 may be 0 mm to 4.77 mm. The free end of the sound production component may be against the cavum concha edge 1021, and it may be understood that a projection of the free end FE of the sound production component 11 on a sagittal plane overlaps with a projection of the cavum concha edge 1021 on the sagittal plane (e.g., a position of the sound production component 11 with respect to the cavum concha as shown in FIG. 17), i.e., when a distance between the projection of the free end of the sound production component on the sagittal plane and the projection of the cavum concha edge 1021 on the sagittal plane is 0 mm, the sound production component 11 may have a better frequency response, and at this time, the free end of the sound production component 11 is against the cavum concha edge 1021, which can play a supporting and limiting role for the sound production component 11 and improve the stability of the user wearing the earphone. It should be noted that the frequency response curves corresponding to different distances between the free end of FE the sound production component and the cavum concha edge 1021 measured in the embodiments of the present disclosure are measured by changing a wearing position of the sound production component (e.g., by translating it along the sagittal axis direction) when a wearing angle of the sound production component, and a long-axis dimension, a short-axis dimension, and a thickness direction of the sound production component are certain.

Combined with FIG. 17 and FIG. 18, the sound outlet hole 112 is provided on the inner side surface IS of the sound production component 11, and in some embodiments, when the distance between the free end FE of the sound production component and the cavum concha edge 1021 is 0 mm to 7.25 mm, in order to ensure a sound intensity of the sound outlet hole 112, i.e., the listening position, a position of the sound outlet hole 112 may be defined from the X-direction so that the sound outlet hole 112 is placed inside the cavity structure formed between the sound production component 11 and the cavum concha, and a distance b1 between the center O of the sound outlet hole 112 and the rear side surface RS of the sound production component 11 along the X-direction is in a range of 8.15 mm to 12.25 mm. In some embodiments, in order to make the cavity structure jointly enclosed by the sound production component 11 and the cavum concha 102 larger to enhance the listening effect, the distance between the free end FE of the sound production component and the cavum concha edge 1021 is in a range of 0 mm to 4.77 mm, in this configuration, in order to make the sound outlet hole 112 located inside the cavity structure formed between the sound production component 11 and the cavum concha, a distance between the sound outlet hole 112 and the rear side surface RS is larger, and the distance b1 between the center O of the sound outlet hole 112 and the rear side surface RS of the sound production component 11 along the X-direction is in a range of 8.5 mm to 12.00 mm. In some embodiments, in order to enhance the comfort and stability of wearing by the user, the free end FE of the sound production component may be made to be able to rest against the cavum concha edge 1021, even if the distance between the free end FE of the sound production component and the cavum concha edge 1021 is 0 mm, based on this, in order to ensure that the sound production component 112 is located inside the cavity structure formed between the sound production component 11 and the cavum concha and that the sound outlet hole 112 can be located close to the car canal located in the cavity structure, the distance b1 between the center O of the sound outlet hole 112 and the rear side surface RS of the sound production component 11 along the X-direction is in a range of 9.25 mm to 11.15 mm.

In some embodiments, when the distance between the free end FE of the sound production component and the cavum concha edge 1021 is 0 mm to 7.25 mm, in order to ensure the sound intensity of the sound outlet hole 112, i.e., the listening position, it is possible to define the position of the sound outlet hole 112 from the Y-direction, so that the sound outlet hole 112 is placed inside the cavity structure formed between the sound production component 11 and the cavum concha, and thus, in some embodiments, a distance between the center O of the sound outlet hole 112 and the upper apex M of the car-hook 12 is in a range of 22.5 mm to 34.5 mm in the wearing state. In some embodiments, the distance between the center O of the sound outlet hole 112 and the upper apex M of the car-hook 12 in the wearing state is 25 mm to 32 mm. In some embodiments, the distance between the center O of the sound outlet hole 112 and the upper vertex M of the car-hook 12 in the wearing state is 27.5 mm to 29.5 mm. In some embodiments, the distance between the center O of the sound outlet hole 112 and the upper apex M of the car-hook 12 in the wearing state is 28 mm to 29 mm.

In some embodiments of the present disclosure, by defining the position of the sound output hole 112 from the Y-direction and/or the X-direction based on the position of the sound production component 11, it is possible to cause the sound outlet hole 112 to be placed inside the cavity structure formed between the sound production component 11 and the cavum concha, and to ensure that the sound intensity at the sound outlet hole 112, i.e., the listening position, so that the position of the sound outlet hole 112 may be defined from the Y-direction and the X-direction based on the position of the sound production component 11 with respect to the cavum concha, so that the sound outlet hole 112 is placed inside the cavity structure formed between the sound production component 11 and the cavum concha, and that the sound intensity of the sound outlet hole 112 in the car canal can be ensured.

In some embodiments, where a portion or an entire structure of the sound production component 11 extends into the cavum concha 102, the projection of the sound production component 11 on the sagittal plane has an overlapping portion with the projection of the cavum concha on the sagittal plane. An area of the overlapping portion also foregrounds a dimension of the cavity structure, which in turn affects a dimension of a leakage structure formed between the sound production component 11 and the cavum concha. For case of description, a ratio of the area of the overlapping portion to a projection area of the cavum concha on the sagittal plane is defined as an overlapping ratio between the sound production component 11 and the cavum concha 102, and when the overlapping ratio of the sound production component 11 to the cavum concha is larger, the sound production component 11 may cover a larger portion of the cavum concha, at which time, the dimension of the leakage structure between the sound production component 11 and the cavum concha is smaller, an opening area of the leakage structure of the cavity structure is smaller, and the fewer sound components are radiated outwardly directly by the sound production component 11, so as to ensure the listening volume of the sound at the user's car canal.

Figure 21:
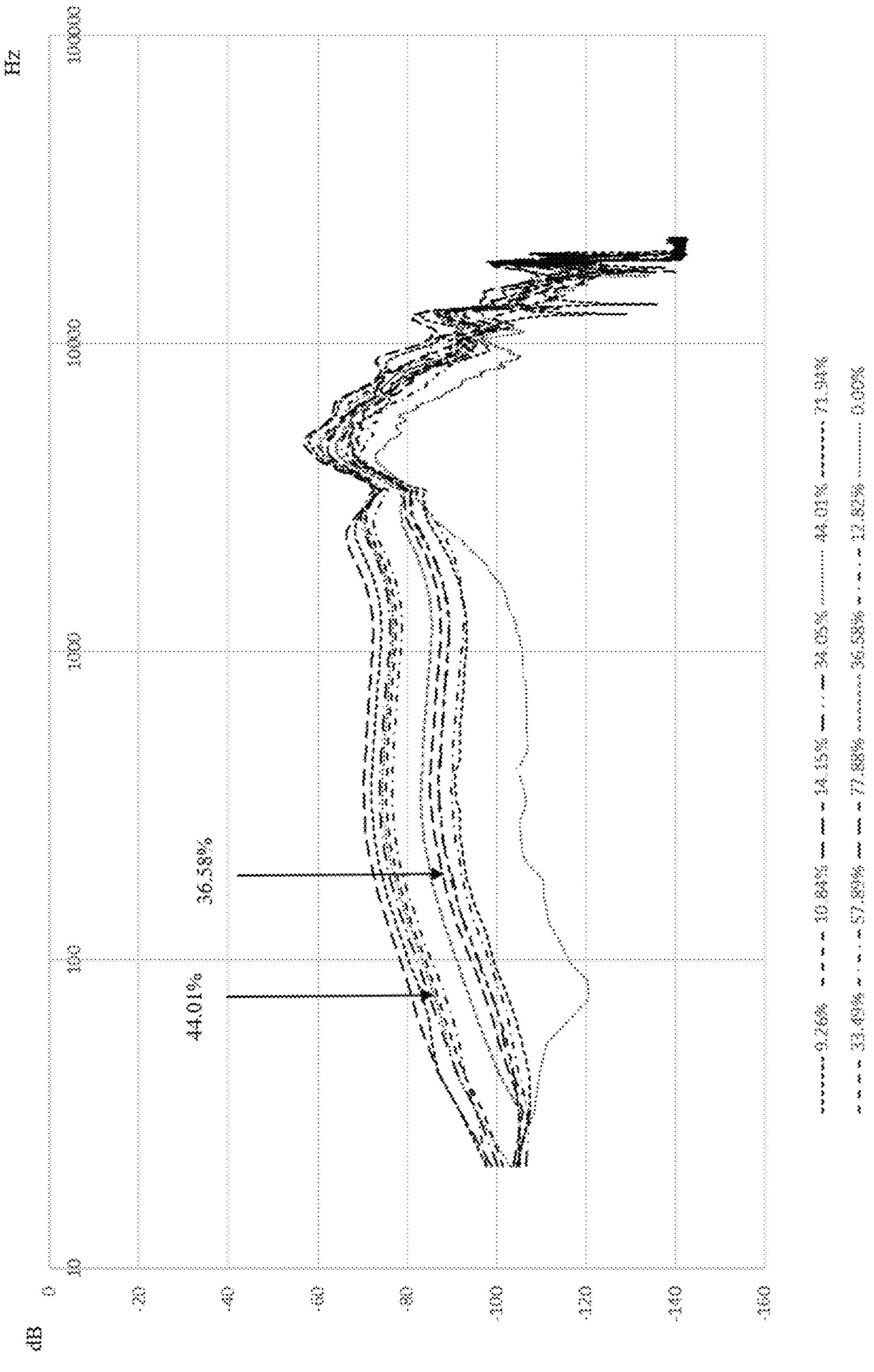
FIG. 21 is a schematic diagram illustrating exemplary frequency response curves corresponding to different overlapping ratios of a sound production component and a cavum concha according to some embodiments of the present disclosure.

FIG. 21 is a schematic diagram illustrating exemplary frequency response curves corresponding to different overlapping ratios of a sound production component and a cavum concha according to some embodiments of the present disclosure. In FIG. 21, a horizontal coordinate represents a frequency in Hz, and a vertical coordinate represents a frequency response in dB at an car canal corresponding to different overlapping ratios. As can be seen from FIG. 21, when a user wears an earphone and at least a portion of a structure of the sound production component 11 covers the cavum concha, i.e., when a projection of the sound production component 11 on a sagittal plane has an overlapping portion with a projection of the cavum concha on the sagittal plane, a listening volume at the user's car canal significantly increases, especially in a low-and-middle frequency compared to a situation when the projection of the sound production component 11 on the sagittal plane does not have an overlapping portion with the projection of the cavum concha on the sagittal plane (with an overlapping ratio of 0%). In some embodiments, the overlapping ratio of the sound production component and the cavum concha may be no less than 9.26% to improve the listening effect when the user wears the earphone. Referring back to FIG. 21, as the overlapping ratio between the sound production component and the cavum concha increases, the stronger the enhancement of the listening volume of the user at the car canal is obtained, in particular, by increasing the overlapping ratio between the sound production component and the cavum concha from 36.58% to 44.01%, the listening effect is significantly improved. Based on this, in order to further enhance the user's listening experience, the overlapping ratio between the sound production component and the cavum concha should be no less than 44.01%. In some embodiments, the overlapping ratio between the sound production component and the cavum concha is not less than 57.89%. It is to be noted that in some embodiments of the present disclosure, the frequency response curves corresponding to the overlapping ratios between the sound production component and the cavum concha are obtained by changing a wearing position of the sound production component (e.g., translating along a sagittal axis or a vertical axis) when a wearing angle of the sound production component (an angle between an upper side surface or a lower surface and the sagittal axis) and a dimension of the sound production component is certain.

The earphone provided in the embodiments of the present disclosure, by extending at least a portion of the sound production component 11 into the cavum concha and controlling the overlapping ratio between the sound production component and the cavum concha on the sagittal plane to be not less than 44.01%, it is possible to make the sound production component 11 and the user's cavum concha to form a cavity structure, thereby improving the listening volume of the earphone at a listening position, especially the listening volume at the low-and-middle frequency.

It should also be noted that, in order to ensure that the user's car canal is not blocked when the user wears the earphone 10, and to keep the car canal in an open state, so that the user can obtain a sound output from the earphone 10 while also obtain a sound in an external environment, the overlapping ratio between the sound production component and the cavum concha should not be too large. In a wearing state, when the overlapping ratio between the sound production component and the cavum concha is too small, a dimension of the sound production component 11 extending into the cavum concha is too small, resulting in a small fitting area between the sound production component 11 and the user's cavum concha, and it is impossible to use the cavum concha to provide sufficient support for the sound production component 11, leading to unstable wearing. On the other hand, a dimension of a leakage structure formed by the sound production component 11 and the cavum concha is too large, which affects the listening volume in the user's car canal. In order to ensure that the earphone is worn by the user without blocking the user's car canal and to ensure that the user wears the earphone with stability and comfort as well as to have a good listening effect, in some embodiments, the overlapping ratio between the sound production component 11 and the cavum concha may be between 44.01% and 77.88%, so that when a part or a whole structure of the sound production component 11 extends into the cavum concha, a force of the cavum concha acting on the sound production component 11 may play certain support and limiting role for the sound production component 11, and thus improve its wearing stability and comfort. At the same time, the sound production component 11 may also form an acoustic model with the cavum concha as shown in FIG. 13, which ensures that the user's listening volume at the listening position (e.g., the car canal), and reduces a leakage volume in a far-field. In some embodiments, the overlapping ratio between the sound production component 11 and the cavum concha may be in a range of 46% to 71.94%. In some embodiments, the overlapping ratio between the sound production component 11 and the cavum concha may be in a range of 48% to 65%. In some embodiments, the overlapping ratio between the sound production component 11 and the cavum concha may be in a range of 57.89% to 62%.

A dimension and contour shape of the cavum concha may vary among users (e.g., different ages, different genders, different heights, and weights), and a projection area of the cavum concha on the sagittal plane of different users varies is within a certain range (e.g., 320 $mm^2$ to 410 $mm^2$). In conjunction with the above, an overlapping ratio between a projection area of the sound production component 11 on the sagittal plane and the projection area of the cavum concha on the sagittal plane should not be too large or too small, and correspondingly, an overall dimension of the sound production component 11 (especially a dimension along a long axis and a dimension along a short axis) should not be too large or too small. For example, if the projection area of the sound production component 11 on the sagittal plane is too small, the sound production component 11 is not able to cover the cavum concha sufficiently, and a dimension of the leakage structure formed between the sound production component 11 and the cavum concha is large, resulting in a low volume of listening sound in the user's car canal. When the projection area of the sound production component 11 on the sagittal plane is too large, the sound production component 11 may cover the user's car canal, preventing the car canal from being kept open, and affecting the user's access to the sound in the external environment. In order to ensure that the user wears the earphone with a listening effect and at the same time maintains the car canal in an open state to obtain the sound in the external environment, in some embodiments, a first projection area of the sound production component 11 on the sagittal plane may be in a range of 202 $mm^2$ to 560 $mm^2$. In some embodiments, the first projection area of the sound production component 11 on the sagittal plane may be in a range of 220 $mm^2$ to 500 $mm^2$. In some embodiments, the first projection area of the sound production component 11 on the sagittal plane may be in a range of 300 $mm^2$ to 470 $mm^2$. Further, in some embodiments, the first projection area of the sound production component 11 on the sagittal plane may be in a range of 330 $mm^2$ to 440 $mm^2$.

Referring to FIG. 7, a shape of the sound production component 11 may include a long-axis direction X and a short-axis direction Y. In some embodiments, when the dimension of the sound production component 11 along the long axis direction X or the short axis direction Y is too small, a volume of the sound production component 11 is relatively small, which makes an area of a diaphragm provided inside it relatively small as well, resulting in low efficiency of the diaphragm in pushing air inside the housing of the sound production component 11 to produce a sound, which affects the acoustic output effect of the earphone. In addition, when a long-axis dimension of the sound production component 11 is too large, it causes the sound production component 11 to exceed the cavum concha, failing to extend into the cavum concha and failing to form the cavity structure, or the dimension of the leakage structure formed between the sound production component 11 and the cavum concha large, affecting the listening volume of the user wearing the earphone 10 in the car canal and the sound leakage effect in the far-field. When a short-axis dimension of the sound production component 11 is too large, the sound production component 11 may cover the user's car canal, which affects the user's access to information and sound in the external environment. In some embodiments, in order to enable the user to have a good acoustic output quality when wearing the earphone 10, the long-axis dimension may be in a range of 12 mm to 32 mm. In some embodiments, the long-axis dimension ranges from 18 mm to 29 mm. In some embodiments, the long-axis dimension may range from 20 mm to 27 mm, and in some embodiments, the long-axis dimension may range from 22 mm to 25 mm. Correspondingly, the short-axis dimension ranges from 4.5 mm to 18 mm. In some embodiments, the short-axis dimension ranges from 10 mm to 15 mm. In some embodiments, the short-axis dimension ranges from 11 mm to 13.5 mm. Further, in some embodiments, the short-axis dimension ranges from 12 mm to 13 mm.

A ratio of the long-axis dimension to the short-axis dimension of the sound production component 11 shown in FIG. 17 is similar to a ratio of a long-axis dimension to a short-axis dimension of the sound production component 11 shown in FIG. 7: to enable the user to experience a better acoustic output effect, the ratio of the long-axis dimension to the short-axis dimension of the sound production component 11 may be made to be in a range of 1.0 to 3.0. In some embodiments, taking into account that the smaller the ratio of the long-axis dimension to the short-axis dimension of the sound production component 11 with a certain area, the larger the short-axis dimension of the sound production component 11 is, and as the short-axis dimension of the sound production component 11 is, it may result in the sound production component 11 not being able to reach into the user's car armor cavity well, which in turn causes problems with wearing stability and comfort, therefore, in order to ensure wearing stability and comfort at the same time, it is possible to make the ratio of the long-axis dimension to the short-axis dimension of the sound production component 11 to be in a range of 1.4 to 2.5. In some embodiments, the ratio of the long-axis dimension to the short-axis dimension of the sound production component 11 may be in a range of 1.4 to 2.3. In some embodiments, the ratio of the long-axis dimension to the short-axis dimension of the sound production component 11 may be in a range of 1.45 to 2.0. It will be appreciated that the sound production component 11 may have different overlapping ratios with the cavum concha when the sound production component 11 has different aspect ratios, and in some embodiments, the projection area of the sound production component 11 on the sagittal plane in a normal wearing state may be relatively moderate by controlling the ratio of the long-axis dimension to the short-axis dimension of the sound production component 11 to be between 1.4 to 2.0, which can not only avoid the projection area of the sound production component 11 on the sagittal plane is too small and results in the formation of a larger leakage structure between the sound production component 11 and the cavum concha, which leads to a low listening volume in the user's car canal, but also avoids that the projection area of the sound production component 11 on the sagittal plane is too large to make the car canal to remain open, affecting the user's access to sound in the external environment, thereby enabling the user to have a better acoustic experience.

When the short-axis dimension of the sound production component 11 is determined, for example, the short-axis dimension of the sound production component 11 is in a range of 10 mm to 15 mm, and in this configuration, in order to enhance a sound intensity (volume) of the sound outlet hole 112 in the car canal (i.e., the listening position), it may dispose the sound outlet hole 112 at a position closer to the car canal, and a distance between the sound outlet hole 112 and the car canal when worn may be limited by limiting a distance between the sound outlet hole 112 and the lower side surface LS of the sound production component 11 along the Y-direction. Therefore, in some embodiments, the short-axis dimension of the sound production component 11 ranges from 10 mm to 15 mm, and a distance $h_2$ between the center O of the sound outlet hole 112 and the lower side surface LS of the sound production component 11 along the Y-direction ranges from 4.05 mm to 6.05 mm. In some embodiments, the short-axis dimension of the sound production component 11 may be reduced to reduce a mass of the sound production component 11, where a maximum distance $h_2$ between the center O of the sound outlet hole 112 and the lower side surface LS of the sound production component 11 along the Y-direction may reduce, and a minimum distance may increase to enable the sound emitting hole 112 to be close to the car canal, so that the short-axis dimension of the sound production component 11 is in a range of 11 mm to 13.5 mm, and the distance $h_2$ between the center O of the sound outlet hole 112 and the lower side surface LS of the sound production component 11 along the Y-direction is in a range of 4.80 mm to 5.50 mm. In some embodiments, similarly, the short-axis dimension of the sound production component 11 ranges from 12 mm to 13 mm, and the distance $h_2$ between the center O of the sound outlet hole 112 and the lower side surface LS of the sound production component 11 along the Y-direction is in a range of 5.20 mm to 5.55 mm.

In some embodiments, at least one of one or more pressure relief holes 113 open on a side surface of the housing 111 other than the inner side surface for acoustic coupling to a rear cavity includes the first pressure relief hole 1131, and the first pressure relief hole 1131 may be disposed on the upper side surface US, the outer side surface OS, or the lower side surface LS of the sound production component 11. In some embodiments, because the sound production component 11 is located within the cavum concha, due to its gravity, the sound production component 11 may be close to a lower inner wall of the cavum concha that nears an earlobe, such that the leakage structure formed between the sound production component 11 and the cavum concha is close to the upper side surface US of the sound production component 11, and in order to make a sound output from the first pressure relief hole 1131 cancel out with a sound emitted from the sound outlet hole 112 via the leakage structure in the far-field, the first pressure relief hole 1131 should be provided close to the leakage structure. Since the leakage structure may be close to the upper side surface US of the sound production component 11, the first pressure relief hole is provided in a region close to the upper side surface US or the outer side surface US that closes to the upper side surface OS. In some embodiments, in order to enhance the sound output from the first pressure relief hole 1131 to cancel a sound leaked via the leakage structure in the far-field, and to enhance the sound leakage reduction effect, the first pressure relief hole 1131 is provided on the upper side surface US.

In some embodiments, the sound production component 11 is at least partially inserted into the cavum concha to ensure that all or a portion of an area of the first pressure relief hole 1131 is not blocked due to the abutment of the free end FE with a wall surface of the cavum concha, so that an effective area of the first pressure relief hole 1131 is reduced, and a distance between the first pressure relief hole 1131 and the rear side surface RS of the sound production component along the X-direction 11 may not be too close. Thus, in some embodiments, the distance $d_1$ between the center $O_1$ of the first pressure relief hole 1131 and the rear side surface RS ranges from 8.60 mm to 15.68 mm. In some embodiments, the distance $d_1$ between the center $O_1$ of the first pressure relief hole 1131 and the rear side surface RS ranges from 10.44 mm to 15.68 mm. In some embodiments, the distance $d_1$ between the center $O_1$ of the first pressure relief hole 1131 and the rear side surface RS ranges from 11.00 mm to 14.55 mm. In some embodiments, the distance $d_1$ between the center $O_1$ of the first pressure relief hole 1131 and the rear side surface RS ranges from 12.15 mm to 13.25 mm.

In some embodiments, in order to keep the sound outlet hole 112 close to the car canal and at the same time to keep the first pressure relief hole 1131 far away from the car canal, so as to prevent the sound output from the first pressure relief hole 1131 from being canceling out with the sound output from the sound outlet hole 112 in the car canal, resulting in the weakened listening effect and enhancing the listening effect in the car canal, the sound output hole 112 may be limited to be close to the car canal and the first pressure relief hole 1131 be farther away from the car canal. Accordingly, in some embodiments, a distance between the center O of the sound outlet hole 112 on the sagittal plane and a projection point of a center $O_3$ of an car canal opening on the sagittal plane is in a range of 2.2 mm to 3.8 mm, in which configuration, the first pressure relief hole 1131 is farther away from the car canal, so in order to enhance the listening effect in the car canal, a distance between a projection point of the center $O_1$ of the first pressure relief hole 1131 on the sagittal plane and the projection point of the center $O_3$ of the car canal opening on the sagittal plane ranges from 12 mm to 18 mm. A maximum distance between the first pressure relief hole 1131 and the car canal is limited by the dimension of the sound production component 11. In some embodiments, due to the presence of a tragus around the car canal, the sound outlet hole 112 may be easily blocked by the tragus, and at this time, in order to keep the sound outlet hole 112 as close to the car canal as possible and not blocked, the distance between the projection point of the center O of the sound outlet hole 112 on the sagittal plane and the projection point of the center $O_3$ of the car canal opening on the sagittal plane is in a range of 2.4 mm to 3.4 mm, and the distance between the projection point of the center $O_1$ of the first pressure relief hole 1131 on the sagittal plane and the projection point of the center $O_3$ of the car canal opening on the sagittal plane is in a range of 14 mm to 18 mm. In some embodiments, in order to further enhance the listening effect in the car canal, a distance between the sound outlet hole 112 and the car canal may be reduced, and a distance between the first pressure relief hole 1131 and the car canal may be increased, so that the distance between the projection point of the center O of the sound outlet hole 112 on the sagittal plane and the projection point of the center $O_3$ of the car canal opening on the sagittal plane ranges from 2.4 mm to 3.2 mm, and the distance between the projection point of the center $O_1$ of the first pressure relief hole 1131 on the sagittal plane and the projection point of the center $O_3$ of the car canal opening on the sagittal plane ranges from 15.5 mm to 18 mm.

In some embodiments of the present disclosure, by limiting the distance between the first pressure relief hole 1131 and the car canal, and at the same time limiting the distance between the sound outlet hole 112 and the car canal, it can make the first pressure relief hole 1131 be set far away from the car canal, preventing the sound output from the first pressure relief hole 1131 from canceling with the sound output from the sound output hole 112 in the car canal, which results in a weakened listening effect.

A thickness dimension of the sound production component 11 illustrated in FIG. 17 is similar to a thickness dimension of the sound production component 11 illustrated in FIG. 7: in order to ensure that the sound production component 11 can have a good acoustic output effect as well as to ensure the stability while a user wearing the earphone, a thickness of the sound production component 11 may be in a range of 2 mm to 20 mm in some embodiments in some embodiments. In some embodiments, the thickness of the sound production component 11 may be 5 mm-15 mm. In some embodiments, the thickness of the sound production component 11 may be 6 mm-12 mm. In this case, the first pressure relief hole 1131 is provided on the upper side surface US, and the first pressure relief hole 1131 may be provided away from the sound outlet hole 112 along the Z-direction by defining a distance between the first pressure relief hole 1131 and the inner side surface IS. Therefore, in some embodiments, the thickness of the sound production component 11 is 6 mm-12 mm, and a distance $c_1$ between the center $O_1$ of the first pressure relief hole 1131 and the inner side surface IS of the sound production component 11 along the Z-direction ranges from 4.24 mm to 6.38 mm. In some embodiments, the thickness of the sound production component 11 is in a range of 6 mm-12 mm, and the distance between the center $O_1$ of the first pressure relief hole 1131 and the inner side surface IS is further increased so that the first pressure relief hole 1131 is disposed further away from the sound outlet hole 112 along the Z-direction, whereby the distance cy between the center $O_1$ of the first pressure relief hole 1131 and the inner side surface IS of the sound production component 11 along the Z-direction is in a range of 4.80 mm to 6.38 mm. In some embodiments, in order to reduce the overall dimension or mass of the sound production component 11 and reduce the thickness of the sound production component 11, a maximum distance between the center $O_1$ of the first pressure relief hole 1131 and the inner side surface IS had to be reduced, and based on which, a minimum distance between the center $O_1$ of the first pressure relief hole 1131 and the inner side surface IS is increased, so as to ensure that the first pressure relief hole 1131 is set further away from the sound outlet hole 112 along the Z-direction, so that the thickness of the sound production component 11 is 5 mm-12 mm, and the distance $c_1$ between the center $O_1$ of the first pressure relief hole 1131 and the inner side surface IS of the sound production component 11 along the Z-direction is in a range of 5.20 mm to 5.55 mm.

In some embodiments of the present disclosure, by limiting the thickness of the sound production component 11 and the distance between the first pressure relief hole 1131 and the inner side surface IS, the first pressure relief hole 1131 can be set far away from the sound outlet hole 112, so that the effect of the sound emitted from the first pressure relief hole 1131 at the listening position (i.e., the car canal) to cancel the sound emitted from the sound outlet hole 112 is weakened, which in turn allows the volume at the listening position to increase.

In some embodiments, at least one of one or more pressure relief holes 113 provided on a side surface of the housing 111 other than the inner side surface that is acoustically coupled to the rear cavity includes a second pressure relief hole 1132, the second pressure relief hole 1132 may be a pressure relief hole identical to the second pressure relief hole 1132, and the second pressure relief hole 1132 may be provided on the upper side surface US, the outer side surface OS, or the lower side surface LS of the sound production component 11. In some embodiments, when the free end FE of the sound production component 11 is pressed against the cavum concha, such that the leakage structure formed by the sound production component 11 and the cavum concha is close to the lower side surface LS of the sound production component 11, in order to make a sound output from the second pressure relief hole 1132 to cancel out with a sound emitted from the sound outlet hole 112 via the leakage structure in the far-field, the second pressure relief hole 1132 should be provided close to the leakage structure. Since the leakage structure may be close to the lower side surface LS of the sound production component 11, the second pressure relief hole 1132 is provided in a region close to the lower side surface US or the outer side surface OS that closes to the lower side surface US. In some embodiments, the second pressure relief hole 1132 is provided on the lower side surface US in order to enhance the sound outputted from the second pressure relief hole 1132 to cancel with the sound that is leaked out via the leakage structure in the far-field and to enhance the sound leakage reduction effect. In some embodiments, the sound production component 11 is at least partially inserted into the cavum concha to ensure that all or a portion of an area of the second pressure relief hole 1132 is not blocked due to the abutment of the free end FE with the wall surface of the cavum concha, so that an effective area of the second pressure relief hole 1132 is reduced, and a distance between the second pressure relief hole 1132 and the rear side surface RS of the sound production component 11 along the X-direction is not too close. Accordingly, in some embodiments, a distance $d_3$ between the center $O_2$ of the second pressure relief hole 1132 and the rear side surface RS ranges from 13.51 mm to 20.27 mm. In some embodiments, the distance $d_3$ between the center $O_2$ of the second pressure relief hole 1132 and the rear side surface RS ranges from 15.00 mm to 19.55 mm. In some embodiments, the distance $d_3$ between the center $O_2$ of the second pressure relief hole 1132 and the rear side surface RS ranges from 17.15 mm to 18.25 mm.

Similarly to the first pressure relief hole 1131, in some embodiments, in order to keep the sound outlet hole 112 close to the car canal while keeping the second pressure relief hole 1132 away from the car canal to avoid the sound output from the second pressure relief hole 1132 cancels the sound output from the sound outlet hole 112 in the car canal, thereby enhancing the listening effect at the car canal, the sound outlet hole 112 may be limited to be close to the car canal and the second pressure relief hole 1132 to be far away from the car canal. Accordingly, in some embodiments, the distance between the projection point of the center O of the sound outlet hole 112 on the sagittal plane and the projection point of the center $O_3$ of the car canal opening on the sagittal plane ranges from 2.2 mm to 3.8 mm, and in this configuration, the second pressure relief hole 1132 is far away from the car canal to enhance the listening effect in the car canal, and the distance between the projection point of the center $O_2$ of the second pressure relief hole on the sagittal plane and the projection point of the center $O_3$ of the car canal opening on the sagittal plane ranges from 6.88 mm to 10.32 mm. A maximum distance between the second pressure relief hole 1132 and the car canal is limited by the dimension of the sound production component 11. In some embodiments, due to the presence of the tragus around the car canal, the sound outlet hole 112 may be easily blocked by the tragus, and at this point, in order to keep the sound outlet hole 112 as close to the car canal as possible and not be blocked, the distance between the projection point of the center O of the sound outlet hole 112 on the sagittal plane and the projection point of the center $O_3$ of the car canal opening on the sagittal plane is in a range of 2.4 mm to 3.4 mm, and the distance between the projection point of the center O2 of the second pressure relief hole on the sagittal plane and the projection point of the center $O_3$ of the car canal opening on the sagittal plane is in a range of 7.88 mm to 10.32 mm. In some embodiments, in order to further enhance the listening effect in the car canal, the distance between the sound outlet hole 112 and the car canal may be reduced, and the distance between the second pressure relief hole 1132 and the car canal may be increased, so that the distance between the projection point of the center O of the sound outlet hole 112 on the sagittal plane and the projection point of the center $O_3$ of the car canal opening on the sagittal plane ranges from 2.4 mm to 3.2 mm, and the distance between the projection point of the center $O_2$ of the second pressure relief hole on the sagittal plane and the projection point of the center $O_3$ of the car canal opening on the sagittal plane ranges from 8.32 mm to 10.32 mm.

In some embodiments of the present disclosure, by limiting the distance between the second pressure relief hole 1132 and the car canal, and at the same time limiting the distance between the sound outlet hole 112 and the car canal, it can make the second pressure relief hole 1132 be set far away from the car canal and avoid that the sound output from the second pressure relief hole 1132 canceling the sound output from the sound output hole 112 in the car canal, resulting in a weakened listening effect.

Similarly to the first pressure relief hole 1131, the second pressure relief hole 1132 is provided on the lower side surface, and the second pressure relief hole 1132 may be located far away from the sound outlet hole 112 along the Z-direction by limiting the distance between the second pressure relief hole 1132 and the inner side surface IS, so as to avoid an excessive sound output from the second pressure relief hole 1132 entering the cavity structure through the leakage structure to cancel the sound output from the sound outlet hole 112, resulting in a weakened listening effect. Therefore, in some embodiments, the thickness of the sound production component 11 is 6 mm to 12 mm, and a distance c2 between the center $O_2$ of the second pressure relief hole 1132 and the inner side surface IS of the sound production component 11 along the Z-direction ranges from 4.24 mm to 6.38 mm. In some embodiments, the thickness of the sound production component 11 is 6 mm-12 mm, and the distance between the center $O_2$ of the second pressure relief hole 1132 and the inner side surface IS is further increased so that the second pressure relief hole 1132 is disposed further away from the sound outlet hole 112 along the Z-direction, whereby the distance c2 between the center $O_2$ of the second pressure relief hole 1132 and the inner side surface IS of the sound production component 11 along the Z-direction is in a range of 4.80 mm to 6.38 mm. In some embodiments, in order to reduce the overall dimension or mass of the sound production component 11 and reduce the thickness of the sound production component 11, a maximum distance between the center $O_2$ of the second pressure relief hole 1132 and the inner side surface IS had to be reduced, and based on which, a minimum distance between the center $O_2$ of the second pressure relief hole 1132 and the inner side surface IS was increased, so as to ensure that the second pressure relief hole 1132 is set farther away from the sound outlet hole 112 along the Z-direction, so that the thickness of the sound production component 11 is 5 mm-12 mm, and the distance c2 between the center $O_2$ of the second pressure relief hole 1132 and the inner side surface IS of the sound production component 11 along the Z-direction is in a range of 5.20 mm to 5.55 mm.

In some embodiments of the present disclosure, by limiting a position of the second pressure relief hole 1132 along the Z-direction based on the thickness of the sound production component 11, it can make the second pressure relief hole 1132 be disposed far away from the sound outlet hole 112 and avoids that the sound output from the second pressure relief hole 1132 canceling with the sound output from the sound outlet hole 112 in the car canal, resulting in a weakened listening effect.

In some embodiments, the cavity structure formed between the sound production component 11 and the cavum concha has at least two leakage structures, and the free end FE may be abutted in the cavum concha along the long-axis direction X and the short-axis direction Y. At this time, the inner side surface IS of the sound production component 11 is inclined to the sagittal plane, and at this time there is at least a first leakage structure UC (i.e., a gap between the cavum concha and an upper boundary of the inner side surface IS) proximate to a top of the head and a second leakage structure LC (i.e., a gap between the cavum concha and a lower boundary of the inner side surface IS) proximate to the car canal between the inner side surface IS of the sound production component and the cavum concha. In some embodiments, when the earphone 10 is worn in a wearing manner shown in FIG. 17, the first leakage structure UC and the second leakage structure LC formed between the inner side surface IS of the sound production component and the cavum concha are formed along the long-axis direction X and the thickness direction Z have a certain scale. In some embodiments, in order to facilitate the understanding of positions of the first leakage structure UC and the second leakage structure LC, a midpoint of two points formed when upper/lower boundaries of the inner side surface IS intersect with an car (sidewalls of the cavum concha and a crus of helix) when the earphone 10 is in the wearing state is taken as position reference points of the first leakage structure UC and the second leakage structure LC, and the center of the car canal opening of the car canal is taken as a position reference point of the car canal. In some embodiments, in order to facilitate the understanding of the positions of the first leakage structure UC and the second leakage structure LC, a midpoint of the upper boundary of the inner side surface IS may be used as the position reference point of the first leakage structure UC, and a three-equivalent of the lower boundary of the inner side surface IS near the free end FE (hereinafter referred to as a ⅓ point of the lower boundary of the inner side surface IS) as the position reference point of the second leakage structure LC when the earphone 10 is in the wearing state. In the present disclosure, when a junction between the inner side surface IS and the upper side surface US and/or the lower side surface LS is curved, the upper boundary of the inner side surface IS refers to an intersection line between the inner side surface IS and the upper side surface US, and the lower boundary of the inner side surface IS refers to an intersection line between the inner side surface IS and the lower side surface LS. In some embodiments, when one or more of the side surfaces of the sound production component 11 (e.g., the inner side surface IS, the upper side surface US, and/or the lower side surface LS) are curved, the intersection line between two side surfaces refers to an intersection line between planes of the two side surfaces that are furthest from a center of the sound production component and parallel to the long axis or the short axis of the sound production component.

As an example only, the present disclosure may use the midpoint of the upper boundary of the inner side surface IS and the ⅓ point of the lower boundary as the position reference points of the first leakage structure UC and the second leakage structure LC, respectively. It is to be understood that a selected midpoint of the upper boundary of the inner side surface IS and the ⅓ point of the lower boundary are only to be used as exemplary reference points for describing the positions of the first leakage structure UC and the second leakage structure LC. In some embodiments, other reference points may be selected to describe the positions of the first leakage structure UC and the second leakage structure LC. For example, due to the variability of different users' cars, which results in the first leakage structure UC/second leakage structure LC formed when the earphone 10 is in the wearing state being a gap with a gradual width, in this case, the reference position of the first leakage structure UC/second leakage structure LC may be a position close to a region with a largest gap width on the upper/lower boundary of the inner side surface IS. For example, the midpoint of the upper boundary of the inner side surface IS may be a position of the first leakage structure UC, and the ⅓ point of the lower boundary of the inner side surface IS proximate to the free end FE may be a position of the second leakage structure LC.

Figure 22:
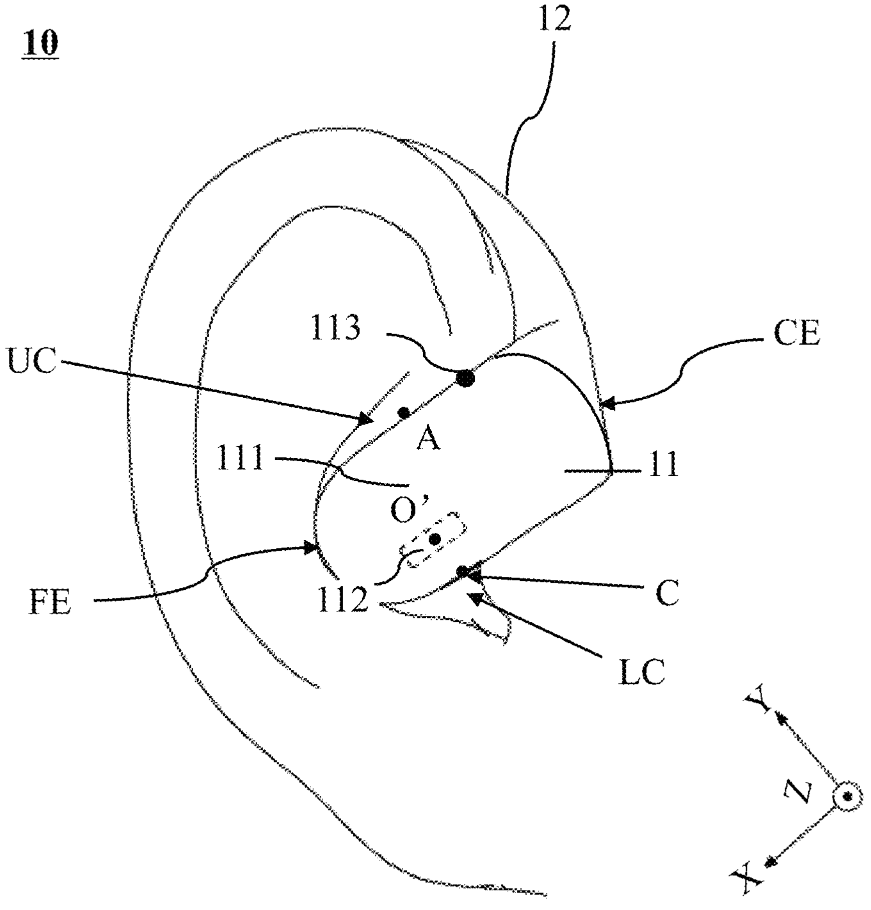
FIG. 22 is a schematic diagram illustrating an exemplary projection of an open earphone on a sagittal plane when the open earphone is in a wearing state according to some embodiments of the present disclosure.

FIG. 22 is a schematic diagram illustrating an exemplary projection of an open earphone on a sagittal plane when the earphone is in a wearing state according to some embodiments of the present disclosure. In some embodiments, a projection of an upper boundary of the inner side surface IS on the sagittal plane, as shown in FIG. 22, may coincide with a projection of the upper side surface US on the sagittal plane, and a projection of a lower boundary of the inner side surface IS on the sagittal plane may coincide with a projection of the lower side surface LS on the sagittal plane. A projection of a position reference point of the first leakage structure UC (i.e., the midpoint of the upper boundary of the inner side surface IS) on the sagittal plane is a point A, and a projection of a position reference point of the second leakage structure LC (i.e., the ⅓ point of the lower boundary of the inner side surface IS) on the sagittal plane is a point C. The expression "the projection point A of the midpoint of the upper boundary of the inner side surface IS on the sagittal plane" may refer to a projection point of an intersection point between the upper boundary of the inner side surface IS and a short-axis center plane of a magnetic circuit assembly of a transducer on the sagittal plane. The short-axis center plane of the magnetic circuit assembly is a plane parallel to the short-axis direction of the sound production component 11 and passes through a geometric center of the magnetic circuit assembly. The expression "the projection point C of the ⅓ point of the lower boundary of the inner side surface IS on the sagittal plane" may be a projection point of a three-equivalent point on the inner side surface IS that closes to the free end FE on the sagittal plane.

As shown in FIG. 22, in the wearing state, a projection of the sound production component 11 of the earphone 10 on the sagittal plane may at least partially cover the car canal of the user, but the car canal may be connected to an outside world through a leakage structure to realize the liberation of the user's cars. A sound from the sound outlet hole 112 may be leaked through the leakage structure, and to ensure that less sound is leaked from the sound outlet hole 112, the sound outlet hole 112 should be provided away from the leakage structure. In some embodiments, on the premise that the sound production component 11 is at least partially inserted into the cavum concha, in order to keep the sound outlet hole 112 away from the second leakage structure and to avoid the sound from the sound outlet hole 112 from leaking out excessively without being received by the car canal, the cavity structure has a suitable volume V for the better listening effect of the ear canal. A distance between the first pressure relief hole 1131 and the second leakage structure is related to a dimension of the sound production component 11, and when the distance between the first pressure relief hole 1131 and the second leakage structure is large, it means that the dimension of the sound production component 11 is large, i.e., the larger the dimension of the cavity structure, the better to enhance the listening effect. Therefore, in order to enhance the listening effect in the car canal, a distance between the sound outlet hole 112 and the second leakage structure may be increased, and at the same time, the distance between the first pressure relief hole 1131 and the second leakage structure may be increased. However, the dimension of the sound production component 11 should not be too large, or else it may affect the stability and comfort of the earphone 10 when worn. Thus, in some embodiments, a distance between a projection point of the center $O_1$ of the first pressure relief hole 1131 on the sagittal plane and the projection B of the ⅓ point of the lower boundary of the inner side surface IS on the sagittal plane ranges from 13.76 mm ~20.64 mm, and the distance between a projection point O' of the center O of the sound outlet hole 112 on the sagittal plane and the projection point C of the ⅓ point of the lower boundary of the inner side surface IS on the sagittal plane ranges from 3.5 mm to 5.6 mm. In some embodiments, the cavity structure is further enlarged to enhance the clustering of the sound output from the sound outlet hole 112, and the distance between the sound outlet hole 112 and the second leakage structure is increased. The distance between the projection point of the center $O_1$ of the first pressure relief hole 1131 on the sagittal plane and the projection point of the ⅓ point of the lower boundary of the inner side surface IS on the sagittal plane ranges from 15.76 mm to 20.64 mm, and the distance between the projection point O' of the center O of the sound outlet hole 112 on the sagittal plane and the projection point C of the ⅓ point of the lower boundary of the inner side surface IS on the sagittal plane ranges from 3.9 mm to 5.6 mm. In some embodiments, in order to enhance the comfort when a user wears the earphone and avoid the dimension of the sound production component 11 being too large, i.e., to avoid the volume of the cavity structure being larger, the cavity structure may be reduced, and the distance between the sound outlet hole 112 and the second leakage structure is reduced. The distance between the projection point of the center $O_1$ of the first pressure relief hole 1131 on the sagittal plane the projection point B of the ⅓ point of the lower boundary of the inner side surface on the sagittal plane is in a range of 16.16 mm to 18.24 mm, and the distance between the projection point O' of the center O of the outlet hole 112 on the sagittal plane and the projection point C of the ⅓ point of the lower boundary of the inner side surface IS on the sagittal plane is in a range of 4.3 mm to 4.8 mm.

Similarly, in some embodiments, on the premise that the sound production component 11 is at least partially inserted into the cavum concha, in order to make the sound outlet hole 112 set away from an upper leakage structure and avoid excessive leakage of the sound from the sound outlet hole 112 before it is received by the car canal, the cavity structure has a suitable volume V for better sound listening effect in the car canal. A distance between the second pressure relief hole 1132 and the upper leakage structure is related to the dimension of the sound production component 11, and when the distance between the second pressure relief hole 1132 and the upper leakage structure is large, it means that the dimension of the sound production component 11 is large, i.e. the larger the dimension of the cavity structure, the better to enhance the listening effect. Therefore, in order to enhance the listening effect in the car canal, it may increase the distance between the sound outlet hole 112 and the upper leakage structure, and at the same time increase the distance between the second pressure relief hole 1132 and the upper leakage structure. However, the dimension of the sound production component 11 should not be too large, or else it may affect the stability and comfort of the earphone 10 when worn. Thus, in some embodiments, the distance between the projection point of the center $O_2$ of the second pressure relief hole 1132 on the sagittal plane and the projection point A of the midpoint of the upper boundary of the inner side surface IS on the sagittal plane ranges from 14.4 mm to 21.6 mm, and the distance between the projection point O' of the center O of the sound outlet hole 112 on the sagittal plane and the projection point A of the midpoint of the upper boundary of the inner side surface IS on the sagittal plane ranges from 10.0 mm to 15.2 mm. In some embodiments, the cavity structure is further enlarged to enhance the clustering of the sound output from the sound outlet hole 112, and the distance between the sound outlet hole 112 and the upper leakage structure is increased. The distance between the projection point of the center $O_2$ of the second leakage hole 1132 on the sagittal plane and the projection point A of the midpoint of the upper boundary of the inner side surface IS on the sagittal plane ranges from 17.4 mm to 21.6 mm, and the distance between the projection point O' of the center of the sound outlet hole 112 on the sagittal plane and the projection point A of the midpoint of the upper boundary of the inner side surface IS on the sagittal plane ranges from 13.0 mm to 15.2 mm. In some embodiments, in order to enhance the comfort of the user wearing the earphone and to avoid the dimension of the sound production component 11 being too large, i.e., to avoid the volume of the cavity structure being large, the cavity structure may be reduced, and the distance between the sound outlet hole 112 and the second leakage structure is also reduced. The distance between the projection point of the center $O_2$ of the second pressure relief hole 1132 on the sagittal plane and the projection point A of the midpoint of the upper boundary of the inner side surface IS on the sagittal plane is in a range of 17.4 mm to 18.2 mm, and the distance between the projection point O' of the center O of the sound outlet hole 112 on the sagittal plane and the projection point A of the midpoint of the upper boundary of the inner side surface IS on the sagittal plane is in a range of 13.0 mm to 14.2 mm.

In some embodiments, since the sound outlet hole 112 is provided close to the lower side surface LS, the second pressure relief hole 1132 is closer to the sound outlet hole 112 along the Y-direction relative to the first pressure relief hole 1131, and the second pressure relief hole 1132 on the lower side surface LS should be provided as far away from the sound outlet hole 112 as possible, so that the effect of the sound emitted from the second pressure relief hole 1132 canceling with the sound emitted from the sound outlet hole 112 at a listening position (i.e., the car canal) is weakened, which in turn results in an increase in the volume at the listening position. Accordingly, in some embodiments, the second pressure relief hole 1132 may be made to move away from the sound outlet hole 112 along the X-direction so that the distance between the sound outlet hole 112 and the second pressure relief hole 1132 is as large as possible. In such embodiments, the second pressure relief hole 1132 may be provided further away from the rear side surface RS (or the free end FE) than the first pressure relief hole 1131.

In some embodiments, in order to keep the sound outlet hole 112 away from the second leakage structure and avoid excessive leakage of the sound from the sound outlet hole 112 before it is received by the car canal, and in order to avoid the sound output from the second pressure relief hole 1132 is more likely to pass through the second leakage structure into the cavity structure, which may cancel with the sound output from the sound outlet hole 112, resulting in a weakened listening effect, the second pressure relief hole 1132 may be set away from the second leakage structure. Therefore, in order to enhance the listening effect in the car canal, the distance between the sound outlet hole 112 and the second leakage structure may be increased, and at the same time, the distance between the second pressure relief hole 1132 and the second leakage structure may be increased. Accordingly, in some embodiments, the distance between the projection point O' of the center O of the sound outlet hole 112 on the sagittal plane and the projection point C of the ⅓ point of the lower boundary of the inner side surface IS on the sagittal plane ranges from 3.5 mm to 5.6 mm, and the distance between the projection point O' of the center $O_2$ of the second pressure relief hole 1132 on the sagittal plane and the projection point B of the ⅓ point of the lower boundary of the inner side surface IS on the sagittal plane ranges from 8.16 mm to 12.24 mm. In some embodiments, in order to reduce the sound of the second pressure relief hole 1132 passing into the cavity structure through the second leakage structure LC to cancel with the sound of the sound outlet hole 112, the distance between the sound outlet hole 112 and the second leakage structure may be increased, and at the same time, the distance between the second pressure relief hole 1132 and the second leakage structure may be increased, and the distance between the projection point O' of the center O of the sound outlet hole 112 on the sagittal plane and the projection point C of the ⅓ point of the lower boundary of the inner side surface IS on the sagittal plane ranges from 4.3 mm to 5.6 mm, and the distance between the projection point of the center $O_2$ of the second pressure relief hole 1132 on the sagittal plane and the projection point B of the ⅓ point of the lower boundary of the inner side surface IS on the sagittal plane ranges from 9.16 mm to 12.24 mm. In some embodiments, when the sound outlet hole 112 is provided close to the car canal, the distance between the sound outlet hole 112 and the second leakage structure may be increased, and on this basis, the distance between the second pressure relief hole 1132 and the second leakage structure may be increased, so as to improve the listening effect in the ear canal. The distance between the projection point O' of the center O of the sound outlet hole 112 on the sagittal plane and the projection point C of the ⅓ point of the lower boundary of the inner side surface IS on the sagittal plane ranges from 4.8 mm to 5.6 mm, and the distance between the projection point of the center $O_2$ of the second pressure relief hole 1132 on the sagittal plane and the projection point B of the ⅓ point of the lower boundary of the inner side surface IS on the sagittal plane ranges from 9.66 mm to 12.24 mm.

In some embodiments of the present disclosure, by limiting the distance between the second pressure relief hole 1132 and the second leakage structure, it may cause the second pressure relief hole 1132 to be set away from the leakage structure, thereby avoiding the sound output from the second pressure relief hole 1132 passing through the leakage structure in a relatively large amount into the cavity structure to cancel with the sound output from the sound outlet hole 112, and resulting in a weakened listening effect.

In some embodiments, in addition to the inner side surface IS, at least two pressure relief holes 113 may be provided on other side surfaces of the housing 111 (e.g., the outer side surface OS, the upper side surface US, or the lower side surface LS, etc.), and the provision of the at least two pressure relief holes 113 may destroy standing waves in the rear cavity so that a resonance frequency of the sound exported from the pressure relief hole 113 to the outside of the housing 111 is as high as possible, thereby enabling a frequency response of the rear cavity to have a wide flat region (e.g., a region before a resonance peak) and obtaining a better sound leakage reduction effect in a mid-to-high frequency range (e.g., 2 kHz to 6 kHz). As an example only, the pressure relief hole 113 may include the first pressure relief hole 1131 and the second pressure relief hole 1132. In some embodiments, the first pressure relief hole 1131 and the second pressure relief hole 1132 may be disposed on the same side surface of the housing 111, e.g., the first pressure relief hole 1131 and the second pressure relief hole 113 may be disposed on both the outer side surface OS, the upper side surface US, or the lower side surface LS. In some embodiments, corresponding to the first leakage structure UC and the second leakage structure LC, the first pressure relief hole 1131 and the second pressure relief hole 1132 may be provided proximate to the first leakage structure UC and the second leakage structure LC, respectively. For example, the first pressure relief hole 1131 may be provided on the upper side surface US, and the second pressure relief hole 1132 may be provided in a region on the outer side surface OS that is proximate to the lower side surface LS, or the second pressure relief hole 1132 may be provided on the lower side surface LS, and the first pressure relief hole 1131 may be provided in a region on the outer side surface OS that is near the upper side surface US. In some embodiments, in order to maximize disruption of standing waves in the rear cavity, the two pressure relief holes 113 may be disposed on opposing side surfaces of the housing 111, e.g., the first pressure relief hole 1131 may be disposed on the upper side surface US, and the second pressure relief hole 1132 may be provided on the lower side surface LS. For case of description, as shown in FIG. 17, the present disclosure will exemplarily illustrate, for example, that the first pressure relief hole 1131 is provided on the upper side surface US and the second pressure relief hole 1132 is provided on the lower side surface LS. It is to be understood that dimensional parameters related to the first pressure relief hole 1131 or the second pressure relief hole 1132 provided individually, which are involved in the foregoing embodiment, are also applicable to the first pressure relief hole 1131 and the second pressure relief hole 1132 provided at the same time.

The first pressure relief hole 1131 is provided on the upper side surface US of the sound production component 11, while the second pressure relief hole 1132 is provided on the lower side surface LS, and when a short-axis dimension of the sound production component 11 is determined, i.e., when the short-axis dimension of the sound production component 11 is in a range of 10 mm to 15 mm, in this configuration, in order to enhance a sound intensity (volume) of the sound outlet hole 112 in the car canal (i.e., a listening position), the sound outlet hole 112 is be provided away from the first pressure relief hole 1131 and the second pressure relief hole 1132, based on this, a distance between the first pressure relief hole 1131 and the second pressure relief hole 1132 should be set farther away. Therefore, in some embodiments, the short-axis dimension of the sound production component 11 is in a range of 10 mm to 15 mm, and a distance between a projection point of the center $O_1$ of the first pressure relief hole 1131 on the sagittal plane and a projection point of the center $O_2$ of the second pressure relief hole 1132 on the sagittal plane ranges from 8.51 mm to 15.81 mm. In some embodiments, the short-axis dimension of the sound production component 11 may be reduced to reduce a mass of the sound production component 11, where a maximum distance between the first pressure relief hole 1131 and the second pressure relief hole 1132 is then reduced, and the distance between the first pressure relief hole 1131 and the second pressure relief hole 1132 is limited to a large range as much as possible, so that the short-axis dimension of the sound production component 11 is in a range of 11 mm to 13.5 mm, and the distance between the projection point of the 01 of the first pressure relief hole 113 on the sagittal plane and the projection point of the center $O_2$ of the second pressure relief hole 1132 on the sagittal plane ranges from 10.51 mm to 14.81 mm. In some embodiments, similarly, the short-axis dimension of the sound production component 11 ranges from 12 mm to 13 mm, and the distance between the projection point of the center $O_1$ of the first pressure relief hole 1131 on the sagittal plane and the projection point of the center $O_2$ of the second pressure relief hole 1132 on the sagittal plane is in a range of 12.51 mm to 13.81 mm.

In some embodiments, in order to avoid the sound output from the first pressure relief hole 1131 and the second pressure relief hole 1132 affecting the volume of the sound output from the sound outlet hole 112 at the listening position, the first pressure relief hole 1131 and the second pressure relief hole 1132 should be located as far as possible far away from the sound outlet hole 112, for example, a center of the sound outlet hole 112 is located on or near a midperpendicular plane of a line connecting a center of the first pressure relief hole and a center of the second pressure relief hole. In some embodiments, the distance between the center $O_1$ of the sound outlet hole and the midperpendicular plane of the line connecting the center of the first pressure relief hole and the center of the second pressure relief hole is in a range of 0 mm to 2 mm.

In some embodiments of the present disclosure, by limiting the distance between the first pressure relief hole 1131 and the second pressure relief hole 1132, and the distance between the sound outlet hole 112 and the line connecting the first pressure relief hole 1131 and the second pressure relief hole 1132, this can enable the sound outlet hole 112 to be simultaneously provided away from the first pressure relief hole 1131 and the second pressure relief hole 1132, avoiding the sound output from the first pressure relief hole 1131 and the second pressure relief hole 1132 from affecting the volume of the sound output from the sound outlet hole 112 at the listening position.

It should be noted that the first pressure relief hole 1131 is provided in the upper side surface US, and due to blocked by the car, there is a limited space on the upper side surface US of the sound production component 11 for the first pressure relief hole 1131 to be provided, and therefore the projection point of the center $O_1$ of the first pressure relief hole 1131 on the sagittal plane may substantially coincide with the projection point A of the midpoint of the upper boundary of the inner side surface IS on the sagittal plane. In some embodiments, the distance between the projection point of the center $O_1$ of the first pressure relief hole 1131 on the sagittal plane and the projection point A of the midpoint of the upper boundary of the inner side surface IS on the sagittal plane may be less than 2 mm. In some embodiments, the distance between the projection point of the center $O_1$ of the first pressure relief hole 1131 on the sagittal plane and the projection point A of the midpoint of the upper boundary of the inner side surface IS on the sagittal plane is no greater than 1 mm. In some embodiments, the distance between the projection point of the center $O_1$ of the first pressure relief hole 1131 on the sagittal plane and the projection point A of the midpoint of the upper boundary of the inner side surface IS on the sagittal plane is no more than 0.5 mm. In this configuration, the second pressure relief hole 1132 may be set away from the second leakage structure to avoid the sound output from the second pressure relief hole 1132 entering into the cavity structure through the second leakage structure in a relatively large amount, which then cancels out with the sound output from the sound output hole 112, resulting in a weekend listening effect, so the distance between the second pressure relief hole 1132 and the second leakage structure may be increased in order to enhance the listening effect in the car canal. Accordingly, in some embodiments, the distance between the projection point of the center $O_1$ of the first pressure relief hole 1131 on the sagittal plane and the projection point A of the midpoint of the upper boundary of the inner side surface IS on the sagittal plane is no more than 2 mm, and the distance between the projection point of the center $O_2$ of the pressure relief hole 1132 on the sagittal plane and the projection point B of the point ⅓ of the lower boundary of the inner side surface IS on the sagittal plane is in a range of 8.16 mm to 12.24 mm. In some embodiments, in order to reduce the sound from the second pressure relief hole 1132 passing into the cavity structure through the second leakage structure LC to cancel with the sound from the sound outlet hole 112, the distance between the second pressure relief hole 1132 and the second leakage structure may be increased, and the distance between the projection point of the center $O_1$ of the first pressure relief hole 1131 on the sagittal plane and the projection point A of the midpoint of the upper boundary of the inner side surface IS on the sagittal plane is no more than 2 mm, and the distance between the projection point of the center $O_2$ of the pressure relief hole 1132 on the sagittal plane and the projection point B of the point ⅓ of the lower boundary of the inner side surface IS on the sagittal plane is in a range of 9.16 mm to 12.24 mm. In some embodiments, the distance between the projection point of the center $O_1$ of the first pressure relief hole 1131 on the sagittal plane and the projection point A of the midpoint of the upper boundary of the inner side surface IS on the sagittal plane is no more than 2 mm, and the distance between the projection point of the center $O_2$ of the pressure relief hole 1132 on the sagittal plane and the projection point B of the point ⅓ of the lower boundary of the inner side surface IS on the sagittal plane is in a range of 9.66 mm to 12.24 mm.

In some embodiments of the present disclosure, by limiting the distance between the second pressure relief hole 1132 and the second leakage structure, it can enable the second pressure relief hole 1132 to be set far away from the leakage structure, avoiding the sound output from the second pressure relief hole 1132 passing through the leakage structure in a relatively large amount into the cavity structure to cancel with the sound output from the sound outlet hole 112, resulting in a weakened listening effect.

In some embodiments, by determining a relationship between a distance between the center $O_1$ of the first pressure relief hole 1131 and the center O of the sound outlet hole 112 (also referred to as a first distance) and a distance between the center O2 of the second pressure relief hole 1132 and the center O of the sound outlet hole 112 (which may also be referred to as a second distance), the center O of the sound outlet hole 112 is approximately on a midperpendicular plane of a connection line $O_1O_2$. In some embodiments, a difference between the first distance and the second distance is less than 10%. In some embodiments, the difference between the first distance and the second distance is less than 8%. In some embodiments, the difference between the first distance and the second distance is less than 5%. In some embodiments, the difference between the first distance and the second distance is less than 2%.

In some embodiments, in order to avoid sound waves emitted from pressure relief holes (e.g., the first pressure relief hole 1131 and the second pressure relief hole 1132) from canceling with sound waves emitted from the sound outlet hole 112 in a near-field and affecting the user's listening quality, a distance between the first pressure relief hole 1131 and the second pressure relief hole 1132 and the sound outlet hole 112 may not be too close. In some embodiments, a distance between the center $O_1$ of the first pressure relief hole 1131 and the center O of the sound outlet hole 112 may be in a range from 4 mm to 15.11 mm. In some embodiments, the distance between the center $O_1$ of the first pressure relief hole 1131 and the center O of the sound outlet hole 112 may be in a range from 4 mm to 15 mm. In some embodiments, the distance between the center $O_1$ of the first pressure relief hole 1131 and the center O of the sound outlet hole 112 may be in a range from 5.12 mm to 15.11 mm. In some embodiments, the distance between the center $O_1$ of the first pressure relief hole 1131 and the center O of the sound outlet hole 112 may be no less than 5 mm to 14 mm. In some embodiments, the distance between the center $O_1$ of the first pressure relief hole 1131 and the center O of the sound outlet hole 112 may be no less than 6 mm to 13 mm. In some embodiments, the distance between the center $O_1$ of the first pressure relief hole 1131 and the center O of the sound outlet hole 112 may be no less than 7 mm to 12 mm. In some embodiments, the distance between the center $O_1$ of the first pressure relief hole 1131 and the center O of the sound outlet hole 112 may be no less than 8 mm to 10 mm. In some embodiments, the distance between the center $O_1$ of the first pressure relief hole 1131 and the center O of the sound outlet hole 112 may be 9.55 mm. In some embodiments, a distance between the center $O_2$ of the second pressure relief hole 1132 and the center O of the sound outlet hole 112 may be in a range from 4 mm to 16.1 mm. In some embodiments, the distance between the center $O_2$ of the second pressure relief hole 1132 and the center O of the sound outlet hole 112 may be no less than 4 mm to 15 mm. In some embodiments, the distance between the center $O_2$ of the second pressure relief hole 1132 and the center O of the sound exit hole 112 may be no less than 5 mm to 14 mm. In some embodiments, the distance between the center $O_2$ of the second pressure relief hole 1132 and the center O of the sound outlet hole 112 may be in a range from 5.12 mm to 16.1 mm. In some embodiments, the distance between the center $O_2$ of the second pressure relief hole and the center O of the sound outlet hole 112 may be no less than 6 mm to 13 mm. In some embodiments, the distance between the center $O_2$ of the second pressure relief hole 1132 and the center O of the sound outlet hole 112 may not be less than 7 mm to 12 mm. In some embodiments, the distance between the center $O_2$ of the second pressure relief hole 1132 and the center O of the sound outlet hole 112 may be not less than 8 mm to 10 mm. In some embodiments, the distance between the center $O_2$ of the second pressure relief hole 1132 and the center O of the sound outlet hole 112 may be 9.15 mm.

In some embodiments, in order to maximize the distance between the first pressure relief hole 1131, the second pressure relief hole 1132, and the sound outlet hole 112, an angle between a connection line O10 connecting the center $O_1$ of the first pressure relief hole 1131 and the center O of the sound outlet hole 112 and a connection line $O_2O$ connecting the center $O_2$ of the second pressure relief hole 1132 and the center O of the sound outlet hole 112. In some embodiments, the angle between the connection line $O_1O$ and the connection line $O_2O$ ranges from 46.40° to 114.04°. In some embodiments, the angle between the connection line $O_1O$ and the connection line $O_2O$ ranges from 46.40° to 90.40°. In some embodiments, the angle between the connection line $O_1O$ and the connection line $O_2O$ ranges from 46.40° to 70.04°. In some embodiments, the angle between the connection line $O_1O$ and the connection line $O_2O$ ranges from 46.40° to 60.04°. In some embodiments, an angle between a connection line $O_1O_2$ connecting the center $O_1$ of the first pressure relief hole 1131 and the center $O_2$ of the second pressure relief hole 1132 and the connection line $O_2O$ ranges from 19.72° to 101.16°. In some embodiments, the angle between the connection line $O_1O_2$ and the connection line $O_2O$ ranges from 19.71° to 97.75°.

The description of the above earphone 10 is for the purpose of exposition only and is not intended to limit the scope of the present disclosure. For a person of ordinary skill in the art, a wide variety of variations and modifications can be made based on the description of the present disclosure. For example, when only one pressure relief hole is provided on the sound production component 11, the pressure relief hole may be any one of the first pressure relief hole 1131 or the second pressure relief hole 1132 described above. These variations and modifications remain within the scope of protection of the present disclosure.

Figure 23:
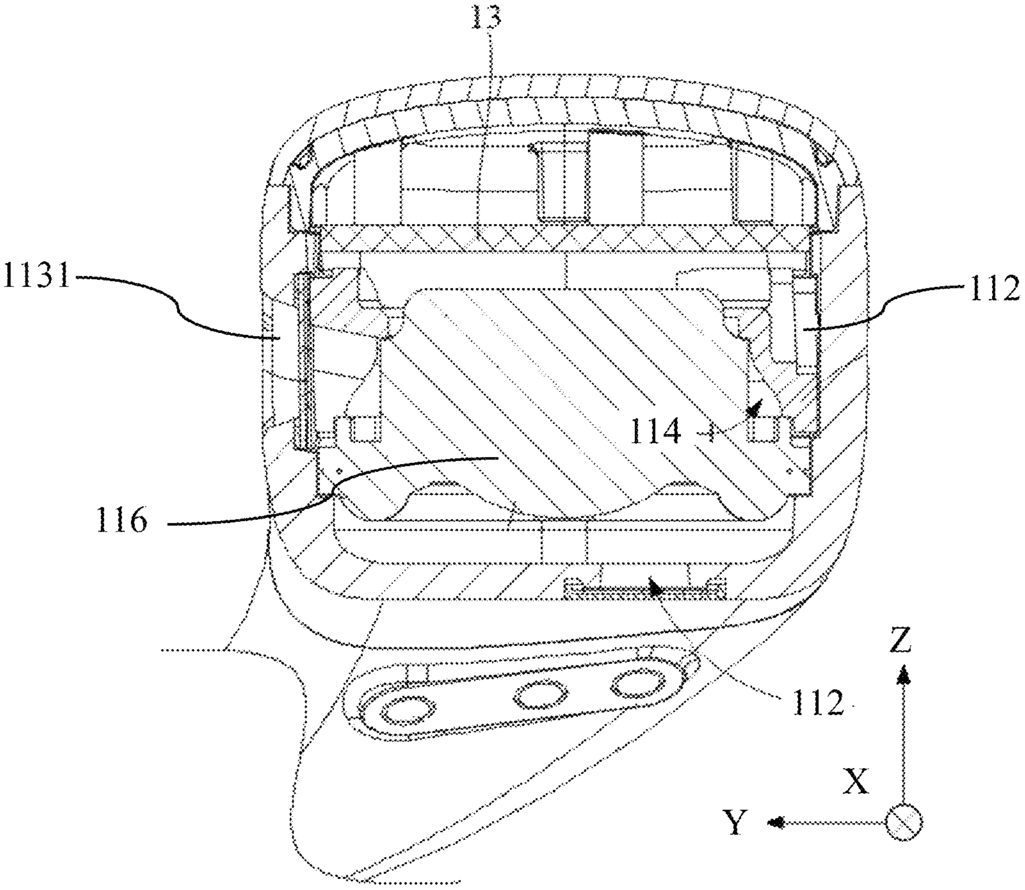
FIG. 23 is a schematic diagram illustrating an exemplary internal structure of a sound production component according to some embodiments of the present disclosure.

FIG. 23 is a schematic diagram illustrating an exemplary internal structure of a sound production component according to some embodiments of the present disclosure.

As shown in FIG. 23, the sound production component 11 may include the housing 111 coupled to the car-hook 12 and the transducer 116 disposed within the housing 111. In some embodiments, the sound production component 11 may also include a main control circuit board 13 disposed within the housing 111 and a battery (not shown in the figures) disposed at an end of the car-hook 12 away from the sound production component 11, with the battery and the transducer 116 being electrically coupled with the main control circuit board 13, respectively, which allows the battery to be to power the transducer 116 under the control of the main control circuit board 13. Both the battery and the transducer 116 may also be provided within the sound production component 11, and the battery may be located closer to the connection end CE and the transducer 116 may be located closer to the free end FE.

In some embodiments, the earphone 10 may include an adjustment mechanism connecting the sound production component 11 and the car-hook 12, where different users can adjust a relative position of the sound production component 11 on the car 100 by the adjustment mechanism in a wearing state, so that the sound production component 11 can be located at a suitable position, thereby causing the sound production component 11 to form a cavity structure with a cavum concha. In addition to this, a user is also able to adjust the earphone 10 to be worn to a stable and comfortable position due to the presence of the adjustment mechanism.

Since the cavum concha has a certain volume and depth, it is possible to have a certain space between the inner side surface IS of the sound production component 11 and the cavum concha after the free end FE extends into the cavum concha. In other words, the sound production component 11 and the cavum concha may cooperate to form a cavity structure that is connected to an external car canal in the wearing state, and the sound production component 11 (e.g., the inner side surface IS) is provided with the sound outlet hole hole 112, and the sound outlet hole 112 may be at least partially disposed within the cavity structure. In this way, in the wearing state, sound waves propagating from the sound outlet hole 112 are restricted by the cavity structure, i.e., the cavity structure can aggregate the sound waves so that the sound waves can well propagate into the external car canal, thereby improving the sound waves heard by the user in a near-field. Thereby, the volume and sound quality of the sound heard by the user in the near-field is improved, which is conducive to improving the acoustic effect of the earphone 10. Further, since the sound production component 11 may be provided so as not to block the external car canal in the wearing state, such that the cavity structure may be half-set. In this manner, a portion of the sound wave propagated by the sound outlet hole 112 may propagate to the car canal so that the user hears the sound, and another portion of the sound wave may be transmitted along with the sound reflected through the car canal through a leakage structure between the sound production component 11 and the car portion (e.g., a portion of the cavum concha that is not covered by the sound production component 11) to the exterior of the earphone 10 and the car 100, thereby forming a first sound leakage in the far-field; at the same time, sound waves propagated through the pressure relief holes 113 (e.g., the first pressure relief holes 1131 and the second pressure relief holes 1132) provided in the sound production component 11 generally form a second sound leakage in the far-field, and an intensity of the first sound leakage is similar to an intensity of the second sound leakage, and a phase of the first sound leakage and a phase of the second sound leakage are opposite (proximately) to each other, so that the two can cancel each other out in the far-field, which is conducive to reducing the sound leakage of the earphone 10 in the far-field.

In some embodiments, a front cavity 114 may be formed between the transducer 116 and the housing 111, with the sound outlet hole 112 being provided in a region of the housing 111 that surrounds the formation of the front cavity 114, and the front cavity 114 being connected to the outside world through the sound outlet hole 112.

In some embodiments, the front cavity 114 is provided between a diaphragm of the transducer 116 and the housing 111, and in order to ensure that the diaphragm has sufficient space for vibration, the front cavity 114 may have a large depth dimension (i.e., a distance dimension between the diaphragm of the transducer 116 and the housing 111 which the transducer 16 directly faces). In some embodiments, the sound outlet hole 112 is provided on the inner side surface IS along the thickness direction Z, as shown in FIG. 23, and at this time, a depth of the front cavity 114 refers to a dimension of the front cavity 114 along the Z-direction. However, too much depth in the front cavity 114 may in turn lead to an increase in the dimension of the sound production component 11, which may affect the wearing comfort of the earphone 10. In some embodiments, a depth of the front cavity 114 may be in a range from 0.55 mm to 1.00 mm. In some embodiments, the depth of the front cavity 114 may be in a range from 0.66 mm to 0.99 mm. In some embodiments, the depth of the front cavity 114 may be in a range from 0.76 mm to 0.99 mm. In some embodiments, the depth of the front cavity 114 may be in a range from 0.96 mm to 0.99 mm. In some embodiments, the depth of the front cavity 114 may be 0.97 mm.

In order to enhance the sound output effect of the earphone 10, a resonance frequency of a Helmholtz-like resonance cavity structure formed by the front cavity 114 and the sound outlet hole 112 is to be as high as possible as a means of making an overall frequency response curve of the sound production component have a wide flat region. In some embodiments, a resonance frequency f1 of the front cavity 114 may be no less than 3 kHz. In some embodiments, the resonance frequency f1 of the front cavity 114 may be no lower than 4 kHz. In some embodiments, the resonance frequency of the front cavity 114 may be no less than 6 kHz. In some embodiments, the resonance frequency of the front cavity 114 may be no less than 7 kHz. In some embodiments, the resonance frequency of the front cavity 114 may be no less than 8 kHz.

The basic concepts have been described above, and it is apparent to those skilled in the art that the foregoing detailed disclosure is intended as an example only and does not constitute a limitation of the present disclosure. Although not explicitly stated here, those skilled in the art may make various modifications, improvements and amendments to the present disclosure. These alterations, improvements, and modifications are intended to be suggested by the present disclosure, and are within the spirit and scope of the exemplary embodiments of the present disclosure.

The basic concepts have been described above, and it is apparent to those skilled in the art that the foregoing detailed disclosure is intended as an example only and does not constitute a limitation of the present disclosure. Although not explicitly stated here, those skilled in the art may make various modifications, improvements and amendments to the present disclosure. These alterations, improvements, and modifications are intended to be suggested by the present disclosure and are within the spirit and scope of the exemplary embodiments of the present disclosure.

What is claimed is:

1. An earphone, comprising:

a sound production component, comprising a transducer and a housing accommodating the transducer, a sound outlet hole being provided on an inner side surface of the sound production component, the inner side facing an auricle of a user, and the sound outlet hole being configured to transmit a sound produced by the transducer out of the housing toward an ear canal of the user; and an ear-hook, configured to place the sound production component at a position adjacent to the ear canal but not blocking an ear canal opening in a wearing state; wherein, at least a portion of the sound production component inserts into a cavum concha, a distance between a projection of a rear side surface of the sound production component on a sagittal plane and a projection of an edge of the cavum concha on the sagittal plane ranges from 0 mm to 7.25 mm, and a distance between a center of the sound outlet hole and the rear side surface of the sound production component ranges from 8.15 mm to 12.25 mm.

2. The earphone according to claim 1, wherein one or more pressure relief holes are provided on side surfaces of the sound production component other than the inner side surface, and a distance between a center of the one or more pressure relief holes and the rear side surface of the sound production component is in a range of 10.44 mm to 15.68 mm or 13.51 mm to 20.27 mm.

3. The earphone according to claim 1, wherein a projection of the sound production component on the sagittal plane and a projection of the cavum concha on the sagittal plane have an overlapping region, and a ratio of an area of the overlapping region to an area of the projection of the cavum concha on the sagittal plane is not less than 44.01%.

4. The earphone according to claim 3, wherein an area of the projection of the sound production component on the sagittal plane ranges from 202 $mm^2$ to 560 $mm^2$.

5. The earphone according to claim 1, wherein a distance between the center of the sound outlet hole and a lower side surface of the sound production component ranges from 4.05 mm to 6.05 mm; and a short-axis dimension of the sound production component ranges from 10 mm to 15 mm.

6. The earphone according to claim 2, wherein at least one pressure relief hole of the one or more pressure relief holes comprises a first pressure relief hole, the first pressure relief hole being open on an upper side surface, an outer side surface, or a lower side surface of the sound production component, and a distance between a center of the first pressure relief hole and the rear side surface is in a range of 10.44 mm to 15.68 mm.

7. The earphone according to claim 6, wherein a distance between a projection point of the center of the sound outlet hole on the sagittal plane and a projection point of a center of the ear canal opening on the sagittal plane ranges from 2.2 mm to 3.8 mm; and a distance between the projection point of the center of the first pressure relief hole on the sagittal plane and the projection point of the center of the ear canal opening on the sagittal plane ranges from 12 mm to 18 mm.

8. The earphone according to claim 6, wherein a distance between a projection point of the center of the sound outlet hole on the sagittal plane and a projection point of a ⅓ point of a lower boundary of the inner side surface on the sagittal plane ranges from 3.5 mm to 5.6 mm; and a distance between a projection point of the center of the first pressure relief hole on the sagittal plane and the projection point of the ⅓ point of the lower boundary of the inner side surface on the sagittal plane ranges from 13.76 mm to 20.64 mm.

9. The earphone according to claim 6, wherein
a thickness of the sound production component ranges from 6 mm to 12 mm; and
a distance between the center of the first pressure relief hole and the inner side surface of the sound production component facing the auricle ranges from 4.24 mm to 6.38 mm.

10. The earphone according to claim 2, wherein at least one pressure relief hole of the one or more pressure relief holes comprises a second pressure relief hole, the second pressure relief hole being open on the upper side surface, the outer side surface, or the lower side surface of the sound production component, a distance between a center of the second pressure relief hole and the rear side surface is in a range of 13.51 mm to 20.27 mm.

11. The earphone according to claim 10, wherein
a distance between a projection point of the center of the sound outlet hole on the sagittal plane and a projection point of a center of the ear canal opening on the sagittal plane ranges from 2.2 mm to 3.8 mm; and
a distance between a projection point of the center of the second pressure relief hole on the sagittal plane and the projection point of the center of the ear canal opening on the sagittal plane ranges from 6.88 mm to 10.32 mm.

12. The earphone according to claim 10, wherein
a distance between a projection point of the center of the sound outlet hole on the sagittal plane and a projection point of a midpoint of an upper boundary of the inner side surface on the sagittal plane ranges from 10.0 mm to 15.2 mm; and
a distance between a projection point of the center of the second pressure relief hole on the sagittal plane and the projection point of the midpoint of the upper boundary of the inner side surface on the sagittal plane ranges from 14.4 mm to 21.6 mm.

13. The earphone according to claim 10, wherein
a thickness of the sound production component ranges from 6 mm to 12 mm; and
a distance between the center of the second pressure relief hole and the inner side surface of the sound production component facing the auricle ranges from 4.24 mm to 6.38 mm.

14. The earphone according to claim 10, wherein
a distance between a projection point of the center of the sound outlet hole on the sagittal plane from a projection point of a ⅓ point of a lower boundary of the inner side surface on the sagittal plane ranges from 3.5 mm to 5.6 mm; and
a distance between a projection point of the center of the second pressure relief hole on the sagittal plane and the projection point of the ⅓ point of the lower boundary of the inner side surface on the sagittal plane is in a range of 8.16 mm to 12.24 mm.

15. The earphone according to claim 2, wherein at least one pressure relief hole of the one or more pressure relief holes comprises a first pressure relief hole and a second pressure relief hole, wherein the first pressure relief hole and the second pressure relief hole are open on two sides that opposite to each other of the sound production component.

16. The earphone according to claim 15, wherein
a short-axis dimension of the sound production component ranges from 10 mm to 15 mm; and
a distance between a projection point of a center of the first pressure relief hole on the sagittal plane and a projection point of a center of the second pressure relief hole on the sagittal plane ranges from 8.51 mm to 15.81 mm.

17. The earphone according to claim 16, wherein a distance between the center of the sound outlet hole and a midperpendicular plane of a line connecting the center of the first pressure relief hole and the center of the second pressure relief hole is in a range of 0 mm to 2 mm.

18. The earphone according to claim 15, wherein
a distance between a projection point of a center of the first pressure relief hole on the sagittal plane and a projection point of a midpoint of an upper boundary of the inner side surface on the sagittal plane is no less than 2 mm; and
a distance between a projection point of a center of the second pressure relief hole on the sagittal plane and a projection point of a ⅓ point of a lower boundary of the inner side surface on the sagittal plane ranges from 8.16 mm to 12.24 mm.

19. An earphone, comprising:
a sound production component, comprising a transducer and a housing accommodating the transducer, a sound outlet hole being provided on an inner side surface of the sound production component, the inner side surface facing an auricle of a user, the sound outlet hole being configured to transmit a sound produced by the transducer out of the housing toward an ear canal of the user, one or more pressure relief holes being provided on other side surfaces of the sound production component other than the inner side surface; and
an ear-hook, configured to place the sound production component at a position near the ear canal but not blocking an ear canal opening in a wearing state;
wherein, at least a portion of the sound production component is located at an antihelix, a distance between a projection of a rear side surface of the sound production component on a sagittal plane and a projection of an inner contour of the auricle on the sagittal plane is not greater than 8 mm, a distance between a center of the sound outlet hole and the rear side surface of the sound production component ranges from 9.5 mm to 15.0 mm, and a distance between a center of at least one pressure relief hole of the one or more pressure relief holes and the rear side surface ranges from 8.60 mm to 12.92 mm.

20. The earphone according to claim 19, wherein
a distance between the center of the sound outlet hole and an upper apex of the ear-hook ranges from 17.5 mm to 27.0 mm; and
a projection of the sound production component on the sagittal plane and a projection of a cavum concha on the sagittal plane have an overlapping region, and a ratio of an area of the overlapping region to an area of a projection of the cavum concha on the sagittal plane is not less than 11.82%.

* * * * *